US012576610B2

United States Patent
(12) United States Patent
Ishida et al.

(10) Patent No.: US 12,576,610 B2
(45) Date of Patent: Mar. 17, 2026

(54) LAMINATED GLASS INTERLAYER FILM AND LAMINATED GLASS

(71) Applicant: SEKISUI CHEMICAL CO., LTD., Osaka (JP)

(72) Inventors: Jun Ishida, Shiga (JP); Hiroaki Inui, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 17/791,422

(22) PCT Filed: Jan. 13, 2021

(86) PCT No.: PCT/JP2021/000767
§ 371 (c)(1),
(2) Date: Jul. 7, 2022

(87) PCT Pub. No.: WO2021/145328
PCT Pub. Date: Jul. 22, 2021

(65) Prior Publication Data

US 2023/0086272 A1 Mar. 23, 2023

(30) Foreign Application Priority Data

Jan. 16, 2020 (JP) ................................ 2020-005355

(51) Int. Cl.
*B32B 17/10* (2006.01)
*B32B 3/26* (2006.01)
(Continued)

(52) U.S. Cl.
CPC .............. *B32B 3/263* (2013.01); *B32B 17/10* (2013.01); *B32B 27/08* (2013.01); *B32B 27/306* (2013.01);
(Continued)

(58) Field of Classification Search
CPC ......... B32B 3/263; B32B 17/10; B32B 27/08; B32B 27/306; B32B 2264/104;
(Continued)

(56) References Cited

U.S. PATENT DOCUMENTS

2002/0086141 A1 7/2002 Sauer
2002/0172804 A1 11/2002 Sauer
(Continued)

FOREIGN PATENT DOCUMENTS

JP 11-130481 5/1999
JP 2006-231521 9/2006
(Continued)

OTHER PUBLICATIONS

International Search Report (ISR) issued Apr. 6, 2021 in International (PCT) Application No. PCT/JP2021/000767.
(Continued)

*Primary Examiner* — Megha M Gaitonde
(74) *Attorney, Agent, or Firm* — Wenderoth, Lind & Ponack, L.L.P.

(57) ABSTRACT

Provided is an interlayer film for laminated glass, having a dark color part with uniform parallel light transmittance in a shading region, and capable of suppressing color unevenness in the shading region. An interlayer film for laminated glass according to the present invention has one end, and the other on an opposite side of the one end, the other end has a thickness larger than a thickness of the one end, and when the interlayer film is arranged between two sheets of clear glass conforming to JIS R3202:1996 to obtain a laminated glass X, and a specific measurement of parallel light transmittance is conducted for the laminated glass X obtained, the interlayer film has a gradation part in which a parallel light transmittance continuously reduces from the one end side to the other end side, and an absolute value of a variation rate
(Continued)

in the parallel light transmittance is more than 0.3%/mm; a transparent part located closer to the one end side than the gradation part and having a parallel light transmittance of 60% or more; and a dark color part located closer to the other end side than the gradation part and including one or more points A having an absolute value of a variation rate in the parallel light transmittance of 0.3%/mm or less.

12 Claims, 9 Drawing Sheets

(51) Int. Cl.
*B32B 27/08* (2006.01)
*B32B 27/30* (2006.01)

(52) U.S. Cl.
CPC ... *B32B 2264/104* (2013.01); *B32B 2264/303* (2020.08); *B32B 2307/402* (2013.01); *B32B 2307/412* (2013.01)

(58) Field of Classification Search
CPC ........ B32B 2264/303; B32B 2307/402; B32B 2307/412; B32B 2250/04; B32B 7/022; B32B 7/023; B32B 7/12; B32B 17/10036; B32B 17/10605; B32B 2250/03; B32B 2250/05; B32B 2250/246; B32B 2250/44; B32B 2307/102; B32B 2307/414; B32B 17/10568; B32B 17/1066; B32B 17/10761; B32B 17/10935; B32B 27/30; B32B 2457/20; B32B 2605/08; B32B 27/20; B32B 27/22; B32B 17/10651; B32B 2307/4026; G02B 27/0101; G02B 5/205; G02B 2027/012; G02B 27/01; B60J 1/001
USPC ................................ 428/156, 172, 212, 213
See application file for complete search history.

(56) References Cited

U.S. PATENT DOCUMENTS

| | | | |
|---|---|---|---|
| 2005/0142332 A1 | 6/2005 | Sauer | |
| 2007/0148472 A1* | 6/2007 | Masaki | B32B 17/10981 428/426 |
| 2010/0043946 A1 | 2/2010 | Ogino et al. | |
| 2012/0228796 A1 | 9/2012 | Ogino et al. | |
| 2016/0159041 A1* | 6/2016 | Lu | B60J 1/02 428/161 |
| 2016/0288460 A1 | 10/2016 | Nakayama et al. | |
| 2018/0264785 A1 | 9/2018 | Oota et al. | |
| 2018/0272662 A1 | 9/2018 | Lu | |
| 2020/0070479 A1 | 3/2020 | Nakayama et al. | |

FOREIGN PATENT DOCUMENTS

| | | |
|---|---|---|
| JP | 2009-35444 | 2/2009 |
| JP | 2010-180068 | 8/2010 |
| JP | 2012-206877 | 10/2012 |
| JP | 2016-84439 | 5/2016 |
| WO | 2009/001856 | 12/2008 |
| WO | 2014/077328 | 5/2014 |
| WO | 2017/057630 | 4/2017 |

OTHER PUBLICATIONS

International Preliminary Report on Patentability and Written Opinion of the International Searching Authority issued Jul. 19, 2022 in International (PCT) Application No. PCT/JP2021/000767.
Extended European Search Report issued Jan. 17, 2024 in European Patent Application No. 21741333.5.
Office Action mailed Jan. 29, 2025, in the corresponding Indian Patent Application No. 202247039637.
Hearing Notice (Indian Office Action) issued Oct. 30, 2025 in Indian Patent Application No. 202247039637, with English-language Translation.

* cited by examiner

[FIG. 1]
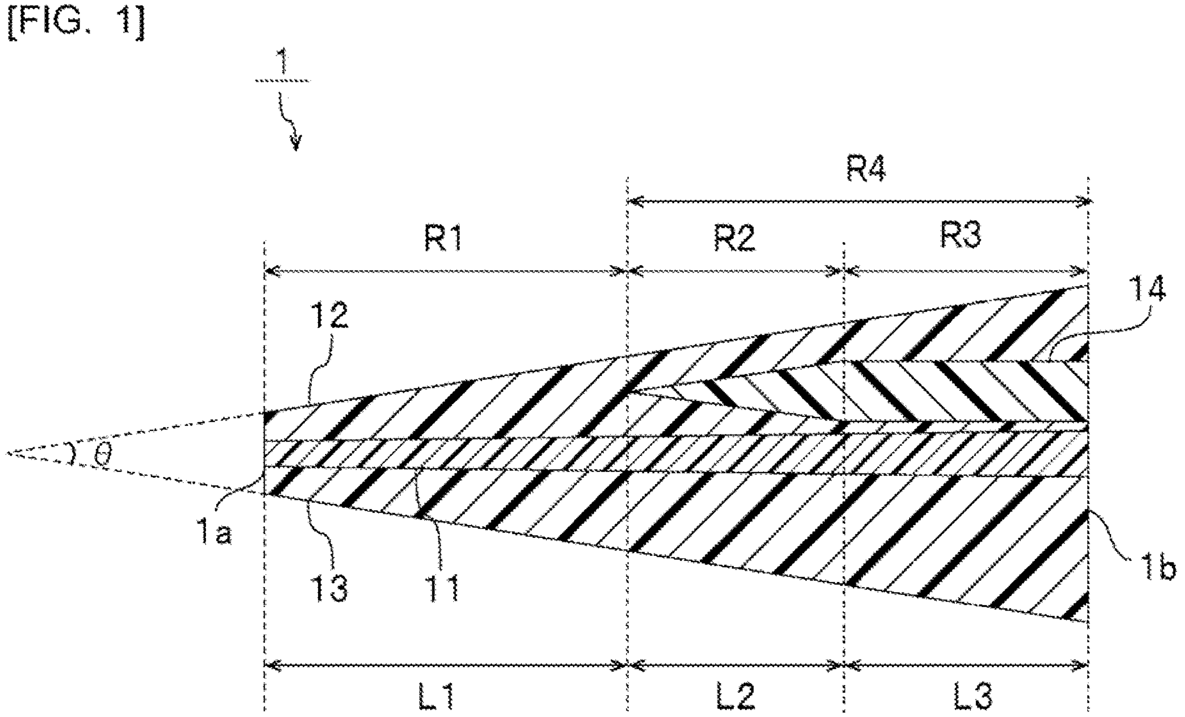
[FIG. 2]
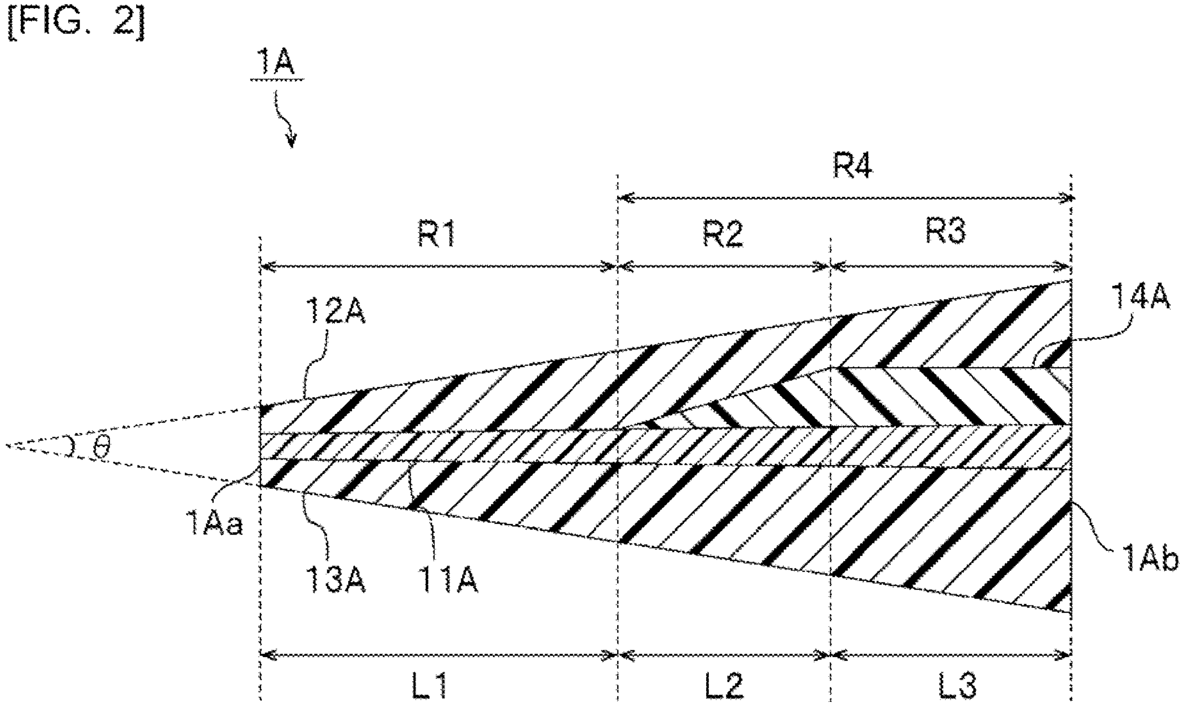

[FIG. 3]
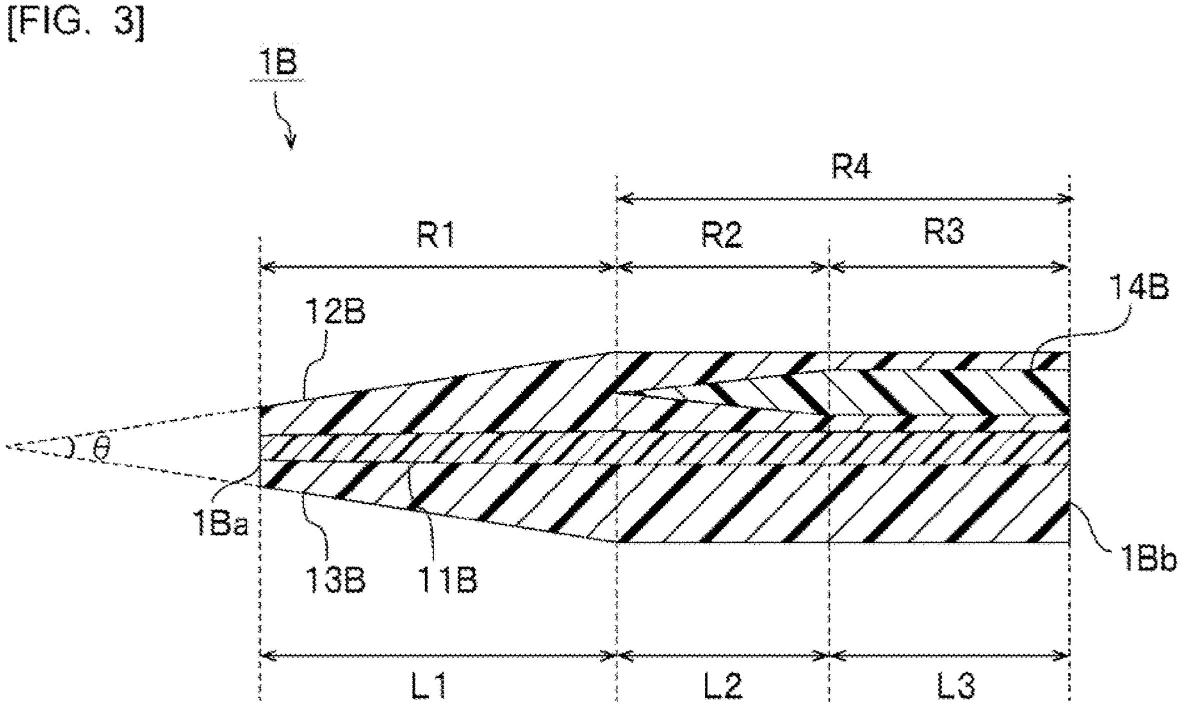
[FIG. 4]
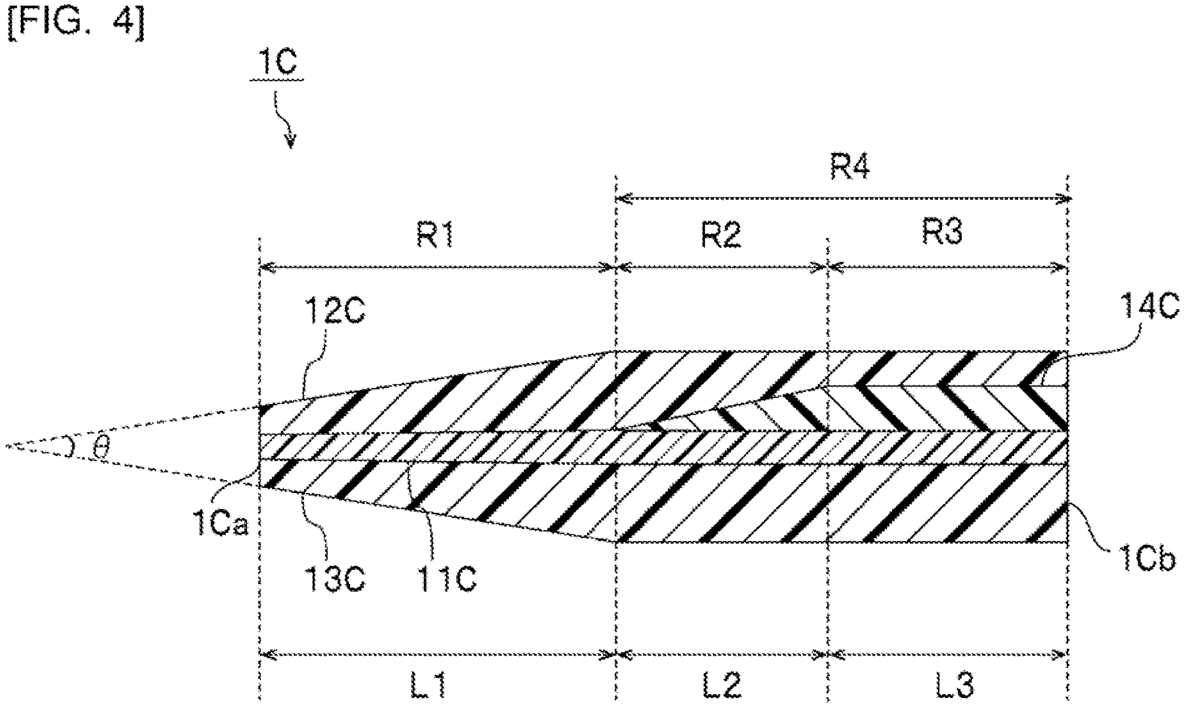

[FIG. 5]
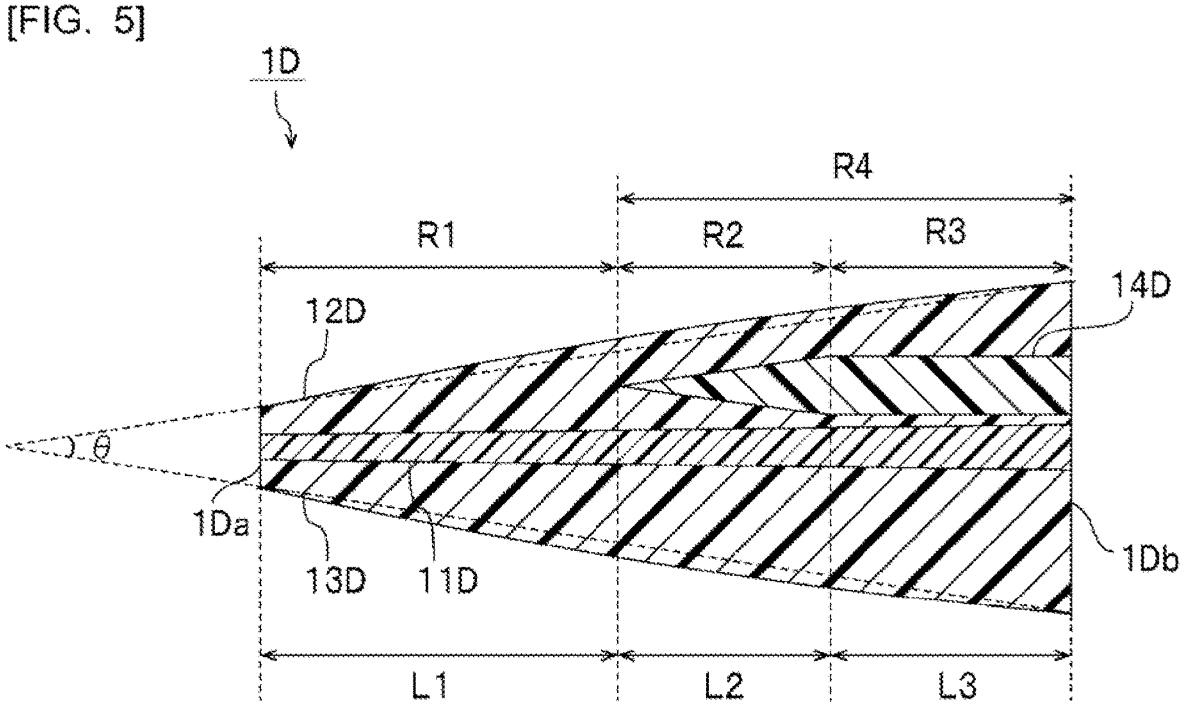
[FIG. 6]
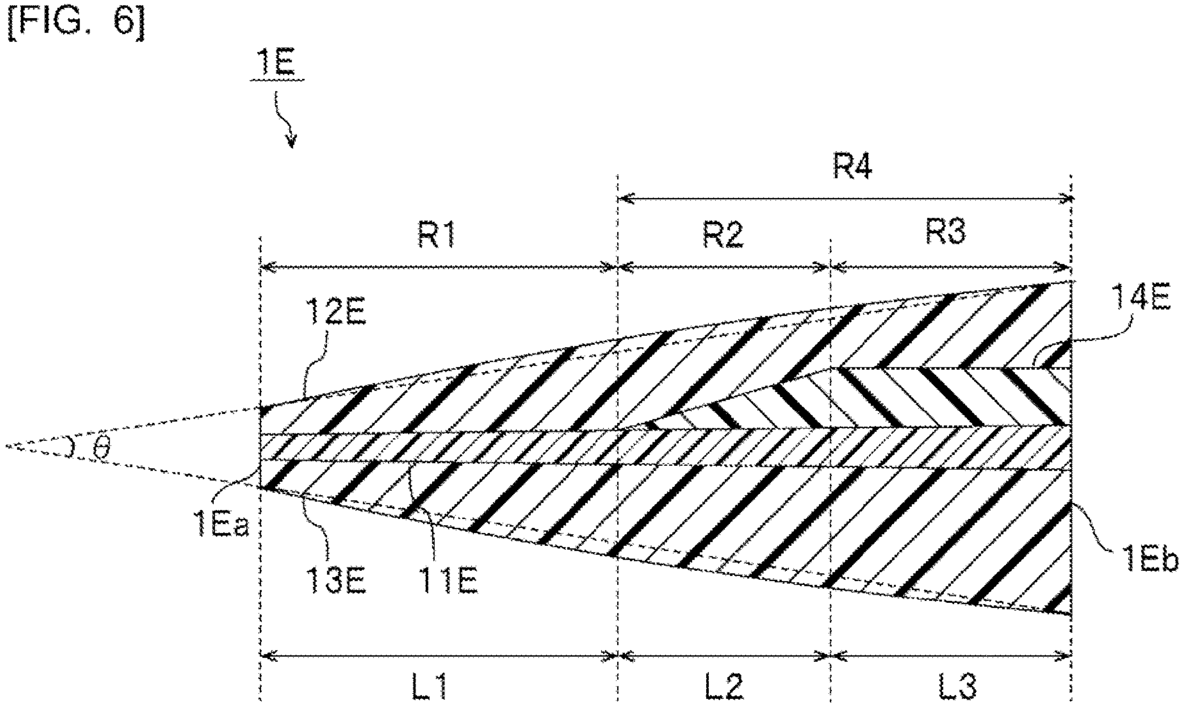

[FIG. 7]
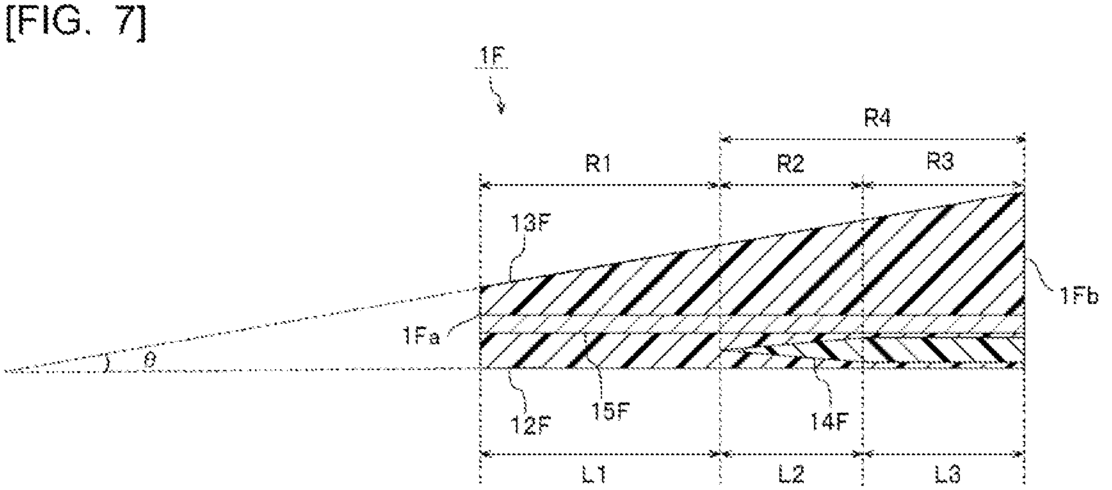
[FIG. 8]
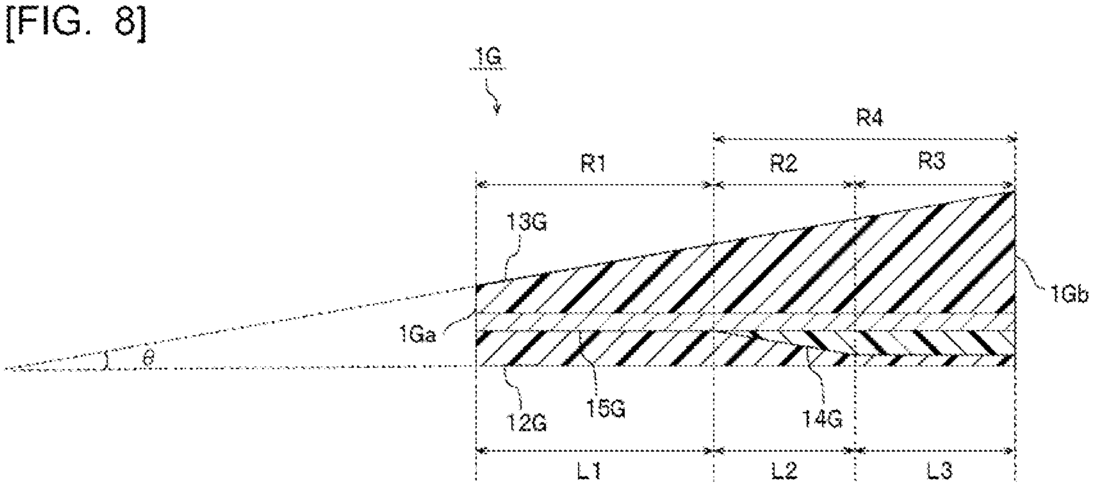
[FIG. 9]
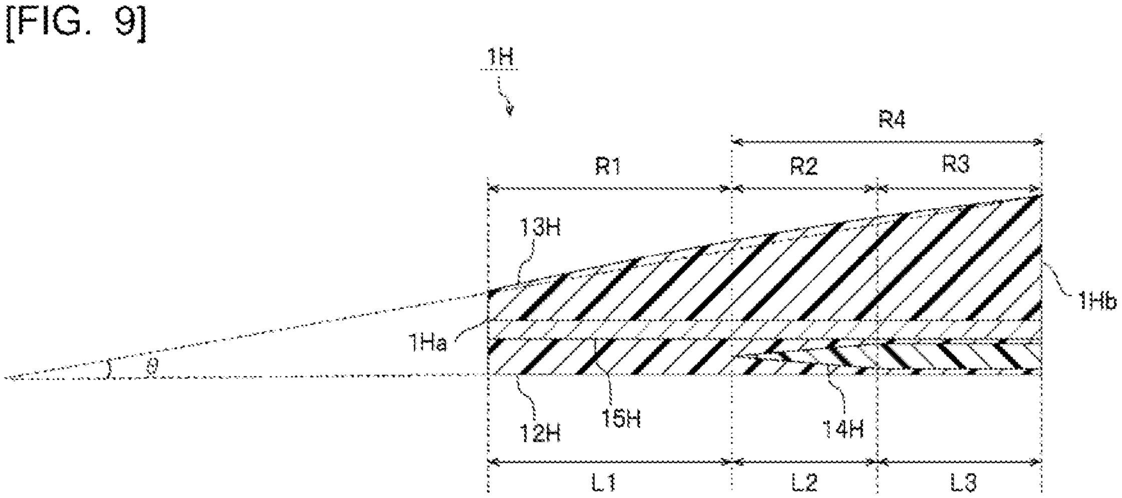

[FIG. 10]
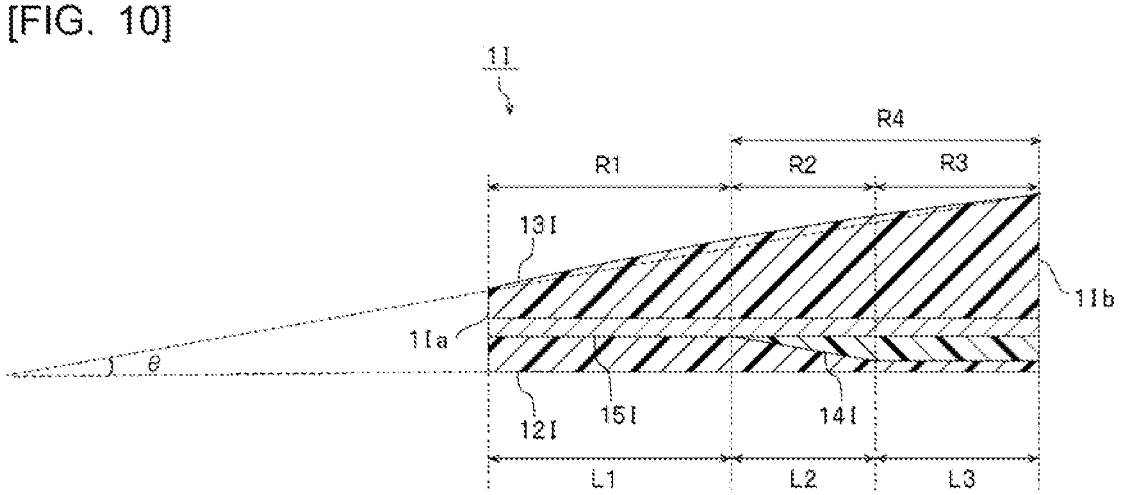
[FIG. 11]
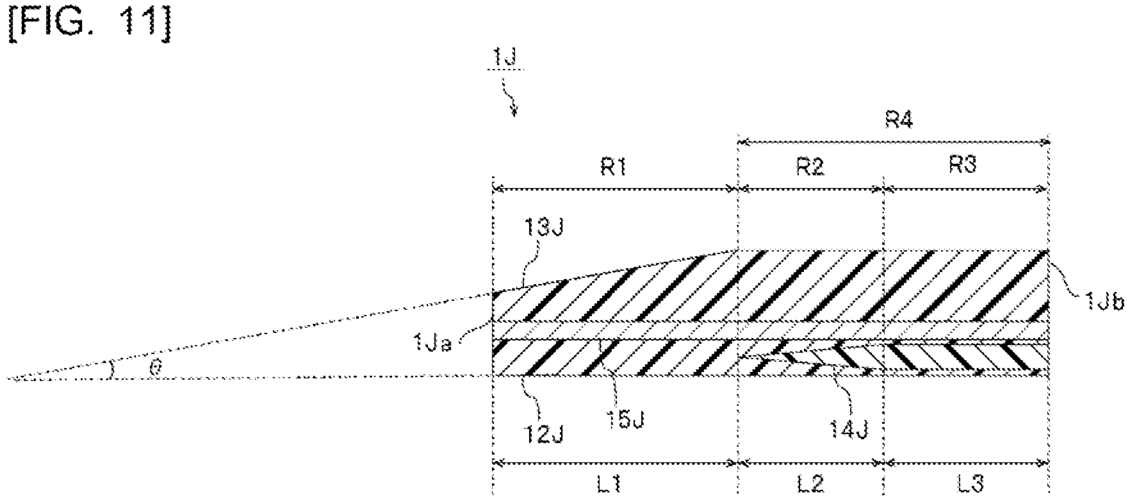
[FIG. 12]
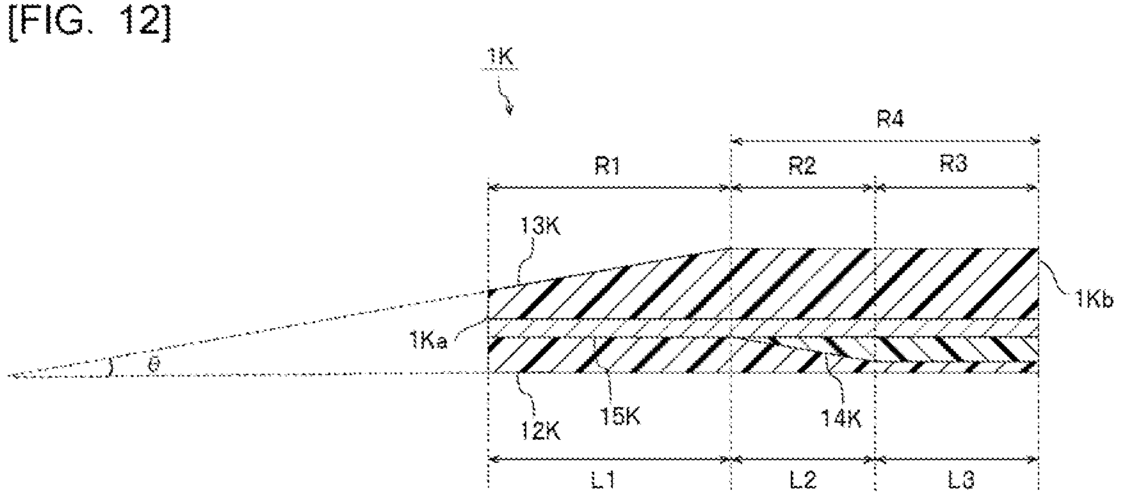

[FIG. 13]
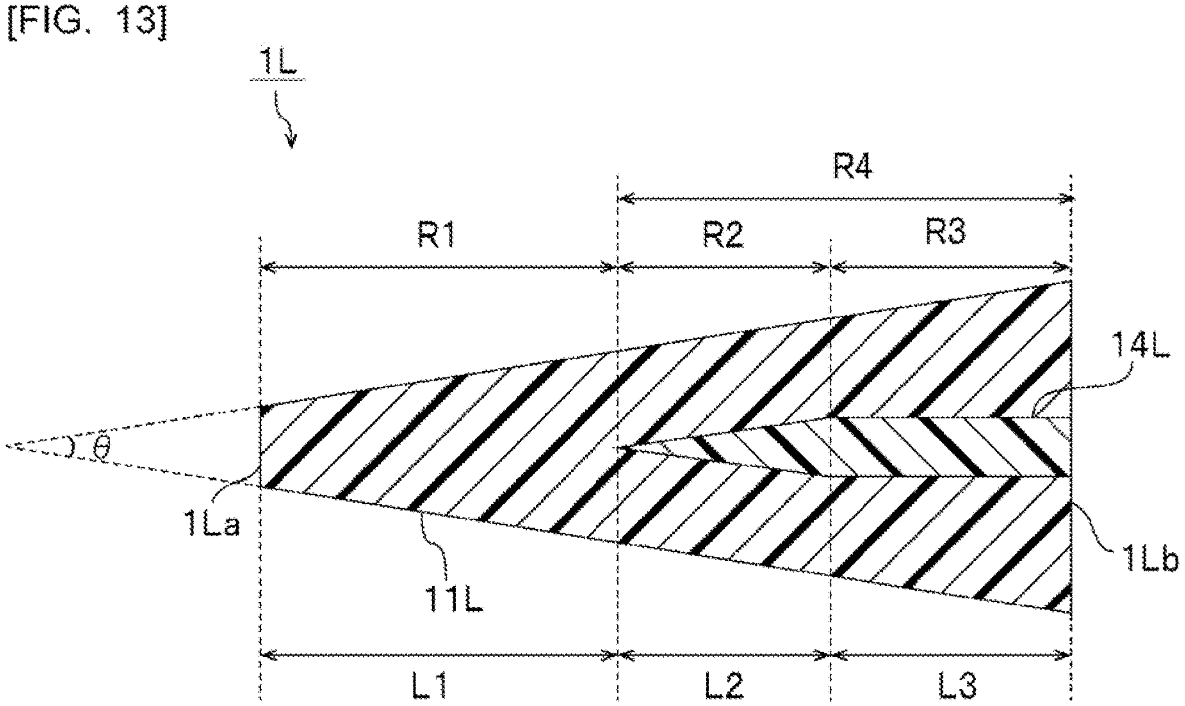
[FIG. 14]
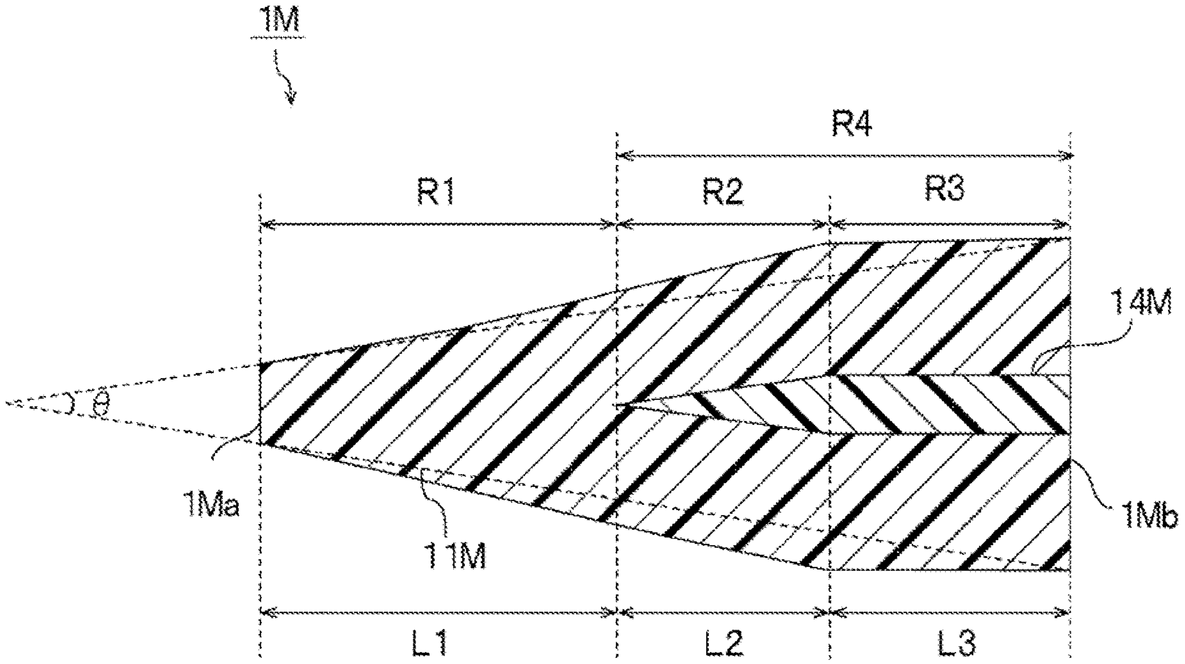

[FIG. 15]
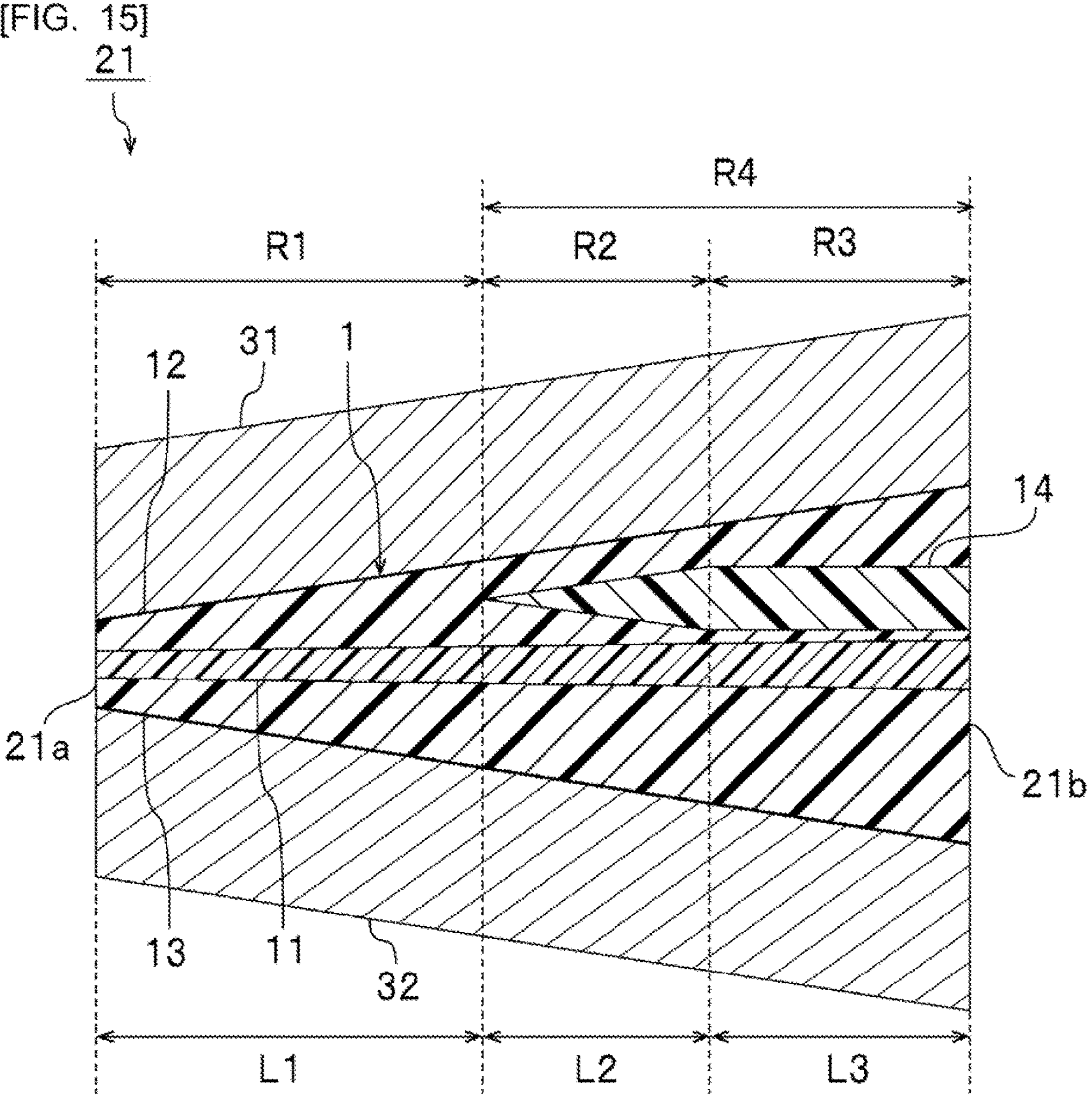

[FIG. 16(a)]
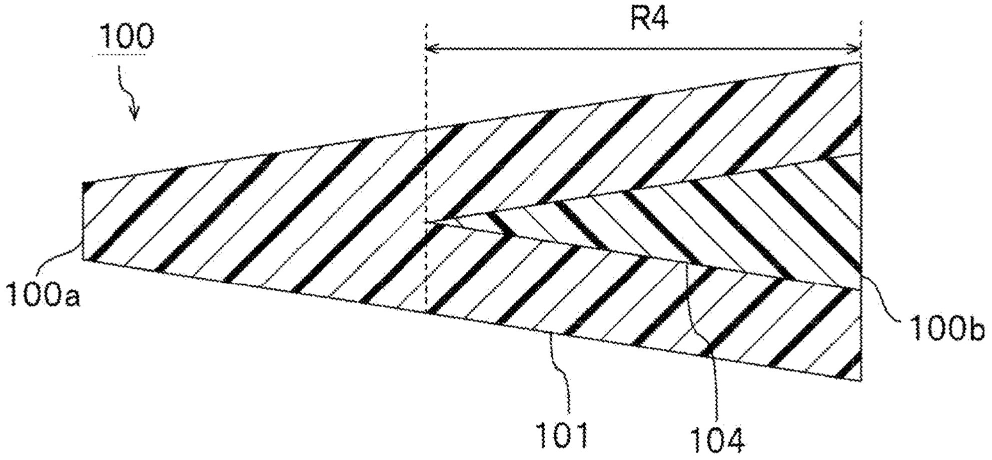
[FIG. 16(b)]
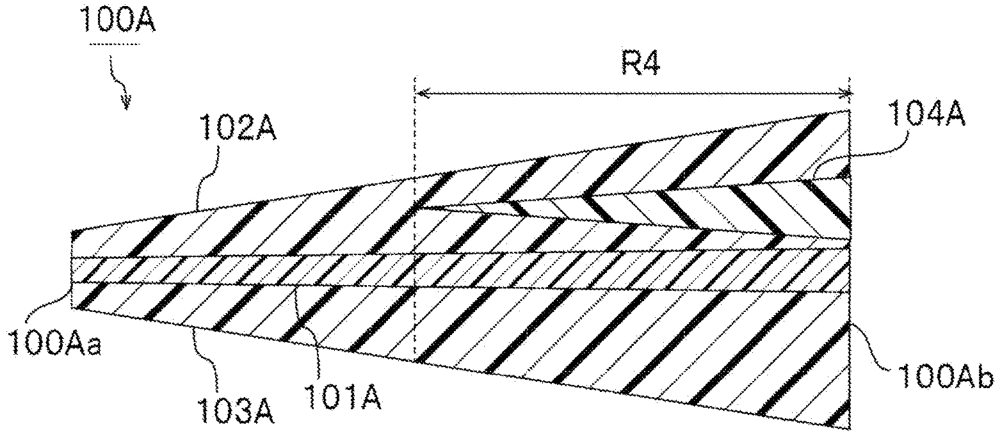
[FIG. 16(c)]
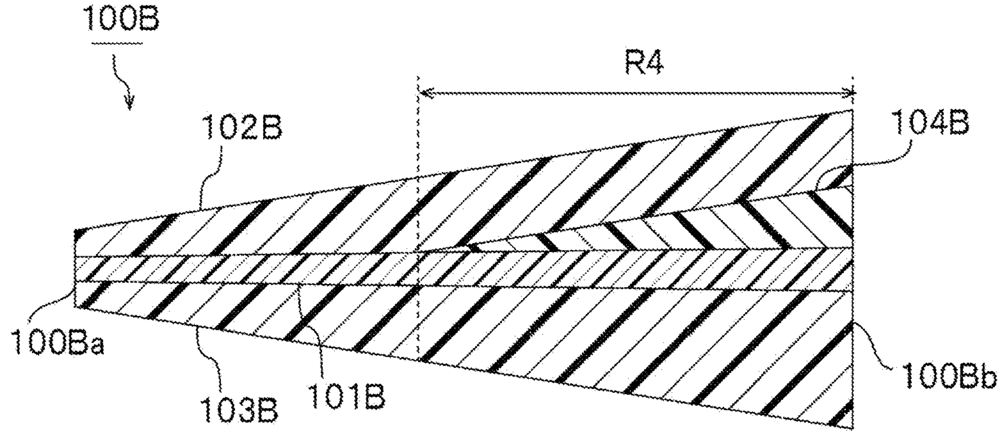

[FIG. 17(a)]
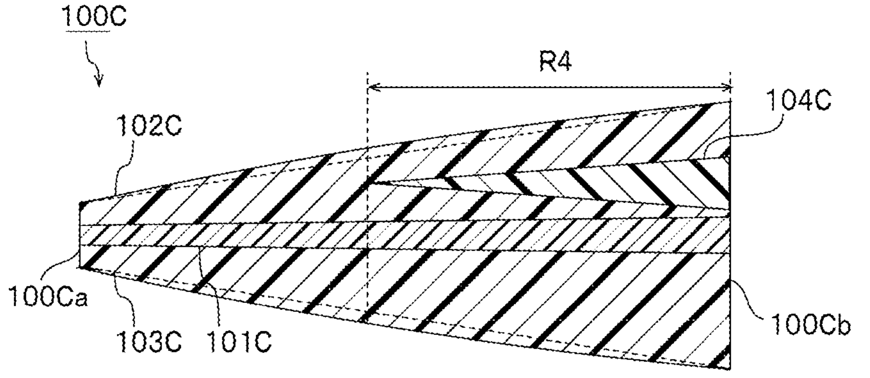
[FIG. 17(b)]
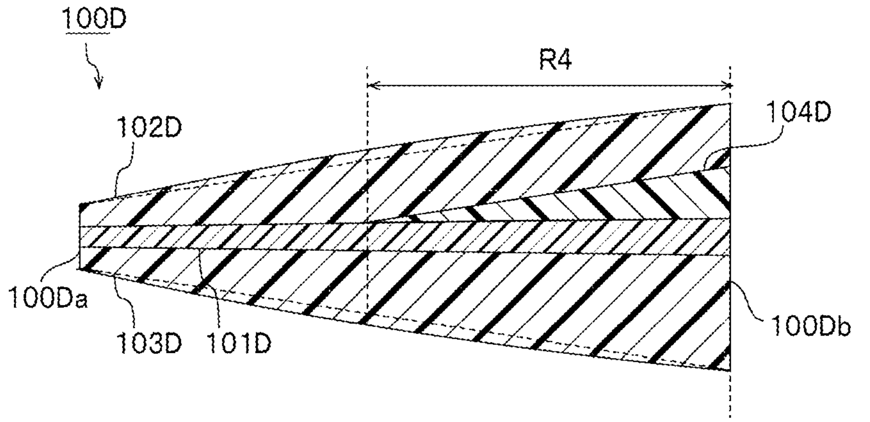
[FIG. 18(a)]
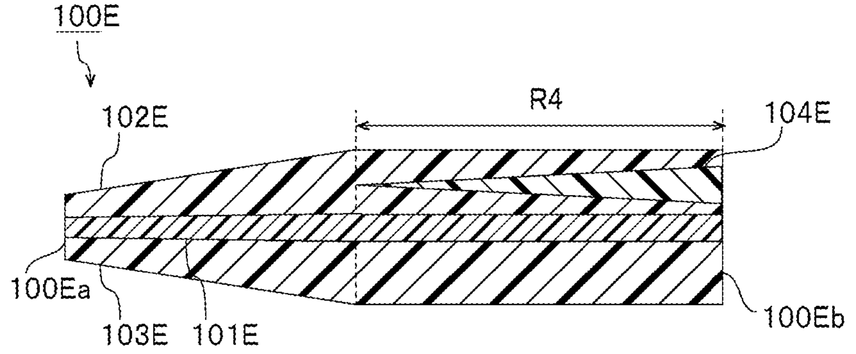
[FIG. 18(b)]
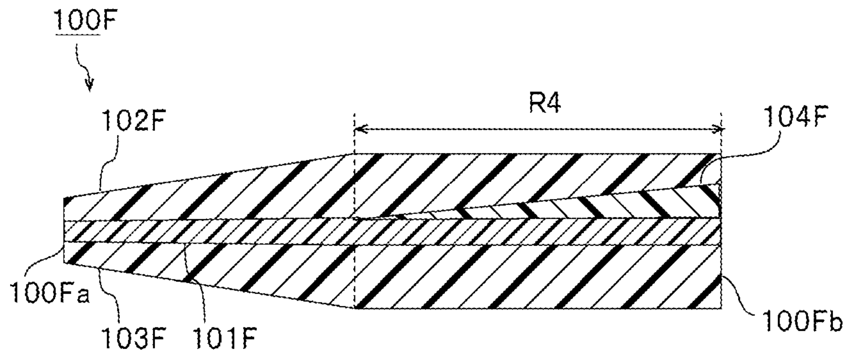

LAMINATED GLASS INTERLAYER FILM AND LAMINATED GLASS

TECHNICAL FIELD

The present invention relates to an interlayer film for laminated glass which is used for obtaining laminated glass. Moreover, the present invention relates to a laminated glass prepared with the interlayer film for laminated glass.

BACKGROUND ART

Since laminated glass generates only a small amount of scattering glass fragments even when subjected to external impact and broken, laminated glass is excellent in safety. As such, the laminated glass is widely used for automobiles, railway vehicles, aircraft, ships, buildings and the like. The laminated glass is produced by sandwiching an interlayer film between a pair of glass plates. An interlayer film is prepared, for example, by a method described in the following Patent Document 1 (Conduit method), and a method described in the following Patent Document 2 (Feed Block method) and the like.

Moreover, as the laminated glass used for automobiles, a head-up display (HUD) has been known. In a HUD, it is possible to display measured information including automobile traveling data such as speed on the windshield of the automobile, and the driver can recognize as if the display were shown in front of the windshield.

In the HUD, there is a problem that the measured information or the like is doubly observed.

In order to suppress double images, a wedge-like interlayer film has been used. Also, as described in Patent Document 3, a wedge-like interlayer film is sometimes provided with a shading region from the viewpoint of designability and light shielding property.

RELATED ART DOCUMENT

Patent Documents

Patent Document 1: JP 2006-231521 A
Patent Document 2: WO2009/001856A1
Patent Document 3: JP H11-130481 A

SUMMARY OF THE INVENTION

Problems to be Solved by the Invention

In the shading region, a coloring agent is generally used for changing the color and the visible light transmittance. In a conventional wedge-like interlayer film, however, the thickness of the colored layer containing the coloring agent also varies with the variation in thickness of the interlayer film. In the conventional wedge-like interlayer film, however, there is no region where the parallel light transmittance is uniform in the shading region, and color unevenness is likely to be generated in the part where the thickness of the colored layer is large.

In particular, in an interlayer film having a large width as is an interlayer film used in a roof part-integrated windshield, color unevenness is more likely to be generated in the shading region.

An object of the present invention is to provide an interlayer film for laminated glass, and a laminated glass having a dark color part with uniform parallel light transmittance in a shading region, and thus capable of suppressing color unevenness in the shading region.

Means for Solving the Problems

According to a broad aspect of the present invention, there is provided an interlayer film for laminated glass (in the present specification, "interlayer film for laminated glass" is sometimes abbreviated as "interlayer film"), the interlayer film having one end, and the other end on an opposite side of the one end, the other end having a thickness larger than a thickness of the one end, when the interlayer film is arranged between two sheets of clear glass conforming to JIS R3202: 1996 to obtain a laminated glass X, and measurement of parallel light transmittance below is conducted for the laminated glass X obtained, the interlayer film having: a gradation part in which a parallel light transmittance continuously reduces from the one end side to the other end side, and an absolute value of a variation rate in the parallel light transmittance is more than 0.3%/mm; a transparent part located closer to the one end side than the gradation part and having a parallel light transmittance of 60% or more; and a dark color part located closer to the other end side than the gradation part and including one or more points A having an absolute value of a variation rate in the parallel light transmittance of 0.3%/mm or less.

Measurement of parallel light transmittance includes: selecting a plurality of points A at 1 cm intervals from a starting point toward the other end, the starting point being a position of 2 cm from the one end toward the other end; measuring a parallel light transmittance of laminated glass X at each point A; defining that an x-axial direction is "distance from the one end" and a y-axial direction is "parallel light transmittance", and preparing an approximate line in a region of 2 cm from three points including one point A and two points 1 cm distanced from the point A on both sides in a direction connecting the one end and the other end; defining an absolute value of a variation rate in the parallel light transmittance determined from the approximate line as "absolute value of variation rate in parallel light transmittance" at the one point A; and determining "absolute value of variation rate in parallel light transmittance" for each point A.

In a specific aspect of the interlayer film according to the present invention, a ratio of a distance of the dark color part in a direction connecting the one end and the other end, to a distance of the interlayer film in the direction connecting the one end and the other end is 0.05 or more.

In a specific aspect of the interlayer film according to the present invention, a distance of the dark color part in the direction connecting the one end and the other end is 50 mm, or more.

In a specific aspect of the interlayer film according to the present invention, the interlayer film has a uniform-thickness part in which a variation in thickness does not exceed 10 μm per a distance range of 10 cm in the direction connecting one end and the other end, and the uniform-thickness part is located closer to the other end side than the middle position between the one end and the other end.

In a specific aspect of the interlayer film according to the present invention, each of the gradation part and the dark color part has a colored layer containing a coloring agent, and a shortest distance between a surface in a thickness direction of the interlayer film and a surface in a thickness direction of the colored layer is 10 μm or more.

According to a broad aspect of the present invention, there is provided a laminated glass including a first lamination glass member, a second lamination glass member, and the above-described interlayer film for laminated glass, the interlayer film for laminated glass being arranged between the first lamination glass member and the second lamination glass member.

According to a broad aspect of the present invention, there is provided a laminated glass having one end, and the other end on an opposite side of the one end, the other end having a thickness larger than a thickness of the one end, the laminated glass including: a first lamination glass member, a second lamination glass member, and an interlayer film, the interlayer film being arranged between the first lamination glass member and the second lamination glass member, when measurement of parallel light transmittance below is conducted for the laminated glass, the laminated glass having: a gradation part in which a parallel light transmittance continuously reduces from the one end side to the other end side, and an absolute value of a variation rate in the parallel light transmittance is more than 0.3%/mm; a transparent part located closer to the one end side than the gradation part and having a parallel light transmittance of 60% r or more; and a dark color part located closer to the other end side than the gradation part and including one or more points A having an absolute value of a variation rate in the parallel light transmittance of 0.3%/mm or less.

Measurement of parallel light transmittance includes: selecting a plurality of points A at 1 cm intervals from a starting point toward the other end, the starting point being a position of 2 cm from the one end toward the other end; measuring a parallel light transmittance of the laminated glass at each point A; defining that an x-axial direction is "distance from the one end" and a y-axial direction is "parallel light transmittance", and preparing an approximate line in a region of 2 cm from three points including one point A and two points 1 cm distanced from the point A on both sides in a direction connecting the one end and the other end; defining an absolute value of a variation rate in the parallel light transmittance determined from the approximate line as "absolute value of variation rate in parallel light transmittance" at the one point A; and determining "absolute value of variation rate in parallel light transmittance" for each point A.

Effect of the Invention

The interlayer film according to the present invention has one end and the other end being at the opposite side of the one end, and the other end has a thickness that is larger than a thickness of the one end. The interlayer film according to the present invention is arranged between two sheets of clear glass conforming to JIS R3202:1996 to obtain a laminated glass X, and the measurement of parallel light transmittance is conducted for the obtained laminated glass X. The interlayer film according to the present invention has the following parts (1) to (3). (1) A gradation part in which a parallel light transmittance continuously reduces from the one end side to the other end side, and an absolute value of a variation rate in the parallel light transmittance is more than 0.3/mm. (2) A transparent part located closer to the one end side than the gradation part and having a parallel light transmittance of 60% or more. (3) A dark color part located closer to the other end side than the gradation part and including one or more points A having an absolute value of a variation rate in the parallel light transmittance of 0.3%/mm ox less. In the interlayer film for laminated glass according to the present invention, since the above configuration is provided, there is a dark color part with uniform parallel light transmittance in a shading region, and thus it is possible to suppress color unevenness in the shading region.

The laminated glass according to the present invention has one end and the other end being at the opposite side of the one end, and the other end has a thickness that is larger than a thickness of the one end. The laminated glass according to the present invention includes a first lamination glass member, a second lamination glass member, and an interlayer film, and the interlayer film is arranged between the first lamination glass member and the second lamination glass member. When the parallel light transmittance is measured for the laminated glass according to the present invention, the laminated glass has the following parts (1) to (3). (1) A gradation part in which a parallel light transmittance continuously reduces from the one end side to the other end side, and an absolute value of a variation rate in the parallel light transmittance is more than 0.3%/mm. (2) A transparent part located closer to the one end side than the gradation part and having a parallel light transmittance of 60% or more. (3) A dark color part located closer to the other end side than the gradation part and including one or more points A having an absolute value of a variation rate in the parallel light transmittance of 0.3%/mm or less. In the laminated glass according to the present invention, since the above configuration is provided, there is a dark color part with uniform parallel light transmittance in a shading region, and thus it is possible to suppress color unevenness in the shading region.

BRIEF DESCRIPTION OF DRAWINGS

FIG. 1 is a sectional view schematically showing an interlayer film for laminated glass in accordance with a first embodiment of the present invention.

FIG. 2 is a sectional view schematically showing an interlayer film for laminated glass in accordance with a second embodiment of the present invention.

FIG. 3 is a sectional view schematically showing an interlayer film for laminated glass in accordance with a third embodiment of the present invention.

FIG. 4 is a sectional view schematically showing an interlayer film for laminated glass in accordance with a fourth embodiment of the present invention.

FIG. 5 is a sectional view schematically showing an interlayer film for laminated glass in accordance with a fifth embodiment of the present invention.

FIG. 6 is a sectional view schematically showing an interlayer film for laminated glass in accordance with a sixth embodiment of the present invention.

FIG. 7 is a sectional view schematically showing an interlayer film for laminated glass in accordance with a seventh embodiment of the present invention.

FIG. 8 is a sectional view schematically showing an interlayer film for laminated glass in accordance with an eighth embodiment of the present invention.

FIG. 9 is a sectional view schematically showing an interlayer film for laminated glass in accordance with a ninth embodiment of the present invention.

FIG. 10 is a sectional view schematically showing an interlayer film for laminated glass in accordance with a tenth embodiment of the present invention.

FIG. 11 is a sectional view schematically showing an interlayer film for laminated glass in accordance with an eleventh embodiment of the present invention.

FIG. 12 is a sectional view schematically showing an interlayer film for laminated glass in accordance with a twelfth embodiment of the present invention.

FIG. 13 is a sectional view schematically showing an interlayer film for laminated glass in accordance with a thirteenth embodiment of the present invention.

FIG. 14 is a sectional view schematically showing an interlayer film for laminated glass in accordance with a fourteenth embodiment of the present invention.

FIG. 15 is a sectional view schematically showing an example of laminated glass prepared with the interlayer film for laminated glass shown in FIG. 1.

FIGS. 16(*a*) to (*c*) are sectional views schematically showing a conventional wedge-like interlayer film having a shading region.

FIGS. 17(*a*) and (*b*) are sectional views schematically showing a conventional wedge-like interlayer film having a shading region.

FIGS. 18(*a*) and (*b*) are sectional views schematically showing a conventional wedge-like interlayer film having a shading region.

MODE (S) FOR CARRYING OUT THE INVENTION

Hereinafter, the details of the present invention will be described.

The interlayer film for laminated glass (in the present specification, sometimes abbreviated as "interlayer film") according to the present invention is used for laminated glass.

The interlayer film has a one-layer structure or a two or more-layer structure. The interlayer film may have a one-layer structure and may have a two or more-layer structure. The interlayer film may have a two-layer structure, may have a three-layer structure, may have a three or more-layer structure, may have a four-layer structure, and may have a four or more-layer structure. Further, the interlayer film may have a five-layer structure, may have a five or more-layer structure, may have a six-layer structure and may have a six or more-layer structure. The interlayer may be an interlayer film having a one-layer structure including only a first layer (single-layered interlayer film) and may be an interlayer film having a two or more-layer structure including a first layer and another layer (multi-layered interlayer film). The interlayer film may have these structures in part of the interlayer film or in the entire interlayer film. The structure of the interlayer film may partially vary.

The interlayer film according to the present invention has one end and the other end being at the opposite side of the one end. The one end and the other end are end parts of both sides facing each other in the interlayer film. In the interlayer film according to the present invention, the thickness of the other end is larger than the thickness of the one end.

In the present invention, the interlayer film is arranged between two sheets of clear glass conforming to JIS R3202:1996 to obtain a laminated glass X. It is preferred that the laminated glass X be prepared in the following manner.

The interlayer film is sandwiched between two sheets of clear glass conforming to JIS R3202:1996 having a thickness of 2 mm to obtain a laminate. The obtained laminate is put into a rubber bag and the inside thereof is degassed for 20 minutes with a degree of vacuum of 2.6 kPa, after which the laminate in the degassed condition is transferred into an oven, and vacuum-pressed by retention at 90° C. for 30 minutes, and thus the laminate is preliminarily press-bonded. The preliminarily press-bonded laminate is subjected to press-bonding for 20 minutes under conditions of 135° C. and a pressure of 1.2 MPa in an autoclave to obtain the laminated glass X.

In the present invention, the following parallel light transmittance is conducted for the obtained laminated glass X. The one end side of the interlayer film corresponds to the one end side of the laminated glass X. The other end side of the interlayer film corresponds to the other end side of the laminated glass X. It is preferred that the one end of the interlayer film be located at the one end of the laminated glass X, and it is preferred that the other end of the interlayer film be located at the other end of the laminated glass X.

Measurement of parallel light transmittance includes: (1) selecting a plurality of points A at 1 cm intervals from a starting point toward the other end, the starting point being a position of 2 cm from the one end toward the other end; (2) measuring a parallel light transmittance of laminated glass X at each point A; (3) defining that an x-axial direction is "distance from the one end" and a y-axial direction is "parallel light transmittance", and preparing an approximate line in a region of 2 cm from three points including one point A and two points 1 cm distanced from the point A on both sides in a direction connecting the one end and the other end; defining an absolute value of a variation rate in the parallel light transmittance determined from the approximate line as "absolute value of variation rate in parallel light transmittance" at the one point A; and determining "absolute value of variation rate in parallel light transmittance" for each point A.

In the above (1), points A are set at 1 cm intervals. Points are selected up to the position where selection of points at 1 cm intervals can be made from the one end side toward the other end side of the interlayer film (position where the interval is not less than 1 cm, and the distance between point A and the other end is not less than 2 cm). The point A that is closest to the one end side of the interlayer film is point A1 at a position of 2 cm from the one end toward the other end of the interlayer film, and the next point A is point A2 at a position of 3 cm from the one end toward the other end of the interlayer film. The next point is point A3 at a position of 4 cm from the one end toward the other end of the interlayer film. Point An is at a position of (n+1) cm (n is a natural number) from the one end toward the other end of the interlayer film. Each of point A1, point A2, point A3 is included in points A that are set at 1 cm intervals in the above (1). For convenience, the point at a position of 1 cm from the one end toward the other end of the interlayer film is defined as point A0. Point A0 is not included in points A that are set at 1 cm intervals in the above (1).

In the above (2), parallel light transmittance of laminated glass X is measured at a position of each point A. Therefore, values of parallel light transmittance are obtained in the same number as that of points A. Parallel light transmittance of laminated glass X is measured in accordance with JIS R3106:1998. Specifically, measurement is conducted in the following manner.

By using a spectrophotometer, the laminated glass X is placed parallel with the normal line of the light axis on the optical path between the light source and the integrating sphere at a point 13 cm away from the integrating sphere so that only the parallel light having penetrated the laminated glass is received by the integrating sphere. The parallel light transmittance means a visible light transmittance calculated from the spectral transmittance measured in this condition. Examples of the spectrophotometer include "U-4100" available from Hitachi High-Tech Corporation.

In the above (3), "three points including point A1 that is closest to the one end side of the interlayer film, and two points 1 cm distanced from the point A1 on both sides in the direction connecting the one end and the other end" means the following three points. Point at 1 cm, point at 2 cm and point at 3 cm from the one end toward the other end of the interlayer film. In other words, the above point A0, point A1, and point A2. From parallel light transmittances of point A4, point A1 and point A2, an approximate line is prepared by defining an x-axial direction as "distance from the one end" and a y-axial direction as "parallel light transmittance". An absolute value of a variation rate in parallel light transmittance determined from the obtained approximate line is defined as "absolute value of variation rate in parallel light transmittance at point A1".

In the above (3), "three points including point A2 that is second closest to the one end side of the interlayer film, and two points 1 cm distanced from the point A2 on both sides in the direction connecting the one end and the other end" means the following three points. Point at 2 cm, point at 3 cm and point at 4 cm from the one end toward the other end of the interlayer film. In other words, the above point A1, point A2, and point A3. From parallel light transmittances of point A1, point A2, and point A3, an approximate line is prepared by defining an x-axial direction as "distance from the one end" and a y-axial direction as "parallel light transmittance". An absolute value of a variation rate in parallel light transmittance determined from the obtained approximate line is defined as "absolute value of variation rate in parallel light transmittance at point A2".

In the present invention, "variation rate in parallel light transmittance at point A3" and "variation rate in parallel light transmittance at point A (n−1)" are calculated in the same manner. Since the points A are selected as described above, the three points for preparing the approximate line do not exist in a region of less than 1 cm from the one end toward the other end, and do not exist in a region of less than 1 cm from the other end toward the one end.

When the parallel light transmittance is measured for laminated glass X, the interlayer film has the following parts (1) to (3). In the present invention, a gradation part is defined, and then a transparent part and a dark color part are defined.

(1) A gradation part in which a parallel light transmittance continuously reduces from the one end side to the other end side, and an absolute value of a variation rate in the parallel light transmittance is more than 0.3%/mm.

(2) A transparent part located closer to the one end side than the gradation part and having a parallel light transmittance of 60% or more.

(3) A dark color part located closer to the other end side than the gradation part and including one or more points A having an absolute value of a variation rate in the parallel light transmittance of 0.3%/mm or less.

Therefore, the interlayer film according to the present invention has the transparent part, the gradation part, and the dark color part in this order from the one end side toward the other end side. The gradation part and the dark color part constitute a shading region. The interlayer film according to the present invention may have a part corresponding to none of these three parts: the transparent part, the gradation part, and the dark color part.

In the interlayer film according to the present invention, since the above configuration is provided, there is a dark color part with uniform parallel light transmittance in a shading region, and thus it is possible to suppress color unevenness in the shading region. In the interlayer film according to the present invention, although the thickness of the other end is larger than the thickness of the one end, there is a dark color part with uniform parallel light transmittance in a shading region, and thus it is possible to suppress color unevenness in the shading region.

The dark color part may contain points A having an absolute value of a variation rate in parallel light transmittance of 0.3%/mm or less, and points A having an absolute value of a variation rate in parallel light transmittance of more than 0.3%/mm. Among the plurality of points A, a point A having an absolute value of a variation rate in parallel light transmittance of 0.3%/mm or less is defined as point Aa. Among the plurality of points A, a point A having an absolute value of a variation rate in parallel light transmittance of more than 0.3%/mm is defined as point Ab. In this case, in the dark color part, there are one or more points Aa. In the dark color part, there may be one or more points Ab in addition to point Aa. Also, "(3) A dark color part located closer to the other end side than the gradation part and including one or more points A having an absolute value of a variation rate in parallel light transmittance of 0.3%/mm or less" means "(3) A dark color part located closer to the other end side than the gradation part and including one or more points Aa having an absolute value of a variation rate in parallel light transmittance of 0.3%/mm or less".

Hereinafter, specific embodiments of the present invention will be described with reference to the drawings.

First, a conventional wedge-like interlayer film having a shading region will be described.

FIGS. 16(*a*) to (*c*), FIGS. 17(*a*) and (*b*) and FIGS. 18(*a*) and (*b*) are sectional views schematically showing a conventional wedge-like interlayer film having a shading region.

An interlayer film 100 shown in FIG. 16(*a*) has one end 100*a* and the other end 100*b*. The thickness of the other end 100*b* is larger than the thickness of the one end 100*a*. The interlayer film 100 includes a first layer 101 and a colored layer 104. The colored layer 104 is embedded in the first layer 101. The interlayer film 100 has a shading region R4. The shading region R4 corresponds to the region where the colored layer 104 exists.

An interlayer film 100A shown in FIG. 16(*b*) has one end 100Aa and the other end 100Ab. The thickness of the other end 100Ab is larger than the thickness of the one end 100Aa. The interlayer film 100A includes a first layer 101A, a second layer 102A, a third layer 103A, and a colored layer 104A. The colored layer 104A is embedded in the second layer 102A. The interlayer film 100A has the shading region R4. The shading region R4 corresponds to the region where the colored layer 104A exists.

An interlayer film 100B shown in FIG. 16(*c*) has one end 100Ba and the other end 100Bb. The thickness of the other end 100Bb is larger than the thickness of the one end 100Ba. The interlayer film 100B includes a first layer 101B, a second layer 102B, a third layer 103B, and a colored layer 104B. The colored layer 104B is embedded between the first layer 101B and the second layer 102B. The interlayer film 100B has the shading region R4. The shading region R4 corresponds to the region where the colored layer 104B exists.

An interlayer film 100C shown in FIG. 17(*a*) has one end 100Ca and the other end 100Cb. The thickness of the other end 100Cb is larger than the thickness of the one end 100Ca. In the interlayer film 100C, the increment of the thickness is not constant from the one end 100Ca side to the other end 100Cb side. The interlayer film 140C has a region where the thickness increases from the one end 100Ca side to the other end 100Cb side. The interlayer film 100C has a portion where the increment of the thickness decreases from the one end 100Ca side to the other end 100Cb side in the region where the thickness increases. The interlayer film 100C includes a first layer 101C, a second layer 102C, a third layer 103C, and a colored layer 104C. The colored layer 104C is embedded in the second layer 102C. The interlayer film 100C has the shading region R4. The shading region R4 corresponds to the region where the colored layer 104C exists.

An interlayer film 100D shown in FIG. 17(*b*) has one end 100Da and the other end 100Db. The thickness of the other end 100Db is larger than the thickness of the one end 100Da. In the interlayer film 100D, the increment of the thickness is not constant from the one end 100Da side to the other end 100Db side. A profile of the interlayer film 100D is the same as a profile of the interlayer film 100C. The interlayer film 100D includes a first layer 101D, a second layer 102D, a third layer 103D, and a colored layer 104D. The colored layer 104D is embedded between the first layer 101D and the second layer 102D. The interlayer film 100D has the shading region R4. The shading region R4 corresponds to the region where the colored layer 104D exists.

An interlayer film 100E shown in FIG. 18(*a*) has one end 100Ea and the other end 100Eb. The thickness of the other end 100Eb is larger than the thickness of the one end 100Ea. The interlayer film 100E includes a first layer 101E, a second layer 102E, a third layer 103E, and a colored layer 104E. The colored layer 104E is embedded in the second layer 102E. A sectional shape in the thickness direction of the first layer 101E and the third layer 103E includes a wedge-like portion and a rectangular portion. A sectional shape in the thickness direction of the layer combining the second layer 102E and the colored layer 104E includes a wedge-like portion and a rectangular portion. The sectional shape in the thickness direction of the portion where the colored layer 104E does not exist in the layer combining the second layer 102E and the colored layer 104E is wedge-like. The sectional shape in the thickness direction of the portion where the colored layer 104E exists in the layer combining the second layer 102E and the colored layer 104E is rectangular. The interlayer film 100E has the shading region R4. The shading region R4 corresponds to the region where the colored layer 104E exists.

An interlayer film 100F shown in FIG. 18(*b*) has one end 100Fa and the other end 100Fb. The thickness of the other end 100Fb is larger than the thickness of the one end 100Fa. A profile of the interlayer film 100F is the same as a profile of the interlayer film 100E. The interlayer film 100F includes a first layer 101F, a second layer 102F, a third layer 103F, and a colored layer 104F. The colored layer 104F is embedded between the first layer 101F and the second layer 102F. The interlayer film 100F has the shading region R4. The shading region R4 corresponds to the region where the colored layer 104F exists.

In the interlayer films 100, 100A to 100F, the thicknesses of the colored layers 104, 104A to 104F also vary with the variation in thickness of the interlayer film. Therefore, in the interlayer films 100, 100A to 100F, there is no region having uniform parallel light transmittance in the shading region R4. In the interlayer films 100, 100A to 100F, parallel light transmittance continuously reduces from the one end 100*a*, 100Aa to 100Fa side to the other end 100*b*, 100Ab to 100Fb side in the shading region R4.

Next, an interlayer film of a specific embodiment of the present invention having a shading region will be described. In the following embodiment, different points are replaceable.

FIG. 1 is a sectional view schematically showing an interlayer film for laminated glass in accordance with a first embodiment of the present invention.

An interlayer film 1 shown in FIG. 1 is used for obtaining laminated glass. The interlayer film 1 is an interlayer film for laminated glass.

The interlayer film 1 has a lengthwise direction and a widthwise direction. In FIG. 1, the right and left direction is the widthwise direction, and the front and back direction is the lengthwise direction.

The interlayer film 1 includes a first layer 11, a second layer 12, a third layer 13, and a colored layer 14. The second layer 12 is arranged on a first surface (one surface) side of the first layer 11. The second layer 12 is layered on the first surface of the first layer 11. The first layer 11 and the second layer 12 are in contact with each other. The third layer 13 is arranged on a second surface (other surface) side opposite to the first surface of the first layer 11. The third layer 13 is layered on the second surface of the first layer 11. The first layer 11 and the third layer 13 are in contact with each other. The first layer 11 is arranged between the second layer 12 and the third layer 13 to be sandwiched therebetween.

The colored layer 14 is embedded in the second layer 12. On the other end 1*b* side of the interlayer film 1, the colored layer 14 is embedded in the second layer 12. On the other end 1*b* side in the widthwise direction of the interlayer film 1, the colored layer 14 is embedded in the second layer 12. The colored layer 14 and the first layer 11 are not in contact with each other.

The sectional shape in the thickness direction of each of the first layer 11 and the third layer 13 is a wedge-like shape. The sectional shape in the thickness direction of the layer combining the second layer 12 and the colored layer 14 is a wedge-like shape. The thicknesses of the first layer 11 and the third layer 13 are larger at the other end 1*b* side than at the one end 1*a* side.

In the interlayer film 1, the thickness of the other end 1*b* is larger than the thickness of the one end 1*a*. In the interlayer film 1, the increment of the thickness is constant from the one end 1*a* side to the other end 1*b* side.

The interlayer film 1 has a transparent part R1, a gradation part R2, and a dark color part R3. The transparent part R1 exists on the one end 1*a* side of the interlayer film 1, the dark color part R3 exists on the other end 1*b* side of the interlayer film 1, and the gradation part R2 exists between the transparent part R1 and the dark color part R3. The transparent part R1, the gradation part R2, and the dark color part R3 are continuous.

The transparent part R1 is configured by the first layer 11, the second layer 12, and the third layer 13. The gradation part P2 and the dark color part R3 are configured by the first layer 11, the second layer 12, the third layer 13, and the colored layer 14. The gradation part R2 and the dark color part R3 constitute the shading region R4.

In the gradation part R2, the thickness of the colored layer 14 continuously increases from the one end 1*a* side to the other end 1*b* side. In the dark color part R3, the thickness of the colored layer 14 is uniform.

FIG. 2 is a sectional view schematically showing an interlayer film for laminated glass in accordance with a second embodiment of the present invention.

An interlayer film 1A shown in FIG. 2 is used for obtaining laminated glass. The interlayer film 1A is an interlayer film for laminated glass.

The interlayer film 1A has a lengthwise direction and a widthwise direction. In FIG. 2, the right and left direction is the widthwise direction, and the front and back direction is the lengthwise direction.

The interlayer film 1A includes a first layer 11A, a second layer 12A, a third layer 13A, and a colored layer 14A. The second layer 12A is arranged on a first surface (one surface) side of the first layer 11A. The second layer 12A is layered on the first surface of the first layer 11A. The first layer 11A and the second layer 12A are in contact with each other. The third layer 13A is arranged on a second surface side opposite to the first surface of the first layer 11A. The third layer 13A is layered on the second surface of the first layer 11A. The first layer 11A and the third layer 13A are in contact with each other. The first layer 11A is arranged between the second layer 12A and the third layer 13A to be sandwiched therebetween.

The colored layer 14A is embedded between the first layer 11A and the second layer 12A. On the other end 1Ab side of the interlayer film 1A, the colored layer 14A is embedded between the first layer 11A and the second layer 12A. On the other end 1Ab side in the widthwise direction of the interlayer film 1A, the colored layer 14A is embedded between the first layer 11A and the second layer 12A. The colored layer 14A, and the first layer 11A and the second layer 12A are in contact with each other.

The sectional shape in the thickness direction of each of the first layer 11A and the third layer 13A is a wedge-like shape. The sectional shape in the thickness direction of the layer combining the second layer 12A and the colored layer 14A is a wedge-like shape. The thicknesses of the first layer 11A and the third layer 13A are larger at the other end 1Ab side than at one end 1Aa side.

In the interlayer film 1A, the thickness of the other end 1Ab is larger than the thickness of the one end 1Aa. In the interlayer film 1A, the increment of the thickness is constant from the one end 1Aa side to the other end 1Ab side.

The interlayer film 1A has the transparent part R1, the gradation part R2, and the dark color part R3. The transparent part R1 exists on the one end 1Aa side of the interlayer film 1A, the dark color part R3 exists on the other end 1Ab side of the interlayer film 1A, and the gradation part R2 exists between the transparent part R1 and the dark color part R3. The transparent part R1, the gradation part R2, and the dark color part R3 are continuous.

The transparent part R1 is configured by the first layer 11A, the second layer 12A, and the third layer 13A. The gradation part R2 and the dark color part R3 are configured by the first layer 11A, the second layer 12A, the third layer 13A, and the colored layer 14A. The gradation part R2 and the dark color part R3 constitute the shading region R4.

In the gradation part R2, the thickness of the colored layer 14A continuously increases from the one end 1Aa side to the other end 1Ab side. In the dark color part R3, the thickness of the colored layer 14A is uniform.

FIG. 3 is a sectional view schematically showing an interlayer film for laminated glass in accordance with a third embodiment of the present invention.

An interlayer film 18 shown in FIG. 3 is used for obtaining laminated glass. The interlayer film 1B is an interlayer film for laminated glass.

The interlayer film 1B has a lengthwise direction and a widthwise direction. In FIG. 3, the right and left direction is the widthwise direction, and the front and back direction is the lengthwise direction.

The interlayer film 1B includes a first layer 11B, a second layer 12B, a third layer 13B, and a colored layer 14B. The second layer 12B is arranged on a first surface (one surface) side of the first layer 11B. The second layer 12B is layered on the first surface of the first layer 11B. The first layer 11B and the second layer 12B are in contact with each other. The third layer 13B is arranged on a second surface side opposite to the first surface of the first layer 11B. The third layer 13B is layered on the second surface of the first layer 11B. The first layer 11B and the third layer 13B are in contact with each other. The first layer 11B is arranged between the second layer 12B and the third layer 13B to be sandwiched therebetween.

The colored layer 14B is embedded in the second layer 12B. On the other end 1Bb side of the interlayer film 1B, the colored layer 14B is embedded in the second layer 12B. On the other end 1Bb side in the widthwise direction of the interlayer film 1B, the colored layer 14B is embedded in the second layer 12B. The colored layer 14B and the first layer 11B are not in contact with each other.

A sectional shape in the thickness direction of the first layer 11B and the third layer 13B includes a wedge-like portion and a rectangular portion. A sectional shape in the thickness direction of the layer combining the second layer 128 and the colored layer 14B includes a wedge-like portion and a rectangular portion. The sectional shape in the thickness direction of the portion where the colored layer 14B does not exist in the layer combining the second layer 12B and the colored layer 14B is a wedge-like shape. The sectional shape in the thickness direction of the portion where the colored layer 14B exists in the layer combining the second layer 12B and the colored layer 14B is a rectangular shape. The thicknesses of the first layer 11B and the third layer 13B are larger at the other end 1Bb side than at one end 1Ba side.

In the interlayer film 1B, the thickness of the other end 1Bb is larger than the thickness of the one end 1Ba. A sectional shape in the thickness direction of the interlayer film 18 includes a wedge-like portion and a rectangular portion. In the portion where the sectional shape in the thickness direction of the interlayer film 1B is a wedge-like shape, the increment in thickness from the one end 1Ba side to the other end 1Bb side is constant.

The interlayer film 1B has the transparent part R1, the gradation part P2, and the dark color part R3. The transparent part R1 exists on the one end 1Ba side of the interlayer film 1B, the dark color part R3 exists on the other end 1Bb side of the interlayer film 1B, and the gradation part R2 exists between the transparent part R1 and the dark color part R3. The transparent part R1, the gradation part R2, and the dark color part R3 are continuous. The sectional shape in the thickness direction of the transparent part R1 is a wedge-like shape. The sectional shape in the thickness direction of the gradation part R2 and the dark color part R3 is a rectangular shape.

The transparent part R1 is configured by the first layer 11B, the second layer 12B, and the third layer 13B. The gradation part R2 and the dark color part R3 are configured by the first layer 11B, the second layer 12B, the third layer 13B, and the colored layer 14B. The gradation part R2 and the dark color part R3 constitute the shading region R4. The sectional shape in the thickness direction of the shading region R4 is a rectangular shape.

In the gradation part R2, the thickness of the colored layer 14B continuously increases from the one end 1Ba side to the other end 1Bb side. In the dark color part R3, the thickness of the colored layer 14B is uniform.

FIG. 4 is a sectional view schematically showing an interlayer film for laminated glass in accordance with a fourth embodiment of the present invention.

An interlayer film 1C shown in FIG. 4 is used for obtaining laminated glass. The interlayer film 1C is an interlayer film for laminated glass.

The interlayer film 1C has a lengthwise direction and a widthwise direction. In FIG. 4, the right and left direction is the widthwise direction, and the front and back direction is the lengthwise direction.

The interlayer film 1C includes a first layer 11C, a second layer 12C, a third layer 13C, and a colored layer 14C. The second layer 12C is arranged on a first surface (one surface) side of the first layer 11C. The second layer 12C is layered on the first surface of the first layer 11C. The first layer 11C and the second layer 12C are in contact with each other. The third layer 13C is arranged on a second surface side opposite to the first surface of the first layer 11C. The third layer 13C is layered on the second surface of the first layer 11C. The first layer 11C and the third layer 13C are in contact with each other. The first layer 11C is arranged between the second layer 12C and the third layer 13C to be sandwiched therebetween.

The colored layer 14C is embedded between the first layer 11C and the second layer 12C. On the other end 1Cb side of the interlayer film 1C, the colored layer 14C is embedded between the first layer 11C and the second layer 12C. On the other end 1Cb side in the widthwise direction of the interlayer film 1C, the colored layer 14C is embedded between the first layer 11C and the second layer 12C. The colored layer 14C, and the first layer 11C and the second layer 12C are in contact with each other.

A sectional shape in the thickness direction of the first layer 11C and the third layer 13C includes a wedge-like portion and a rectangular portion. A sectional shape in the thickness direction of the layer combining the second layer 12C and the colored layer 14C includes a wedge-like portion and a rectangular portion. The sectional shape in the thickness direction of the portion where the colored layer 14C does not exist in the layer combining the second layer 12C and the colored layer 14C is a wedge-like shape. The sectional shape in the thickness direction of the portion where the colored layer 14C exists in the layer combining the second layer 12C and the colored layer 14C is a rectangular shape. The thicknesses of the first layer 11C and the third layer 13C are larger at the other end 1Cb side than at one end 1Ca side.

In the interlayer film 1C, the thickness of the other end 1Cb is larger than the thickness of the one end 1Ca. A sectional shape in the thickness direction of the interlayer film 1C includes a wedge-like portion and a rectangular portion. In the portion where the sectional shape in the thickness direction of the interlayer film 1C is a wedge-like shape, the increment in thickness from the one end 1Ca side to the other end 1Cb side is constant.

The interlayer film 1C has the transparent part R1, the gradation part R2, and the dark color part R3. The transparent part R1 exists on the one end 1Ca side of the interlayer film 1C, the dark color part P3 exists on the other end 1Cb side of the interlayer film 1C, and the gradation part R2 exists between the transparent part R1 and the dark color part R3. The transparent part R1, the gradation part R2, and the dark color part R3 are continuous. The sectional shape in the thickness direction of the transparent part R1 is a wedge-like shape. The sectional shape in the thickness direction of the gradation part R2 and the dark color part R3 is a rectangular shape.

The transparent part R1 is configured by the first layer 11C, the second layer 12C, and the third layer 13C. The gradation part R2 and the dark color part R3 are configured by the first layer 11C, the second layer 12C, the third layer 13C, and the colored layer 14C. The gradation part R2 and the dark color part R3 constitute the shading region R4. The sectional shape in the thickness direction of the shading region R4 is a rectangular shape.

In the gradation part R2, the thickness of the colored layer 14C continuously increases from the one end 1Ca side to the other end 1Cb side. In the dark color part R3, the thickness of the colored layer 14C is uniform.

FIG. 5 is a sectional view schematically showing an interlayer film for laminated glass in accordance with a fifth embodiment of the present invention.

An interlayer film 1D shown in FIG. 5 is used for obtaining laminated glass. The interlayer film 1D is an interlayer film for laminated glass.

The interlayer film 1D has a lengthwise direction and a widthwise direction. In FIG. 5, the right and left direction is the widthwise direction, and the front and back direction is the lengthwise direction.

The interlayer film 1D includes a first layer 11D, a second layer 12D, a third layer 13D, and a colored layer 14D. The second layer 12D is arranged on a first surface (one surface) side of the first layer 11D. The second layer 12D is layered on the first surface of the first layer 11D. The first layer 11D and the second layer 12D are in contact with each other. The third layer 13D is arranged on a second surface side opposite to the first surface of the first layer 11D. The third layer 13D is layered on the second surface of the first layer 11D. The first layer 11D and the third layer 13D are in contact with each other. The first layer 11D is arranged between the second layer 12D and the third layer 13D to be sandwiched therebetween.

The colored layer 14D is embedded in the second layer 12D. On the other end 1Db side of the interlayer film 10, the colored layer 14D is embedded in the second layer 12D. On the other end 1Db side in the widthwise direction of the interlayer film 1D, the colored layer 14D is embedded in the second layer 120. The colored layer 14D and the first layer 11D are not in contact with each other.

The sectional shape in the thickness direction of each of the first layer 11D and the third layer 13D is a wedge-like shape. The sectional shape in the thickness direction of the layer combining the second layer 12D and the colored layer 14D is a wedge-like shape. The thicknesses of the first layer 11D and the third layer 13D are larger at the other end 1Db side than at one end 1Da side.

In the interlayer film 1D, the thickness of the other end 1Db is larger than the thickness of the one end 1Da. In the interlayer film 1D, the increment of the thickness is not constant from the one end 1Da side to the other end 1Db side.

The interlayer film 1D has a region where the thickness increases from the one end 1Da side to the other end 1Db side. The interlayer film 1D has a portion where the increment of the thickness decreases from the one end 1Da side to the other end 1Db side in the region where the thickness increases. The interlayer film 1D has a region with a sectional shape in the thickness direction of a wedge-like shape. The interlayer film 1D has a portion where the wedge angle decreases from the one end 1Da side to the other end 1Db side in the region with a sectional shape in the thickness direction of a wedge-like shape.

The interlayer film 1D has the transparent part R1, the gradation part R2, and the dark color part R3. The transparent part R1 exists on the one end 1Da side of the interlayer film 1D, the dark color part R3 exists on the other end 1Db side of the interlayer film 1D, and the gradation part R2 exists between the transparent part R1 and the dark color part R3. The transparent part R1, the gradation part R2, and the dark color part R3 are continuous.

The transparent part R1 is configured by the first layer 11D, the second layer 12D, and the third layer 13D. The gradation part R2 and the dark color part R3 are configured by the first layer 11D, the second layer 12D, the third layer 13D, and the colored layer 14D. The gradation part R2 and the dark color part R3 constitute the shading region R4.

In the gradation part R2, the thickness of the colored layer 14D continuously increases from the one end 1Da side to the other end 1Db side. In the dark color part R3, the thickness of the colored layer 14D is uniform.

FIG. 6 is a sectional view schematically showing an interlayer film for laminated glass in accordance with a sixth embodiment of the present invention.

An interlayer film 1E shown in FIG. 6 is used for obtaining laminated glass. The interlayer film 1E is an interlayer film for laminated glass.

The interlayer film 1E has a lengthwise direction and a widthwise direction. In FIG. 6, the right and left direction is the widthwise direction, and the front and back direction is the lengthwise direction.

The interlayer film 1E includes a first layer 11E, a second layer 12E, a third layer 13E, and a colored layer 14E. The second layer 12E is arranged on a first surface (one surface) side of the first layer 11E. The second layer 12E is layered on the first surface of the first layer 11E. The first layer 11E and the second layer 12E are in contact with each other. The third layer 13E is arranged on a second surface side opposite to the first surface of the first layer 11E. The third layer 13E is layered on the second surface of the first layer 11E. The first layer 11E and the third layer 13E are in contact with each other. The first layer 11E is arranged between the second layer 12E and the third layer 13E to be sandwiched therebetween.

The colored layer 14E is embedded between the first layer 11E and the second layer 12E. On the other end 1Eb side of the interlayer film 1E, the colored layer 14E is embedded between the first layer 11E and the second layer 12E. On the other end 1Eb side in the widthwise direction of the interlayer film 1E, the colored layer 14E is embedded between the first layer 11E and the second layer 12E. The colored layer 14E, and the first layer 11E and the second layer 12E are in contact with each other.

The sectional shape in the thickness direction of each of the first layer 11E and the third layer 13E is a wedge-like shape. The sectional shape in the thickness direction of the layer combining the second layer 12E and the colored layer 14E is a wedge-like shape. The thicknesses of the first layer 11E and the third layer 13E are larger at the other end 1Eb side than at one end 1Ea side.

In the interlayer film 1E, the thickness of the other end 1Eb is larger than the thickness of the one end 1Ea. In the interlayer film 1E, the increment of the thickness is not constant from the one end 1Ea side to the other end 1Eb side.

The interlayer film 1E has a region where the thickness increases from the one end 1Ea side to the other end 1Eb side. The interlayer film 1E has a portion where the increment of the thickness decreases from the one end 1Ea side to the other end 1Eb side in the region where the thickness increases. The interlayer film 1E has a region with a sectional shape in the thickness direction of a wedge-like shape. The interlayer film 1E has a portion where the wedge angle decreases from the one end 1Ea side to the other end 1Eb side in the region with a sectional shape in the thickness direction of a wedge-like shape.

The interlayer film 1E has the transparent part R1, the gradation part R2, and the dark color part R3. The transparent part R1 exists on the one end 1Ea side of the interlayer film 1E, the dark color part R3 exists on the other end 1Eb side of the interlayer film 1E, and the gradation part R2 exists between the transparent part R1 and the dark color part R3. The transparent part R1, the gradation part R2, and the dark color part R3 are continuous.

The transparent part R1 is configured by the first layer 11E, the second layer 12E, and the third layer 13E. The gradation part R2 and the dark color part R3 are configured by the first layer 11E, the second layer 12E, the third layer 13E, and the colored layer 14E. The gradation part R2 and the dark color part R3 constitute the shading region R4.

In the gradation part R2, the thickness of the colored layer 14E continuously increases from the one end 1Ea side to the other end 1Eb side. In the dark color part R3, the thickness of the colored layer 14E is uniform.

FIG. 7 is a sectional view schematically showing an interlayer film for laminated glass in accordance with a seventh embodiment of the present invention.

An interlayer film 1F shown in FIG. 7 is used for obtaining laminated glass. The interlayer film 1F is an interlayer film for laminated glass.

The interlayer film 1F has a lengthwise direction and a widthwise direction. In FIG. 7, the right and left direction is the widthwise direction, and the front and back direction is the lengthwise direction.

The interlayer film 1F includes an infrared reflective layer 15F, a second layer 12F, a third layer 13F, and a colored layer 14F. The second layer 12F is arranged on a first surface (one surface) side of the infrared reflective layer 15F. The second layer 12F is layered on the first surface of the infrared reflective layer 15F. The infrared reflective layer 15F and the second layer 12F are in contact with each other. The third layer 13F is arranged on a second surface side opposite to the first surface of the infrared reflective layer 15F. The third layer 13F is layered on the second surface of the infrared reflective layer 15F. The infrared reflective layer 15F and the third layer 13F are in contact with each other. The infrared reflective layer 15F is arranged between the second layer 12F and the third layer 13F to be sandwiched therebetween.

The colored layer 14F is embedded in the second layer 12F. On the other end 1Fb side of the interlayer film 1F, the colored layer 14F is embedded in the second layer 12F. On the other end 1Fb side in the widthwise direction of the interlayer film 1F, the colored layer 14F is embedded in the second layer 12F. The colored layer 14F and the infrared reflective layer 15F are not in contact with each other.

The sectional shape in the thickness direction of the infrared reflective layer 15F is a rectangular shape. The sectional shape in the thickness direction of the third layer 13F is a wedge-like shape. The sectional shape in the thickness direction of the layer combining the second layer 12F and the colored layer 14F is a rectangular shape. The thickness of the third layer 13F is larger at the other end 1Fb side than at the one end 1Fa side.

In the interlayer film 1F, the thickness of the other end 1Fb is larger than the thickness of the one end 1Fa. In the interlayer film 1F, the increment of the thickness is constant from the one end 1Fa side to the other end 1Fb side.

The interlayer film 1F has the transparent part R1, the gradation part R2, and the dark color part R3. The transparent part R1 exists on the one end 1Fa side of the interlayer film 1F, the dark color part R3 exists on the other end 1Fb side of the interlayer film 1F, and the gradation part R2 exists between the transparent part R1 and the dark color part R3. The transparent part R1, the gradation part R2, and the dark color part R3 are continuous.

The transparent part R1 is configured by the infrared reflective layer 15F, the second layer 12F, and the third layer 13F. The gradation part R2 and the dark color part R3 are configured by the infrared reflective layer 15F, the second layer 12F, the third layer 13F, and the colored layer 14F. The gradation part R2 and the dark color part R3 constitute the shading region R4.

In the gradation part R2, the thickness of the colored layer 14F continuously increases from the one end 1Fa side to the other end 1Fb side. In the dark color part R3, the thickness of the colored layer 14F is uniform.

FIG. 8 is a sectional view schematically showing an interlayer film for laminated glass in accordance with an eighth embodiment of the present invention.

An interlayer film 1G shown in FIG. 8 is used for obtaining laminated glass. The interlayer film 1G is an interlayer film for laminated glass.

The interlayer film 1G has a lengthwise direction and a widthwise direction. In FIG. 8, the right and left direction is the widthwise direction, and the front and back direction is the lengthwise direction.

The interlayer film 1G includes an infrared reflective layer 15G, a second layer 12G, a third layer 13G, and a colored layer 14G. The second layer 12G is arranged on a first surface (one surface) side of the infrared reflective layer 15G. The second layer 12G is layered on the first surface of the infrared reflective layer 15G. The infrared reflective layer 15G and the second layer 12G are in contact with each other. The third layer 13G is arranged on a second surface side opposite to the first surface of the infrared reflective layer 15G. The third layer 13G is layered on the second surface of the infrared reflective layer 15G. The infrared reflective layer 15G and the third layer 13G are in contact with each other. The infrared reflective layer 15G is arranged between the second layer 12G and the third layer 13G to be sandwiched therebetween.

The colored layer 14G is embedded between the infrared reflective layer 15G and the second layer 12G. On the other end 1Gb side of the interlayer film 1G, the colored layer 14G is embedded between the infrared reflective layer 15G and the second layer 12G. On the other end 1Gb side in the widthwise direction of the interlayer film. 1G, the colored layer 14G is embedded between the infrared reflective layer 15G and the second layer 12G. The colored layer 14G, and the infrared reflective layer 15G and the second layer 12G are in contact with each other.

The sectional shape in the thickness direction of the infrared reflective layer 15G is a rectangular shape. The sectional shape in the thickness direction of the third layer 13G is a wedge-like shape. The sectional shape in the thickness direction of the layer combining the second layer 12G and the colored layer 14G is a rectangular shape. The thickness of the third layer 13G is larger at the other end 1Gb side than at the one end 1Ga side.

In the interlayer film 1G, the thickness of the other end 1Gb is larger than the thickness of the one end 1Ga. In the interlayer film 1G, the increment of the thickness is constant from the one end 1Ga side to the other end 1Gb side.

The interlayer film 1G has the transparent part R1, the gradation part R2, and the dark color part R3. The transparent part R1 exists on the one end 1Ga side of the interlayer film 1G, the dark color part R3 exists on the other end 1Gb side of the interlayer film 1G, and the gradation part R2 exists between the transparent part R1 and the dark color part R3. The transparent part R1, the gradation part R2, and the dark color part R3 are continuous.

The transparent part R is configured by the infrared reflective layer 15G, the second layer 12G, and the third layer 13G. The gradation part R2 and the dark color part R3 are configured by the infrared reflective layer 15G, the second layer 12G, the third layer 13G, and the colored layer 14G. The gradation part R2 and the dark color part R3 constitute the shading region R4.

In the gradation part R2, the thickness of the colored layer 14G continuously increases from the one end 1Ga side to the other end 1Gb side. In the dark color part R3, the thickness of the colored layer 14G is uniform.

FIG. 9 is a sectional view schematically showing an interlayer film for laminated glass in accordance with a ninth embodiment of the present invention.

An interlayer film 1H shown in FIG. 9 is used for obtaining laminated glass. The interlayer film 18 is an interlayer film for laminated glass.

The interlayer film 1H has a lengthwise direction and a widthwise direction. In FIG. 9, the right and left direction is the widthwise direction, and the front and back direction is the lengthwise direction.

The interlayer film 1H includes an infrared reflective layer 15I, a second layer 12H, a third layer 13H, and a colored layer 14H. The second layer 12H is arranged on a first surface (one surface) side of the infrared reflective layer 15H. The second layer 12H is layered on the first surface of the infrared reflective layer 15H. The infrared reflective layer 15H and the second layer 12H are in contact with each other. The third layer 13H is arranged on a second surface side opposite to the first surface of the infrared reflective layer 15H. The third layer 13H is layered on the second surface of the infrared reflective layer 15H. The infrared reflective layer 15H and the third layer 13H are in contact with each other. The infrared reflective layer 15H is arranged between the second layer 12H and the third layer 13H to be sandwiched therebetween.

The colored layer 14H is embedded in the second layer 12H. On the other end 1Hb side of the interlayer film 1H, the colored layer 14H is embedded in the second layer 12H. On the other end 1Hb side in the widthwise direction of the interlayer film 1H, the colored layer 14H is embedded in the second layer 12H. The colored layer 14H and the infrared reflective layer 15H are not in contact with each other.

The sectional shape in the thickness direction of the infrared reflective layer 15H is a rectangular shape. The sectional shape in the thickness direction of the third layer 13H is a wedge-like shape. The sectional shape in the thickness direction of the layer combining the second layer 12H and the colored layer 14H is a rectangular shape. The thickness of the third layer 13H is larger at the other end 1Hb side than at the one end 1Ha side.

In the interlayer film 1H, the thickness of the other end 1Hb is larger than the thickness of the one end 1Ha. In the interlayer film 1H, the increment of the thickness is not constant from the one end 1Ha side to the other end 1Hb side.

The interlayer film 1H has a region where the thickness increases from the one end 1Ha side to the other end 1Hb side. The interlayer film 1H has a portion where the increment of the thickness decreases from the one end 1Ha side to the other end 1Hb side in the region where the thickness increases. The interlayer film 1H has a region with a sectional shape in the thickness direction of a wedge-like shape. The interlayer film 1H has a portion where the wedge angle decreases from the one end 1Ha side to the other end 1Hb side in the region with a sectional shape in the thickness direction of a wedge-like shape.

The interlayer film 1H has the transparent part R1, the gradation part P2, and the dark color part. R3. The transparent part R1 exists on the one end 1Ha side of the interlayer film 1H, the dark color part R3 exists on the other end 1Hb side of the interlayer film 1H, and the gradation part R2 exists between the transparent part R1 and the dark color part R3. The transparent part R1, the gradation part R2, and the dark color part R3 are continuous.

The transparent part R1 is configured by the infrared reflective layer 15H, the second layer 12H, and the third layer 13H. The gradation part R2 and the dark color part R3 are configured by the infrared reflective layer 15H, the second layer 12I, the third layer 13H, and the colored layer 14H. The gradation part R2 and the dark color part R3 constitute the shading region R4.

In the gradation part R2, the thickness of the colored layer 14H continuously increases from the one end 1Ha side to the other end 1Hb side. In the dark color part R3, the thickness of the colored layer 14H is uniform.

FIG. 10 is a sectional view schematically showing an interlayer film for laminated glass in accordance with a tenth embodiment of the present invention.

An interlayer film 1I shown in FIG. 10 is used for obtaining laminated glass. The interlayer film 1I is an interlayer film for laminated glass.

The interlayer film 1I has a lengthwise direction and a widthwise direction. In FIG. 10, the right and left direction is the widthwise direction, and the front and back direction is the lengthwise direction.

The interlayer film 1I includes an infrared reflective layer 15I, a second layer 12I, a third layer 13I, and a colored layer 14I. The second layer 12I is arranged on a first surface (one surface) side of the infrared reflective layer 15I. The second layer 12I is layered on the first surface of the infrared reflective layer 15I. The infrared reflective layer 15I and the second layer 12I are in contact with each other. The third layer 13I is arranged on a second surface side opposite to the first surface of the infrared reflective layer 15I. The third layer 13I is layered on the second surface of the infrared reflective layer 15I. The infrared reflective layer 15I and the third layer 13I are in contact with each other. The infrared reflective layer 15I is arranged between the second layer 12I and the third layer 13I to be sandwiched therebetween.

The colored layer 14I is embedded between the infrared reflective layer 15I and the second layer 12I. On the other end 1Ib side of the interlayer film 1I, the colored layer 14I is embedded between the infrared reflective layer 15I and the second layer 12I. On the other end 1Ib side in the widthwise direction of the interlayer film 1I, the colored layer 14I is embedded between the infrared reflective layer 15I and the second layer 12I. The colored layer 14I, and the infrared reflective layer 15I and the second layer 12I are in contact with each other.

The sectional shape in the thickness direction of the infrared reflective layer 15I is a rectangular shape. The sectional shape in the thickness direction of the third layer 13I is a wedge-like shape. The sectional shape in the thickness direction of the layer combining the second layer 12I and the colored layer 14I is a rectangular shape. The thickness of the third layer 13I is larger at the other end 1Ib side than at the one end 1Ia side.

In the interlayer film 1I, the thickness of the other end 1Ib is larger than the thickness of the one end 1Ia. In the interlayer film 1I, the increment of the thickness is not constant from the one end 1Ia side to the other end 1Ib side.

The interlayer film 1I has a region where the thickness increases from the one end 1Ia side to the other end 1Ib side. The interlayer film 1I has a portion where the increment of the thickness decreases from the one end 1Ia side to the other end 1Ib side in the region where the thickness increases. The interlayer film 1I has a region with a sectional shape in the thickness direction of a wedge-like shape. The interlayer film 1I has a portion where the wedge angle decreases from the one end 1Ia side to the other end 1Ib side in the region with a sectional shape in the thickness direction of a wedge-like shape.

The interlayer film 1I has the transparent part R1, the gradation part R2, and the dark color part R3. The transparent part R1 exists on the one end 1Ia side of the interlayer film 1I, the dark color part R3 exists on the other end 1Ib side of the interlayer film 1I, and the gradation part R2 exists between the transparent part R1 and the dark color part R3. The transparent part R1, the gradation part R2, and the dark color part R3 are continuous.

The transparent part R1 is configured by the infrared reflective layer 15I, the second layer 12I, and the third layer 13I. The gradation part R2 and the dark color part R3 are configured by the infrared reflective layer 15I, the second layer 12I, the third layer 13I, and the colored layer 14I. The gradation part R2 and the dark color part R3 constitute the shading region R4.

In the gradation part R2, the thickness of the colored layer 14I continuously increases from the one end 1Ia side to the other end 1Ib side. In the dark color part R3, the thickness of the colored layer 14I is uniform.

FIG. 11 is a sectional view schematically showing an interlayer film for laminated glass in accordance with an eleventh embodiment of the present invention.

An interlayer film 1J shown in FIG. 11 is used for obtaining laminated glass. The interlayer film 1J is an interlayer film for laminated glass.

The interlayer film 1J has a lengthwise direction and a widthwise direction. In FIG. 11, the right and left direction is the widthwise direction, and the front and back direction is the lengthwise direction.

The interlayer film 1J includes an infrared reflective layer 15J, a second layer 12J, a third layer 13J, and a colored layer 14J. The second layer 12J is arranged on a first surface (one surface) side of the infrared reflective layer 15J. The second layer 12J is layered on the first surface of the infrared reflective layer 15J. The infrared reflective layer 15J and the second layer 12J are in contact with each other. The third layer 13J is arranged on a second surface side opposite to the first surface of the infrared reflective layer 15J. The third layer 13J is layered on the second surface of the infrared reflective layer 15J. The infrared reflective layer 15J and the third layer 13J are in contact with each other. The infrared reflective layer 15J is arranged between the second layer 12J and the third layer 13J to be sandwiched therebetween.

The colored layer 14J is embedded in the second layer 12J. On the other end 1Jb side of the interlayer film 1J, the colored layer 14J is embedded in the second layer 12J. On the other end 1Jb side in the widthwise direction of the interlayer film 1J, the colored layer 14J is embedded in the second layer 12J. The colored layer 14J and the infrared reflective layer 15J are not in contact with each other.

The sectional shape in the thickness direction of the infrared reflective layer 15J is a rectangular shape. A sectional shape in the thickness direction of the third layer 13J includes a wedge-like portion and a rectangular portion. The sectional shape in the thickness direction of the layer combining the second layer 12J and the colored layer 14J is a rectangular shape. The thickness of the third layer 13J is larger at the other end 1Jb side than at the one end 1Ja side.

In the interlayer film 1J, the thickness of the other end 1Jb is larger than the thickness of the one end 1Ja. A sectional shape in the thickness direction of the interlayer film 1J includes a wedge-like portion and a rectangular portion. In the portion where the sectional shape in the thickness direction of the interlayer film 1J is a wedge-like shape, the increment in thickness from the one end 1Ja side to the other end 1Jb side is constant.

The interlayer film 1J has the transparent part R1, the gradation part R2, and the dark color part R3. The transparent part R1 exists on the one end 1Ja side of the interlayer film 1J, the dark color part R3 exists on the other end 1Jb side of the interlayer film 1J, and the gradation part R2 exists between the transparent part R1 and the dark color part R3. The transparent part R1, the gradation part R2, and the dark color part R3 are continuous. The sectional shape in the thickness direction of the transparent part R1 is a wedge-like shape. The sectional shape in the thickness direction of the gradation part R2 and the dark color part R3 is a rectangular shape.

The transparent part R1 is configured by the infrared reflective layer 15J, the second layer 12J, and the third layer 13J. The gradation part R2 and the dark color part R3 are configured by the infrared reflective layer 15J, the second layer 12J, the third layer 13J, and the colored layer 14J. The gradation part R2 and the dark color part R3 constitute the shading region R4. The sectional shape in the thickness direction of the shading region R4 is a rectangular shape.

In the gradation part R2, the thickness of the colored layer 14J continuously increases from the one end 1Ja side to the other end 1Jb side. In the dark color part R3, the thickness of the colored layer 143 is uniform.

FIG. 12 is a sectional view schematically showing an interlayer film for laminated glass in accordance with a twelfth embodiment of the present invention.

An interlayer film 1K shown in FIG. 12 is used for obtaining laminated glass. The interlayer film 1K is an interlayer film for laminated glass.

The interlayer film 1K has a lengthwise direction and a widthwise direction. In FIG. 12, the right and left direction is the widthwise direction, and the front and back direction is the lengthwise direction.

The interlayer film 1K includes an infrared reflective layer 15K, a second layer 12K, a third layer 13K, and a colored layer 14K. The second layer 12K is arranged on a first surface (one surface) side of the infrared reflective layer 15K. The second layer 12K is layered on the first surface of the infrared reflective layer 15K. The infrared reflective layer 15K and the second layer 12K are in contact with each other. The third layer 13K is arranged on a second surface side opposite to the first surface of the infrared reflective layer 15K. The third layer 13K is layered on the second surface of the infrared reflective layer 15K. The infrared reflective layer 15K and the third layer 13K are in contact with each other. The infrared reflective layer 15K is arranged between the second layer 12K and the third layer 13K to be sandwiched therebetween.

The colored layer 14K is embedded between the infrared reflective layer 15K and the second layer 12K. On the other end 1Kb side of the interlayer film 1K, the colored layer 14K is embedded between the infrared reflective layer 15K and the second layer 12K. On the other end 1Kb side in the widthwise direction of the interlayer film 1K, the colored layer 14K is embedded between the infrared reflective layer 15K and the second layer 12K. The colored layer 14K, and the infrared reflective layer 15K and the second layer 12K are in contact with each other.

The sectional shape in the thickness direction of the infrared reflective layer 15K is a rectangular shape. A sectional shape in the thickness direction of the third layer 13K includes a wedge-like portion and a rectangular portion. The sectional shape in the thickness direction of the layer combining the second layer 12K and the colored layer 14K is a rectangular shape. The thickness of the third layer 13K is larger at the other end 1Kb side than at the one end 1Ka side.

In the interlayer film 1K, the thickness of the other end 1Kb is larger than the thickness of the one end 1Ka. A sectional shape in the thickness direction of the interlayer film 1K includes a wedge-like portion and a rectangular portion. In the portion where the sectional shape in the thickness direction of the interlayer film 1K is a wedge-like shape, the increment in thickness from the one end 1Ka side to the other end 1Kb side is constant.

The interlayer film 1K has the transparent part R1, the gradation part R2, and the dark color part R3. The transparent part R1 exists on the one end 1Ka side of the interlayer film 1K, the dark color part R3 exists on the other end 1Kb side of the interlayer film 1K, and the gradation part R2 exists between the transparent part R1 and the dark color part R3. The transparent part R1, the gradation part R2, and the dark color part R3 are continuous. The sectional shape in the thickness direction of the transparent part R1 is a wedge-like shape. The sectional shape in the thickness direction of the gradation part R2 and the dark color part R3 is a rectangular shape.

The transparent part R1 is configured by the infrared reflective layer 15K, the second layer 12K, and the third layer 13K. The gradation part R2 and the dark color part R3 are configured by the infrared reflective layer 15K, the second layer 12K, the third layer 13K, and the colored layer 14K. The gradation part R2 and the dark color part R3 constitute the shading region R4. The sectional shape in the thickness direction of the shading region R4 is a rectangular shape.

In the gradation part R2, the thickness of the colored layer 14K continuously increases from the one end 1Ka side to the other end 1Kb side. In the dark color part R3, the thickness of the colored layer 14K is uniform.

FIG. 13 is a sectional view schematically showing an interlayer film for laminated glass in accordance with a thirteenth embodiment of the present invention.

An interlayer film 1L shown in FIG. 13 is used for obtaining laminated glass. The interlayer film 1L is an interlayer film for laminated glass.

The interlayer film 1L has a lengthwise direction and a widthwise direction. In FIG. 13, the right and left direction is the widthwise direction, and the front and back direction is the lengthwise direction.

The interlayer film 1L includes a first layer 11L and a colored layer 14L.

The colored layer 14L is embedded in the first layer 11L. On the other end 1Lb side of the interlayer film 1L, the colored layer 14L is embedded in the first layer 11L. On the other end 1Lb side in the widthwise direction of the interlayer film 1L, the colored layer 14L is embedded in the first layer 11L.

In the interlayer film 1L, the thickness of the other end 1Lb is larger than the thickness of the one end 1La. The sectional shape in the thickness direction of the interlayer film 1L is a wedge-like shape. The sectional shape in the thickness direction of the layer combining the first layer 11L and the colored layer 14L is a wedge-like shape. In the interlayer film 1L, the increment of the thickness is constant from the one end 1La side to the other end 1Lb side.

The interlayer film 1L has the transparent part R1, the gradation part R2, and the dark color part R3. The transparent part R1 exists on the one end 1La side of the interlayer film 1L, the dark color part R3 exists on the other end 1Lb side of the interlayer film 1L, and the gradation part R2 exists between the transparent part R1 and the dark color part R3. The transparent part R1, the gradation part R2, and the dark color part R3 are continuous.

The transparent part R1 is configured by the first layer 11L. The gradation part R2 and the dark color part R3 are configured by the first layer 11L and the colored layer 14L. The gradation part R2 and the dark color part R3 constitute the shading region R4.

In the gradation part R2, the thickness of the colored layer 14L continuously increases from the one end 1La side to the other end 1Lb side. In the dark color part R3, the thickness of the colored layer 14L is uniform.

The interlayer film 1L shown in FIG. 13 is an interlayer film including a first layer and a colored layer, and having a profile shown in FIG. 1. The interlayer film may be an interlayer film including a first layer and a colored layer and having a profile shown in FIG. 3 or 5.

FIG. 14 is a sectional view schematically showing an interlayer film for laminated glass in accordance with a fourteenth embodiment of the present invention.

An interlayer film 1M shown in FIG. 14 is used for obtaining laminated glass. The interlayer film 1M is an interlayer film for laminated glass.

The interlayer film 1M has a lengthwise direction and a widthwise direction. In FIG. 14, the right and left direction is the widthwise direction, and the front and back direction is the lengthwise direction.

The interlayer film 1M includes a first layer 11M and a colored layer 14M.

The colored layer 14M is embedded in the first layer 11M. On the other end 1Mb side of the interlayer film 1M, the colored layer 14M is embedded in the first layer 11M. On the other end 1Mb side in the widthwise direction of the interlayer film 1M, the colored layer 14M is embedded in the first layer 11M.

In the interlayer film 1M, the thickness of the other end 1Mb is larger than the thickness of the one end 1Ma. A sectional shape in the thickness direction of the interlayer film 1M includes a wedge-like portion and a rectangular portion. A sectional shape in the thickness direction of the layer combining the first layer 11M and the colored layer 14M includes a wedge-like portion and a rectangular portion. In the interlayer film 1M, the increment of the thickness of the portion where the thickness increases from the one end 1Ma side to the other end 1Mb side is constant.

The interlayer film 1M has the transparent part R1, the gradation part R2, and the dark color part R3. The transparent part R1 exists on the one end 1Ma side of the interlayer film 1M, the dark color part R3 exists on the other end 1M side of the interlayer film 1M, and the gradation part R2 exists between the transparent part R1 and the dark color part R3. The transparent part R1, the gradation part R2, and the dark color part R3 are continuous. The sectional shape in the thickness direction of the transparent part R1 and the gradation part R2 is a wedge-like shape. The sectional shape in the thickness direction of the dark color part R3 is a rectangular shape.

The transparent part R1 is configured by the first layer 11M. The gradation part R2 and the dark color part R3 are configured by the first layer 11M and the colored layer 14M. The gradation part R2 and the dark color part R3 constitute the shading region R4. A sectional shape in the thickness direction of the shading region R4 includes a wedge-like portion and a rectangular portion.

In the gradation part R2, the thickness of the colored layer 14M continuously increases from the one end 1Ma side to the other end 1Mb side. In the dark color part R3, the thickness of the colored layer 14M is uniform.

In the interlayer films 1, 1A to 1M shown in FIGS. 1 to 14, the gradation part is formed by variation in the thickness of the colored layer. In the interlayer film according to the present invention, the gradation part may be formed by variation in the density of the coloring agent contained in the colored layer. For example, in the interlayer film, the gradation part may be formed as the density of the coloring agent contained in the colored layer increases from the one end side to the other end side.

In the interlayer films 1B, 1C, 1J, 1K shown in FIGS. 3, 4, 11, 12, the transparent part is configured by a portion where the sectional shape in the thickness direction of the interlayer film is a wedge-like shape, and the gradation part and the dark color part are configured by a portion where the sectional shape in the thickness direction is a rectangular shape. In the interlayer film 1M shown in FIG. 14, the transparent part and the gradation part are configured by a portion where the sectional shape in the thickness direction of the interlayer film is a wedge-like shape, and the dark color part is configured by a portion where the sectional shape in the thickness direction is a rectangular shape. In the present invention, as in the interlayer film having the shape shown in FIG. 14, the transparent part may have a portion where the sectional shape in the thickness direction of the interlayer film is a rectangular shape, and the gradation part and the dark color part may have a portion where the sectional shape in the thickness direction of the interlayer film is a wedge-like shape.

The interlayer film may have a portion where the increment of the thickness increases from the one end side to the other end side in the region where the thickness increases. The interlayer film may have a portion where the wedge angle increases from the one end side to the other end side in the region with a sectional shape in the thickness direction of a wedge-like shape.

The gradation part is a region where parallel light transmittance continuously reduces from the one end side to the other end side and an absolute value of a variation rate in parallel light transmittance is more than 0.3%/mm when the parallel light transmittance is measured for laminated glass X. The gradation part may include a portion having a parallel light transmittance of 60% or more. The gradation part includes one or more points A having a variation rate in parallel light transmittance of more than 0.3%/mm. The number of points A where an absolute value of a variation rate in parallel light transmittance is more than 0.3%/mm contained in the gradation part is preferably 1 or more, more preferably 2 or more, further preferably 3 or more, especially preferably 4 or more, most preferably 5 or more. The number of points A where an absolute value of a variation rate in parallel light transmittance is more than 0.3%/mm contained in the gradation part may be 1500 or less, and may be 1450 or less.

The transparent part is a region located closer to the one end side than the gradation part and having a parallel light transmittance of 60% or more when the parallel light transmittance is measured for laminated glass X. The parallel light transmittance of the transparent part is preferably 61% or more, more preferably 62% or more.

The dark color part is a region located closer to the other end side than the gradation part and including one or more points A where an absolute value of a variation rate in parallel light transmittance is 0.3%/mm or less when the parallel light transmittance is measured for laminated glass X. From the viewpoint of further suppressing color unevenness in the shading region, an absolute value of a variation rate in parallel light transmittance at point A where an absolute value of a variation rate in parallel light transmittance is 0.3%/mm or less is preferably 0.29%/mm or less, more preferably 0.28%/mm or less. From the viewpoint of further suppressing color unevenness in the shading region, it is preferred that the dark color part include a point where an absolute value of a variation rate in parallel light transmittance is 0.29%/mm or less, and it is more preferred that the dark color part include a point where an absolute value of a variation rate in parallel light transmittance is 0.28%/mm or less. From the viewpoint of still further suppressing color unevenness in the shading region, it is preferred that the dark color part include a point where an absolute value of a variation rate in parallel light transmittance is 0.27%/mm or less, and it is more preferred that the dark color part include a point where an absolute value of a variation rate in parallel light transmittance is 0.26%/mm or less.

The interlayer film has a dark color part containing one or more points A where an absolute value of a variation rate in parallel light transmittance is 0.3%/mm or less. The number of points A where an absolute value of a variation rate in parallel light transmittance is 0.3%/mm or less, contained in the dark color part is preferably 2 or more, more preferably 3 or more, further preferably 4 or more, especially preferably 5 or more, most preferably 6 or more. When the number of points A where an absolute value of a variation rate in parallel light transmittance is 0.3%/mm or less, contained in the dark color part is large, the color unevenness in the shading region is further suppressed. The number of points A where an absolute value of a variation rate in parallel light transmittance is 0.3%/mm or less contained in the dark color part may be 300 or less, and may be 299 or less.

The interlayer film may have a uniform-thickness part. The uniform-thickness part means that the variation in thickness does not exceed 10 μm per a distance range of 10 cm in the direction connecting the one end and the other end of the interlayer film. Therefore, the uniform-thickness part refers to the part where the variation in thickness does not exceed 10 μm per a distance range of 10 cm in the direction connecting the one end and the other end of the interlayer film. To be more specific, the uniform-thickness part refers to the part where the thickness does not vary at all in the direction connecting the one end and the other end of the interlayer film, or the thickness varies by 10 μm or less per a distance range of 10 cm in the direction connecting the one end and the other end of the interlayer film.

It is preferred that the uniform-thickness part be located closer to the other end side than the middle position between the one end and the other end of the interlayer film. It is preferred that the middle position of the uniform-thickness part be located closer to the other end side than the middle position between the one end and the other end of the interlayer film. It is preferred that the distance between the middle position of the uniform-thickness part and the other end be shorter than the distance between the middle position of the uniform-thickness part and the one end. It is preferred that the uniform-thickness part be located in the dark color part. It is preferred that the middle position of the uniform-thickness part be located in the dark color part. In these cases, it is possible to adjust the absolute value of "variation rate in parallel light transmittance at point A" more easily.

The distance of the transparent part in the direction connecting the one end and the other end of the interlayer film is defined as a distance L1. The distance of the gradation part in the direction connecting the one end and the other end of the interlayer film is defined as a distance L2. The distance of the dark color part in the direction connecting the one end and the other end of the interlayer film is defined as a distance L3. The distances L1, L2, L3 are distances shown in FIGS. 1 to 14. When the interlayer film has a uniform-thickness part, the distance of the uniform-thickness part in the direction connecting the one end and the other end of the interlayer film is defined as a distance L4.

The distance L1 is preferably 10 mm or more, more preferably 20 mm or more, and is preferably 3000 mm or less, more preferably 2990 mm or less.

The distance L2 is preferably 10 mm or more, more preferably 20 mm or more, and is preferably 3000 mm or less, more preferably 2990 mm or less.

The distance L3 is preferably 50 mm or more, more preferably 60 mm or more, and is preferably 3000 mm or less, more preferably 2990 mm or less.

The distance L4 is preferably 10 mm or more, more preferably 20 mm or more, and is preferably 3000 mm or less, more preferably 2990 mm or less.

The distance of the interlayer film in the direction connecting the one end and the other end of the interlayer film is defined as a distance L.

A ratio of the distance L1 to the distance L (distance L1/distance L) is preferably 0.02 or more, more preferably 0.03 or more, and is preferably 0.98 or less, more preferably 0.97 or less.

A ratio of the distance L2 to the distance L (distance L2/distance L) is preferably 0.02 or more, more preferably 0.03 or more, and is preferably 0.98 or less, more preferably 0.97 or less.

A ratio of the distance L3 to the distance L (distance L3/distance L) is preferably 0.05 or more, more preferably 0.051 or more, and is preferably 0.98 or less, more preferably 0.97 or less.

A ratio of the distance L4 to the distance L (distance L3/distance L) is preferably 0.02 or more, more preferably 0.03 or more, and is preferably 0.98 or less, more preferably 0.97 or less.

It is preferred that the interlayer film have a minimum thickness in the region at a distance of 0 L to 0.2 L from the one end toward the other end, and a maximum thickness in the region at a distance of 0 L to 0.2 L from the other end toward the one end. In this case, the minimum thickness and the maximum thickness are only required to exist at any position in the region at a distance of 0 L to 0.2 L. It is more preferred that the interlayer film have a minimum thickness in the region at a distance of 0 L to 0.1 L from the one end toward the other end, and a maximum thickness in the region at a distance of 0 L to 0.1 L from the other end toward the one end. It is preferred that the interlayer film have a minimum thickness at the one end and the interlayer film have a maximum thickness at the other end.

It is preferred that the interlayer film have a uniform-thickness part in the region at a distance of 0 L to 0.98 L from the other end toward the one end. In this case, the uniform-thickness part is only required to exist at any position in the region at a distance of 0 L to 0.98 L.

The maximum thickness of the interlayer film is preferably 0.1 mm or more, more preferably 0.25 mm or more, further preferably 0.5 mm or more, especially preferably 0.8 mm or more and is preferably 3 mm or less, more preferably 2.9 mm or less. When the thickness of the interlayer film is the above lower limit or more, the penetration resistance and the flexural rigidity of laminated glass are further enhanced. When the thickness of the interlayer film is the above upper limit or less, the transparency of the interlayer film and the laminated glass is further improved.

An average thickness of the interlayer film is defined as T.

In a multi-layered interlayer film, the average thickness of the first layer is preferably 0.035 T or more, more preferably 0.0625 T or more, further preferably 0.1 T or more, and is preferably 0.4 T or less, more preferably 0.375 T or less, further preferably 0.25 T or less, especially preferably 0.15 T or less. When the average thickness of the first layer is 0.4 T or less, the flexural rigidity is further improved.

The average thickness of the infrared reflective layer is preferably 0.035 T or more, more preferably 0.0625 T or more, further preferably 0.1 T or more, and is preferably 0.4 T or less, more preferably 0.375 T or less, further preferably 0.25 T or less, especially preferably 0.15 T or less.

The average thickness of the colored layer is preferably 0.01 T or more, more preferably 0.02 T or more, further preferably 0.03 T or more, and is preferably 0.04 T or less, more preferably 0.99 T or less, further preferably 0.98 T or less, especially preferably 0.97 T or less. The average thickness of the colored layer may be 0.9 T or less, may be 0.8 T or less, may be 0.7 T or less, may be 0.6 T or less, may be 0.5 T or less, may be 0.4 T or less, may be 0.3 T or less, or may be 0.2 T or less.

The average thickness of each of the second layer and the third layer is preferably 0.3 T or more, more preferably 0.3125 T or more, further preferably 0.375 T or more, and is preferably 0.97 T or less, more preferably 0.9375 T or less, further preferably 0.9 T or less. The average thickness of each of the second layer and the third layer may be 0.46875 T or less, and may be 0.45 T or less. When the thickness of each of the second layer and the third layer is the above-described lower limit or more and the above-described upper limit or less, the rigidity and the sound insulating property of the laminated glass are further enhanced.

The total of average thicknesses of the second layer and the third layer is preferably 0.625 T or more, more preferably 0.75 T or more, further preferably 0.85 T or more, and is preferably 0.97 T or less, more preferably 0.9375 T or less, further preferably 0.9 T or less. When the total of average thicknesses of the second layer and the third layer is the above-described lower limit or more and the above-described upper limit or less, the rigidity and the sound insulating property of the laminated glass are further enhanced.

The total of average thicknesses of the colored layer, the second layer and the third layer is preferably 0.625 T or more, more preferably 0.75 T or more, further preferably 0.85 T or more, and is preferably 0.97 T or less, more preferably 0.9375 T or less, further preferably 0.9 T or less. When the total of average thicknesses of the second layer and the third layer is the above-described lower limit or more and the above-described upper limit or less, the rigidity and the sound insulating property of the laminated glass are further enhanced.

In order to suppress double images, the wedge angle (θ) of the interlayer film can be appropriately set according to the fitting angle of laminated glass. The wedge angle (θ) is a wedge angle of the interlayer film as a whole.

From the viewpoint of further suppressing double images, the wedge angle (θ) of the interlayer film is preferably 0.1 mrad (0.00575 degrees) or more, more preferably 0.2 mrad (0.0115 degrees) or more, and is preferably 2 mrad (0.1146 degrees) or less, more preferably 0.7 mrad (0.0401 degrees) or less. When the wedge angle (θ) is the above lower limit or more, it is possible to obtain laminated glass suited for cars such as a truck or a bus in which the attachment angle of the windshield is large. When the wedge angle (θ) is the above upper limit or less, it is possible to obtain laminated glass suited for cars such as a sports car in which the attachment angle of the windshield is small.

The wedge angle (θ) of the interlayer film is an interior angle formed at the intersection point between a straight line connecting surface parts on the one side of the interlayer film (first surface part) of the maximum thickness part and the minimum thickness part in the interlayer film, and a straight line connecting surface parts of the other side of the interlayer film (second surface part) of the maximum thickness part and the minimum thickness part in the interlayer film.

A wedge angle (e) of the interlayer film can be approximately calculated in the following manner. Thickness of the interlayer film is measured at each of the maximum thickness part and the minimum thickness part. On the basis of the result of (absolute value of difference between thickness in maximum thickness part of interlayer film and thickness in minimum thickness part of interlayer film (μm)+distance between maximum thickness part and minimum thickness part (mm)), a wedge angle (θ) of the interlayer film is approximately calculated.

As a measuring device for use for measurement of a wedge angle θ of the interlayer film, and a thickness of the interlayer film, a contact type thickness measuring instrument "TOF-4R" (available from Yamabun Electronics Co., Ltd.) or the like can be recited.

Measurement of the thickness is conducted such that the distance is the shortest from the one end toward the other end by using the above-described measuring device at a film conveyance speed of 2.15 mm/minute to 2.25 mm/minute.

As a measuring device for use for measurement of a wedge angle (θ) of the interlayer film, and a thickness of the interlayer film after the interlayer film is made into laminated glass, a non-contact type multilayer film thickness measuring instrument "OPTIGAUGE" (available from Lumetrics, Inc.) or the like can be recited. Use of the measuring instrument makes it possible to measure the thickness of the interlayer film while the interlayer film is in the laminated glass.

The shortest distance between the surface in the thickness direction of the interlayer film and the surface in the thickness direction of the colored layer is preferably 10 μm or more, more preferably 20 μm or more, and is preferably 3000 μm or less, more preferably 2990 μm or less. When the shortest distance is the above lower limit or more and the above upper limit or less, color migration can be effectively suppressed.

Hereinafter, materials that can be used in the interlayer film according to the present invention are specifically described.

(Thermoplastic Resin)

It is preferred that the interlayer film contain a thermoplastic resin (hereinafter, sometimes described as a thermoplastic resin (0)). It is preferred that the interlayer film contain a polyvinyl acetal resin (hereinafter, sometimes described as a polyvinyl acetal resin (0)) as the thermoplastic resin (0). It is preferred that the first layer contain a thermoplastic resin (hereinafter, sometimes described as a thermoplastic resin (1)). It is preferred that the first layer contain a polyvinyl acetal resin (hereinafter, sometimes described as a polyvinyl acetal resin (1)) as the thermoplastic resin (1). It is preferred that the second layer contain a thermoplastic resin (hereinafter, sometimes described as a thermoplastic resin (2)). It is preferred that the second layer contain a polyvinyl acetal resin (hereinafter, sometimes described as a polyvinyl acetal resin (2)) as the thermoplastic resin (2). It is preferred that the third layer contain a thermoplastic resin (hereinafter, sometimes described as a thermoplastic resin (3)). It is preferred that the third layer contain a polyvinyl acetal resin (hereinafter, sometimes described as a polyvinyl acetal resin (3)) as the thermoplastic resin (3). It is preferred that the colored layer contain a thermoplastic resin (hereinafter, sometimes described as a thermoplastic resin (4)). It is preferred that the colored layer contain a polyvinyl acetal resin (hereinafter, sometimes described as a polyvinyl acetal resin (4)) as the thermoplastic resin (4). The thermoplastic resin (1), the thermoplastic resin (2), the thermoplastic resin (3), and the thermoplastic resin (4) may be the same or different from one another. For still higher sound insulating property, it is preferred that the thermoplastic resin (1) be different from the thermoplastic resin (2) and the thermoplastic resin (3). Each of the polyvinyl acetal resin (1), the polyvinyl acetal resin (2), the polyvinyl acetal resin (3), and the polyvinyl acetal resin (4) may be the same or different from one another. For still higher sound insulating property, it is preferred that the polyvinyl acetal resin (1) be different from the polyvinyl acetal resin (2) and the polyvinyl acetal resin (3). One kind of each of the thermoplastic resin (0), the thermoplastic resin (1), the thermoplastic resin (2), the thermoplastic resin (3), and the thermoplastic resin (4) may be used alone and two or more kinds thereof may be used in combination. One kind of each of the polyvinyl acetal resin (0), the polyvinyl acetal resin (1), the polyvinyl acetal resin (2), the polyvinyl acetal resin (3), and the polyvinyl acetal resin (4) may be used alone and two or more kinds thereof may be used in combination.

Examples of the thermoplastic resin include a polyvinyl acetal resin, an ethylene-vinyl acetate copolymer resin, an ethylene-acrylic acid copolymer resin, a polyurethane resin, an ionomer resin, a polyvinyl alcohol resin, and the like. Thermoplastic resins other than these may be used.

For example, the polyvinyl acetal resin can be produced by acetalizing polyvinyl alcohol (PVA) with an aldehyde. It is preferred that the polyvinyl acetal resin be an acetalized product of polyvinyl alcohol. For example, the polyvinyl alcohol can be obtained by saponifying polyvinyl acetate. The saponification degree of the polyvinyl alcohol generally lies within the range of 70% by mole to 99.9% by mole.

The average polymerization degree of the polyvinyl alcohol (PVA) is preferably 200 or more, more preferably 500 or more, still more preferably 1500 or more, further preferably 1600 or more, especially preferably 2600 or more, most preferably 2700 or more, and is preferably 5000 or less, more preferably 4000 or less, further preferably 3500 or less. When the average polymerization degree is the above lower limit or more, the penetration resistance of laminated glass is further enhanced. When the average polymerization degree is the above upper limit or less, formation of an interlayer film is facilitated.

The polymerization degree of the polyvinyl acetate is determined by a method conforming to JIS K6726 "Testing methods for polyvinyl acetate".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin fall within the range of 3 to 5 and it is more preferred that the number of carbon atoms of the acetal group be 3 or 4. When the number of carbon atoms of the acetal group in the polyvinyl acetal resin is 3 or more, the glass transition temperature of the interlayer film is sufficiently lowered. The number of carbon atoms of the acetal group in the polyvinyl acetal resin may be 4 or 5.

Aldehyde is not particularly limited. In general, an aldehyde with 1 to 10 carbon atoms is preferably used. Examples of the aldehyde with 1 to 10 carbon atoms include propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, benzaldehyde, and the like. The aldehyde is preferably propionaldehyde, n-butyraldehyde, isobutyraldehyde, n-hexylaldehyde, or n-valeraldehyde, more preferably propionaldehyde, n-butyraldehyde, or isobutyraldehyde, and further preferably n-butyraldehyde. One kind of the aldehyde may be used alone, and two or more kinds thereof may be used in combination.

The content of the hydroxyl group (the amount of hydroxyl groups) of the polyvinyl acetal resin (0) is preferably 15% by mole or more, more preferably 16% by mole or more and is preferably 40% by mole or less, more preferably 35% by mole or less. When the content of the hydroxyl group is the above lower limit or more, the adhesive strength of the interlayer film is further enhanced. Moreover, when the content of the hydroxyl group is the above upper limit or less, the flexibility of the interlayer film is enhanced and the handling of the interlayer film is facilitated.

A content of the hydroxyl group (the amount of hydroxyl groups) of the polyvinyl acetal resin (1) is preferably 17% by mole or more, more preferably 20% by mole or more, further preferably 22% by mole or more and is preferably 28% by mole or less, more preferably 27; by mole or less, further preferably 25% by mole or less, especially preferably 24% by mole or less. When the content of the hydroxyl group is the above lower limit or more, the mechanical strength of the interlayer film is further enhanced. In particular, when the content of the hydroxyl group of the polyvinyl acetal resin (1) is 20% by mole or more, the resin is high in reaction efficiency and is excellent in productivity, and moreover, when being 28% by mole or less, the sound insulating property of laminated glass is further enhanced. Moreover, when the content of the hydroxyl group is the above upper limit or less, the flexibility of the interlayer film is enhanced and the handling of the interlayer film is facilitated.

A preferred range of the content of the hydroxyl group of the polyvinyl acetal resin (4) when the colored layer is embedded in the first layer, is the same as a preferred range of the content of the hydroxyl group of the polyvinyl acetal resin (1). A preferred range of the content of the hydroxyl group of the polyvinyl acetal resin (4) when the colored layer is not embedded in the second layer or the third layer and the colored layer is not a surface layer of the interlayer film, is the same as a preferred range of the content of the hydroxyl group of the polyvinyl acetal resin (1).

The contents of the hydroxyl group (hydroxyl group amount) of the polyvinyl acetal resin (2) and the polyvinyl acetal resin (3) is preferably 25% by mole or more, more preferably 28% by mole or more, more preferably 30% by mole or more, still more preferably 31.5% by mole or more, further preferably 32% by mole or more, especially preferably 33% by mole or more. The contents of the hydroxyl group (hydroxyl group amount) of the polyvinyl acetal resin (2) and the polyvinyl acetal resin (3) is preferably 38% by mole or less, more preferably 37% by mole or less, further preferably 36.5% by mole or less, especially preferably 36% by mole or less. When the content of the hydroxyl group is the above lower limit or more, the adhesive strength of the interlayer film is further enhanced. Moreover, when the content of the hydroxyl group is the above upper limit or less, the flexibility of the interlayer film is enhanced and the handling of the interlayer film is facilitated.

A preferred range of the content of the hydroxyl group of the polyvinyl acetal resin (4) when the colored layer is embedded in the second layer or the third layer, is the same as a preferred range of the content of the hydroxyl group of the polyvinyl acetal resin (2) and the polyvinyl acetal resin (3). A preferred range of the content of the hydroxyl group of the polyvinyl acetal resin (4) when the colored layer is a surface layer of the interlayer film, is the same as a preferred range of the content of the hydroxyl group of the polyvinyl acetal resin (2) and the polyvinyl acetal resin (3).

From the viewpoint of further enhancing the sound insulating property, it is preferred that the content of the hydroxyl group of the polyvinyl acetal resin (1) be lower than the content of the hydroxyl group of the polyvinyl acetal resin (2). From the viewpoint of further enhancing the sound insulating property, it is preferred that the content of the hydroxyl group of the polyvinyl acetal resin (1) be lower than the content of the hydroxyl group of the polyvinyl acetal resin (3). An absolute value of a difference between the content of the hydroxyl group of the polyvinyl acetal resin (1) and the content of the hydroxyl group of the polyvinyl acetal resin (2) is defined as absolute value A, and an absolute value of a difference between the content of the hydroxyl group of the polyvinyl acetal resin (1) and the content of the hydroxyl group of the polyvinyl acetal resin (3) is defined as absolute value B. From the viewpoint of further enhancing the sound insulating property, each of the absolute value A and the absolute value B is preferably 1% by mole or more, more preferably 5% by mole or more, further preferably 9% by mole or more, especially preferably 10% by mole or more, most preferably 12% by mole or more. Each of the absolute value A and the absolute value B is preferably 20% by mole or less.

When the colored layer is embedded in the first layer, there may be a case that the colored layer is not embedded in the second layer or the third layer, and the colored layer is not a surface layer of the interlayer film. In these cases, from the viewpoint of further enhancing the sound insulating property, it is preferred that the content of the hydroxyl group of the polyvinyl acetal resin (4) be lower than the content of the hydroxyl group of the polyvinyl acetal resin (2). From the viewpoint of further enhancing the sound insulating property, it is preferred that the content of the hydroxyl group of the polyvinyl acetal resin (4) be lower than the content of the hydroxyl group of the polyvinyl acetal resin (3). An absolute value of a difference between the content of the hydroxyl group of the polyvinyl acetal resin (4) and the content of the hydroxyl group of the polyvinyl acetal resin (2) is defined as absolute value C, and an absolute value of a difference between the content of the hydroxyl group of the polyvinyl acetal resin (4) and the content of the hydroxyl group of the polyvinyl acetal resin (3) is defined as absolute value D. From the viewpoint of further enhancing the sound insulating property, each of the absolute value C and the absolute value D is preferably 1% by mole or more, more preferably 5% by mole or more, further preferably 9% by mole or more, especially preferably 10% by mole or more, most preferably 12% by mole or more. Each of the absolute value C and the absolute value D is preferably 20% by mole or less.

There are the cases that the colored layer is embedded in the second layer or in the third layer, and that the colored layer is a surface layer of the interlayer film. In these cases, from the viewpoint of further enhancing the sound insulating property, it is preferred that the content of the hydroxyl group of the polyvinyl acetal resin (1) be lower than the content of the hydroxyl group of the polyvinyl acetal resin (4). From the viewpoint of still further enhancing the sound insulating property, the absolute value of a difference between the content of the hydroxyl group of the polyvinyl acetal resin (1) and the content of the hydroxyl group of the polyvinyl acetal resin (4) is preferably 1% by mole or more, more preferably 5% by mole or more, further preferably 9% by mole or more, especially preferably 10% by mole or more, most preferably 12% by mole or more. An absolute value of difference between the content of the hydroxyl group of the polyvinyl acetal resin (1) and the content of the hydroxyl group of the polyvinyl acetal resin (4) is preferably 20% by mole or less.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be determined in accordance with JIS K6728 "Testing methods for polyvinyl butyral".

The acetylation degree (the amount of acetyl groups) of the polyvinyl acetal resin (0) is preferably 0.1% by mole or more, more preferably 0.3% by mole or more, further preferably 0.5% by mole or more and is preferably 30% by mole or less, more preferably 25% by mole or less, and further preferably 20% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced.

The acetylation degree (the amount of acetyl groups) of the polyvinyl acetal resin (1) is preferably 0.01% by mole or more, more preferably 0.1% by mole or more, even more preferably 7% by mole or more, further preferably 9% by mole or more and is preferably 30% by mole or less, more preferably 25% by mole or less, further preferably 24, by mole or less, especially preferably 20% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced. In particular, when the acetylation degree of the polyvinyl acetal resin (1) is 0.1% by mole or more and is 25% by mole or less, the resulting laminated glass is excellent in penetration resistance.

A preferred range of the acetylation degree of the polyvinyl acetal resin (4) when the colored layer is embedded in the first layer, is the same as a preferred range of the acetylation degree of the polyvinyl acetal resin (1). A preferred range of the acetylation degree of the polyvinyl acetal resin (4) when the colored layer is not embedded in the second layer or the third layer and the colored layer is not a surface layer of the interlayer film, is the same as a preferred range of the acetylation degree of the polyvinyl acetal resin (1).

The acetylation degree (acetyl group amount) of each of the polyvinyl acetal resin (2) and the polyvinyl acetal resin (3) is preferably 0.01% by mole or more, more preferably 0.5% by mole or more, and is preferably 10% by mole or less, more preferably 2% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced.

A preferred range of the acetylation degree of the polyvinyl acetal resin (4) when the colored layer is embedded in the second layer or the third layer, is the same as a preferred range of the acetylation degree of the polyvinyl acetal resin (2) and the polyvinyl acetal resin (3). A preferred range of the acetylation degree of the polyvinyl acetal resin (4) when the colored layer is a surface layer of the interlayer film, is the same as a preferred range of the acetylation degree of the polyvinyl acetal resin (2) and the polyvinyl acetal resin (3).

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be determined in accordance with JIS K6728 "Testing methods for polyvinyl butyral".

The acetalization degree of the polyvinyl acetal resin (0) (the butyralization degree in the case of a polyvinyl butyral resin) is preferably 60% by mole or more and more preferably 63% by mole or more and is preferably 85% by mole or less, more preferably 75% by mole or less, further preferably 70% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree of the polyvinyl acetal resin (1) (the butyralization degree in the case of a polyvinyl butyral resin) is preferably 47% by mole or more and more preferably 60% by mole or more and is preferably 85% by mole or less, more preferably 80% by mole or less, further preferably 75% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

A preferred range of the acetalization degree of the polyvinyl acetal resin (4) when the colored layer is embedded in the first layer, is the same as a preferred range of the acetalization degree of the polyvinyl acetal resin (1). A preferred range of the acetalization degree of the polyvinyl acetal resin (4) when the colored layer is not embedded in the second layer or the third layer and the colored layer is not a surface layer of the interlayer film, is the same as a preferred range of the acetalization degree of the polyvinyl acetal resin (1).

The acetalization degree of the polyvinyl acetal resin (2) and the polyvinyl acetal resin (3) (the butyralization degree in the case of a polyvinyl butyral resin) is preferably 55% by mole or more and more preferably 60% by mole or more and is preferably 75c by mole or less and more preferably 71% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

A preferred range of the acetalization degree of the polyvinyl acetal resin (4) when the colored layer is embedded in the second layer or the third layer, is the same as a preferred range of the acetalization degree of the polyvinyl acetal resin (2) and the polyvinyl acetal resin (3). A preferred range of the acetalization degree of the polyvinyl acetal resin (4) when the colored layer is a surface layer of the interlayer film, is the same as a preferred range of the acetalization degree of the polyvinyl acetal resin (2) and the polyvinyl acetal resin (3).

The acetalization degree is determined in the following manner. From the total amount of the ethylene group in the main chain, the amount of the ethylene group to which the hydroxyl group is bonded and the amount of the ethylene group to which the acetyl group is bonded are subtracted. The obtained value is divided by the total amount of the ethylene group in the main chain to obtain a mole fraction. The mole fraction represented in percentage is the acetalization degree.

In this connection, it is preferred that the content of the hydroxyl group (the amount of hydroxyl groups), the acetalization degree (the butyralization degree) and the acetylation degree be calculated from the results determined by a method conforming to JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method conforming to JIS K6726 "Testing methods for polyvinyl butyral".

In 100% by weight of the thermoplastic resin contained in the interlayer film, the content of the polyvinyl acetal resin is preferably 10, by weight or more, more preferably 30% by weight or more, still more preferably 50% by weight or more, further preferably 70% by weight or more, especially preferably 80% by weight or more, most preferably 90% by weight or more. In 100% by weight of the thermoplastic resin contained in the interlayer film, the content of the polyvinyl acetal resin is preferably 100% by weight or less. It is preferred that the main ingredient (50% by weight or more) of the thermoplastic resin of the interlayer film be a polyvinyl acetal resin.

In 100% by weight of the thermoplastic resin contained in the first layer, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more. In 100% by weight of the thermoplastic resin contained in the first layer, the content of the polyvinyl acetal resin is preferably 100% by weight or less. It is preferred that the main ingredient (50% by weight or more) of the thermoplastic resin of the first layer be a polyvinyl acetal resin.

In 100% by weight of the thermoplastic resin contained in the second layer, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more. In 100% by weight of the thermoplastic resin contained in the second layer, the content of the polyvinyl acetal resin is preferably 100% by weight or less. It is preferred that the main ingredient (50% by weight or more) of the thermoplastic resin of the second layer be a polyvinyl acetal resin.

In 100% by weight of the thermoplastic resin contained in the third layer, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more. In 100% by weight of the thermoplastic resin contained in the third layer, the content of the polyvinyl acetal resin is preferably 100% by weight or less. It is preferred that the main ingredient (50% by weight or more) of the thermoplastic resin of the third layer be a polyvinyl acetal resin.

In 100% by weight of the thermoplastic resin contained in the colored layer, the content of the polyvinyl acetal resin is preferably 10% by weight or more, more preferably 30% by weight or more, still more preferably 501, by weight or more, further preferably 70% by weight or more, especially preferably 80% by weight or more, most preferably 90% by weight or more. In 100% by weight of the thermoplastic resin contained in the colored layer, the content of the polyvinyl acetal resin is preferably 100% C by weight or less. It is preferred that the main ingredient (50% by weight or more) of the thermoplastic resin of the colored layer be a polyvinyl acetal resin.

(Plasticizer)

From the viewpoint of further enhancing the adhesive force of an interlayer film, it is preferred that the interlayer film according to the present invention contain a plasticizer (hereinafter, sometimes described as a plasticizer (0)). It is preferred that the first layer contain a plasticizer (hereinafter, sometimes described as a plasticizer (1)). It is preferred that the second layer contain a plasticizer (hereinafter, sometimes described as a plasticizer (2)). It is preferred that the third layer contain a plasticizer (hereinafter, sometimes described as a plasticizer (3)). It is preferred that the colored layer contain a plasticizer (hereinafter, sometimes described as a plasticizer (4)). When the thermoplastic resin contained in an interlayer film is a polyvinyl acetal resin, it is especially preferred that the interlayer film (the respective layers) contain a plasticizer. It is preferred that a layer containing a polyvinyl acetal resin contain a plasticizer.

The plasticizer is not particularly limited. As the plasticizer, a conventionally known plasticizer can be used. One kind of the plasticizer may be used alone and two or more kinds thereof may be used in combination.

Examples of the plasticizer include organic ester plasticizers such as a monobasic organic acid ester and a polybasic organic acid ester, and organic phosphate plasticizers such as an organic phosphate plasticizer and an organic phosphite plasticizer, and the like. It is preferred that the plasticizer be an organic ester plasticizer. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decylic acid, benzoic acid and the like.

Examples of the polybasic organic acid ester include an ester compound of a polybasic organic acid and an alcohol having a linear or branched structure of 4 to 8 carbon atoms, and the like. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, diethylene glycol dibenzoate, dipropylene glycol dibenzoate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemical 1]

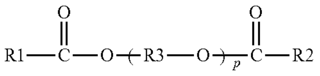

(1)

In the foregoing formula (1), R1 and R2 each represent an organic group with 2 to 10 carbon atoms, R3 represents an ethylene group, an isopropylene group, or an n-propylene group, and p represents an integer of 3 to 10. It is preferred that R1 and R2 in the foregoing formula (1) each be an organic group with 5 to 10 carbon atoms, and it is more preferred that R1 and R2 each be an organic group with 6 to 10 carbon atoms.

It is preferred that the plasticizer include triethylene glycol di-2-ethylhexanoate (3GO), triethylene glycol di-2-ethylbutyrate (3GH) or triethylene glycol di-2-ethylpropanoate. It is more preferred that the plasticizer include triethylene glycol di-2-ethylhexanoate (3GO) or triethylene glycol di-2-ethylbutyrate (3GH), and it is further preferred that the plasticizer include triethylene glycol di-2-ethylhexanoate.

In the interlayer film, the content of the plasticizer (0) relative to 100 parts by weight of the thermoplastic resin (0) is defined as content (0). The content (0) is preferably 5 parts by weight or more, more preferably 25 parts by weight or more, further preferably 30 parts by weight or more, and is preferably 100 parts by weight or less, more preferably 60 parts by weight or less, further preferably 50 parts by weight or less. When the content (0) is the above lower limit or more, the penetration resistance of laminated glass is further enhanced. When the content (0) is the above upper limit or less, the transparency of the interlayer film is further enhanced.

In the first layer, the content of the plasticizer (1) per 100 parts by weight of the thermoplastic resin (1) is defined as content (1). The content (1) is preferably 50 parts by weight or more, more preferably 55 parts by weight or more, further preferably 60 parts by weight or more. The content (1) is preferably 100 parts by weight or less, more preferably 90 parts by weight or less, further preferably 85 parts by weight or less, especially preferably 30 parts by weight or less. When the content (1) is the above lower limit or more, the flexibility of the interlayer film is enhanced and the handling of the interlayer film is facilitated. When the content (1) is the above upper limit or less, the penetration resistance of laminated glass is further enhanced.

When the colored layer is embedded in the first layer, a preferred range of the content of the plasticizer (4) relative to 100 parts by weight of the thermoplastic resin (4) (hereinafter, sometimes described as content (4)) is the same as a preferred range of the content (1) in the colored layer. When the colored layer is not embedded in the second layer or the third layer, and the colored layer is not a surface layer of the interlayer film, a preferred range of the content of the plasticizer (4) relative to 100 parts by weight of the thermoplastic resin (4) (hereinafter, sometimes described as content (4)) is the same as a preferred range of the content (1) in the colored layer.

In the second layer, the content of the plasticizer (2) relative to 100 parts by weight of the thermoplastic resin (2) is defined as a content (2). In the third layer, the content of the plasticizer (3) relative to 100 parts by weight of the thermoplastic resin (3) is defined as content (3). Each of the content (2) and the content (3) is preferably 5 parts by weight or more, more preferably 10 parts by weight or more, still more preferably 15 parts by weight or more, further preferably 20 parts by weight or more, especially preferably 24 parts by weight or more, and most preferably 25 parts by weight or more. Each of the content (2) and the content (3) is preferably 45 parts by weight or less, more preferably 40 parts by weight or less, further preferably 35 parts by weight or less, especially preferably 32 parts by weight or less, and most preferably 30 parts by weight or less. When the content (2) and the content (3) are the above lower limit or more, the flexibility of the interlayer film is enhanced and the handling of the interlayer film is facilitated. When the content (2) and the content (3) are the above upper limit or less, the penetration resistance of laminated glass is further enhanced.

A preferred range of the content of the plasticizer (4) relative to 100 parts by weight of the thermoplastic resin (4) (hereinafter, sometimes described as content (4)) when the colored layer is embedded in the second layer or the third layer, is the same as a preferred range of the content (2) and the content (3). A preferred range of the content of the plasticizer (4) relative to 100 parts by weight of the thermoplastic resin (4) (hereinafter, sometimes described as content (4)) when the colored layer is a surface layer of the interlayer film, is the same as a preferred range of the content (2) and the content (3).

For the purpose of enhancing the sound insulating property of laminated glass, it is preferred that the content (1) be larger than the content (2) and it is preferred that the content (1) be larger than the content (3).

For the purpose of enhancing the sound insulating property of laminated glass, it is preferred that the content (4) be larger than the content (2) and it is preferred that the content (4) be larger than the content (3), when the colored layer is embedded in the first layer and when the colored layer is not a surface layer of the interlayer film.

For the purpose of enhancing the sound insulating property of laminated glass, it is preferred that the content (1) be larger than the content (4) when the colored layer is embedded in the second layer or the third layer, and when the colored layer is a surface layer of the interlayer film.

From the viewpoint of further enhancing the sound insulating property of laminated glass, each of the absolute value of difference between the content (2) and the content (1) and the absolute value of difference between the content (3) and the content (1) is preferably 10 parts by weight or more, more preferably 15 parts by weight or more, and further preferably 20 parts by weight or more. Each of the absolute value of difference between the content (2) and the content (1) and the absolute value of difference between the content (3) and the content (1) is preferably 80 parts by weight or less, more preferably 75 parts by weight or less, further preferably 70 parts by weight or less.

When the colored layer is embedded in the first layer, there may be a case that the colored layer is not embedded in the second layer or the third layer, and the colored layer is not a surface layer of the interlayer film. In this case, from the viewpoint of further enhancing the sound insulating property of laminated glass, each of the absolute value of difference between the content (2) and the content (4) and the absolute value of difference between the content (3) and the content (4) is preferably 10 parts by weight or more, more preferably 0.15 parts by weight or more, and further preferably 20 parts by weight or more. Each of the absolute value of difference between the content (2) and the content (4) and the absolute value of difference between the content (3) and the content (4) is preferably 80 parts by weight or less, more preferably 75 parts by weight or less, further preferably 70 parts by weight or less.

When the colored layer is embedded in the second layer or the third layer, and when the colored layer is a surface layer of the interlayer film, the absolute value of difference between the content (4) and the content (1) is preferably 10 parts by weight or more, more preferably 15 parts by weight or more, and further preferably 20 parts by weight or more from the viewpoint of further enhancing the sound insulating property of laminated glass. The absolute value of difference between the content (4) and the content (1) is preferably 80 parts by weight or less, more preferably 75 parts by weight or less, further preferably 70 parts by weight or less.

(Coloring Agent)

It is preferred that the interlayer film contain a coloring agent. It is preferred that the colored layer contain a coloring agent. Examples of the coloring agent include inorganic particles, a pigment, a dye and the like.

Examples of the inorganic particles include carbon black particles, carbon nanotube particles, graphene particles, iron oxide particles, zinc oxide particles, calcium carbonate particles, alumina particles, kaolin clay particles, calcium silicate particles, magnesium oxide particles, magnesium hydroxide particles, aluminum hydroxide particles, magnesium carbonate particles, talc particles, feldspar powder particles, mica particles, barite particles, barium carbonate particles, titanium oxide particles, silica particles, and glass beads, and the like. One kind of the inorganic particles may be used alone, and two or more kinds thereof may be used in combination.

It is preferred that the inorganic particles include carbon black particles, carbon nanotube particles, graphene particles, calcium carbonate particles, titanium oxide particles or silica particles, and it is more preferred that the inorganic particles include calcium carbonate particles. By using these preferred inorganic particles, unevenness in appearance is suppressed when the light penetrates, and laminated glass having still further excellent appearance designability is obtained.

The average particle diameter of the inorganic particles is preferably 0.01 μm or more, more preferably 0.5 μm or more, and is preferably 100 μm or less, more preferably 50 μm or less, further preferably 10 μm or less. The average particle diameter refers to the weight average particle diameter. The average particle diameter can be measured by a dynamic light scattering method with a light scattering measuring device and a laser as a light source. Examples of the light scattering measuring device include "DLS-6000AL" available from OTSUKA ELECTRONICS Co., LTD., and the like.

Examples of the dye include a pyrene-based dye, an aminoketone-based dye, an anthraquinone-based dye, and an azo-based dye, and the like. One kind of the dye may be used alone, and two or more kinds thereof may be used in combination.

Examples of the pyrene-based dye include Solvent Green 5 (CAS79869-59-3) and Solvent Green 7 (CAS6358-69-6), and the like.

Examples of the aminoketone-based dye include Solvent Yellow 98 (CAS12621-74-8), Solvent Yellow 85 (CAS12271-01-1) and Solvent Red 179 (CAS8910-94-5), and Solvent Red 135 (CAS71902-17-5), and the like.

Examples of the anthraquinone-based dye include Solvent Yellow 163 (CAS13676091-0), Solvent Red 207 (CAS15958-69-6), Disperse Red 92 (CAS12236-11-2), Solvent Violet 13 (CAS81-48-1), Disperse Violet 31 (CAS6408-72-6), Solvent Blue 97 (CAS61969-44-6), Solvent Blue 45 (CAS37229-23-5), Solvent Blue 104 (CAS116-75-6) and Disperse Blue 214 (CAS104491-84-1), and the like.

Examples of the azo-based dye include Solvent Yellow 30 (CAS3321-10-4), Solvent Red 164 (CAS70956-30-8), and Disperse Blue 146 (CAS88650-91-3), and the like.

The pigment may be an organic pigment and may be an inorganic pigment. The organic pigment may be an organic pigment having a metal atom, and may be an organic pigment not having a metal atom. One kind of the pigment may be used alone, and two or more kinds thereof may be used in combination.

Examples of the organic pigment include a phthalocyanine compound, a quinacridone compound, an azo compound, a pentaphene compound, a perylene compound, an indole compound and a dioxazine compound, and the like.

Examples of the coloring agent include a dark red-brown mixed pigment in which a black pigment (carbon black), a red pigment (C.I.Pigment red), a blue pigment (C.I.Pigment blue), and a yellow pigment (C.I.Pigment yellow) are mixed.

(Heat Shielding Substance)

It is preferred that the interlayer film contain a heat shielding substance. It is preferred that the first layer contain a heat shielding substance. It is preferred that the second layer contain a heat shielding substance. It is preferred that the third layer contain a heat shielding substance. It is preferred that the colored layer contain a heat shielding substance. One kind of the heat shielding substance may be used alone, and two or more kinds thereof may be used in combination.

It is preferred that the heat shielding substance contain at least one kind of Ingredient X among a phthalocyanine compound, a naphthalocyanine compound, and an anthracyanine compound or contain heat shielding particles. In this case, the heat shielding compound may be constituted of both of the Ingredient X and the heat shielding particles. The heat shielding substance can correspond to the above-described coloring agent.

Ingredient X:

It is preferred that the interlayer film contain at least one kind of Ingredient X among a phthalocyanine compound, a naphthalocyanine compound, and an anthracyanine compound. It is preferred that the first layer contain the Ingredient X. It is preferred that the second layer contain the Ingredient X. It is preferred that the third layer contain the Ingredient X. It is preferred that the colored layer contain the Ingredient X. The Ingredient X is a heat shielding substance. One kind of the Ingredient X may be used alone and two or more kinds thereof may be used in combination.

The Ingredient X is not particularly limited. Examples of the Ingredient X that can be used include a phthalocyanine compound, a naphthalocyanine compound and an anthracyanine compound that are conventionally known.

Examples of the Ingredient X include phthalocyanine, a derivative of phthalocyanine, naphthalocyanine, a derivative of naphthalocyanine, anthracyanine, and a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

From the viewpoint of further enhancing the heat shielding property of the interlayer film and the laminated glass, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding property and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. From the viewpoint of still further enhancing the heat shielding property of the interlayer film and the laminated glass, it is preferred that the Ingredient X have a structural unit in which an oxygen atom is bonded to a vanadium atom.

In 100% by weight of the interlayer film or in 100% by weight of a layer containing the Ingredient X (a first layer, a second layer, a third layer, or a colored layer), the content of the Ingredient X is preferably 0.001% by weight or more, more preferably 0.005% by weight or more, further preferably 0.01% by weight or more, especially preferably 0.02% by weight or more. In 100% by weight of the interlayer film or in 100% by weight of a layer containing the Ingredient X (a first layer, a second layer, a third layer, or a colored layer), the content of the Ingredient X is preferably 0.2% by weight or less, more preferably 0.1% by weight or less, further preferably 0.05% by weight or less, especially preferably 0.04% by weight or less. When the content of the Ingredient X is the above lower limit or more and the above upper limit or less, the heat shielding property is sufficiently enhanced and the visible light transmittance is sufficiently enhanced. For example, it is possible to make the visible light transmittance 70% or more.

Heat Shielding Particles:

It is preferred that the interlayer film contain heat shielding particles. It is preferred that the first layer contain the heat shielding particles. It is preferred that the second layer contain the heat shielding particles. It is preferred that the third layer contain the heat shielding particles. It is preferred that the colored layer contain the heat shielding particles. The heat shielding particle is of a heat shielding substance. By the use of heat shielding particles, infrared rays (heat rays) can be effectively cut off. One kind of the heat shielding particles may be used alone, and two or more kinds thereof may be used in combination.

From the viewpoint of further enhancing the heat shielding property of the laminated glass, it is more preferred that the heat shielding particles be metal oxide particles. It is preferred that the heat shielding particle be a particle (a metal oxide particle) formed from an oxide of a metal.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. Accordingly, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used. Since the heat ray shielding function is high, preferred are metal oxide particles, more preferred are ATO particles, GZO particles, IZO particles, ITO particles or tungsten oxide particles, and especially preferred are ITO particles or tungsten oxide particles. In particular, since the heat ray shielding function is high and the particles are readily available, preferred are tin-doped indium oxide particles (ITO particles), and also preferred are tungsten oxide particles.

From the viewpoint of further enhancing the heat shielding property of the interlayer film and the laminated glass, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

From the viewpoint of further enhancing the heat shielding property of the interlayer film and the laminated glass, cesium-doped tungsten oxide particles are especially preferred. From the viewpoint of still further enhancing the heat shielding property of the interlayer film and the laminated glass, it is preferred that the cesium-doped tungsten oxide particles be tungsten oxide particles represented by the formula: $Cs_{0.33}WO_3$.

The average particle diameter of the heat shielding particles is preferably 0.01 μm or more, more preferably 0.02 μm or more, and is preferably 0.1 μm or less, more preferably 0.05 μm or less. When the average particle diameter is the above lower limit or more, the heat ray shielding property is sufficiently enhanced. When the average particle diameter is the above upper limit or less, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In 100% by weight of the interlayer film or in 100% by weight of a layer containing the heat shielding particles (a first layer, a second layer, a third layer, or a colored layer), the content of the heat shielding particles (in particular, the content of tungsten oxide particles) is preferably 0.01% by weight or more, more preferably 0.1% by weight or more, further preferably 1% by weight or more, especially preferably 1.5% by weight or more. In 100% by weight of the interlayer film or in 100% by weight of a layer containing the heat shielding particles (a first layer, a second layer, a third layer, or a colored layer), the content of the heat shielding particles (in particular, the content of tungsten oxide particles) is preferably 6% by weight or less, more preferably 5.5% by weight or less, further preferably 4% by weight or less, especially preferably 3.5% by weight or less, most preferably 3% by weight or less. When the content of the heat shielding particles is the above lower limit or more and the above upper limit or less, the heat shielding property is sufficiently enhanced and the visible light transmittance is sufficiently enhanced.

(Metal Salt)

It is preferred that the interlayer film include at least one kind of metal salt (hereinafter, sometimes described as Metal salt M) of alkali metal salts and alkali earth metal salts. It is preferred that the first layer contain the Metal salt M. It is preferred that the second layer contain the Metal salt M. It is preferred that the third layer contain the Metal salt M. It is preferred that the colored layer contain the Metal salt M. The alkali earth metal means six metals of Be, Mg, Ca, Sr, Ba, and Ra. By the use of the Metal salt M, controlling the adhesivity between the interlayer film and a lamination glass member such as a glass plate or the adhesivity between respective layers in the interlayer film is facilitated. One kind of the metal salt M may be used alone, and two or more kinds thereof may be used in combination.

It is preferred that the Metal salt M contain at least one kind of metal selected from the group consisting of Li, Na, K, Rb, Cs, Mg, Ca, Sr and Ba. It is preferred that the metal salt contained in the interlayer film contain at least one kind of metal between K and Mg.

As the metal salt M, an alkali metal salt of an organic acid having 2 to 16 carbon atoms, and an alkali earth metal salt of an organic acid having 2 to 16 carbon atoms can be used.

The metal salt M may include a magnesium salt of a carboxylic acid having 2 to 16 carbon atoms, or a potassium salt of a carboxylic acid having 2 to 16 carbon atoms.

Examples of the magnesium carboxylate with 2 to 16 carbon atoms and the potassium carboxylate with 2 to 16 carbon atoms include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in an interlayer film containing the Metal salt M or a layer containing the Metal salt M (a first layer, a second layer, a third layer, or a colored layer) is preferably 5 ppm or more, more preferably 10 ppm or more, further preferably 20 ppm or more, and is preferably 300 ppm or less, more preferably 250 ppm or less, further preferably 200 ppm or less. When the total of the contents of Mg and K is the above lower limit or more and the above upper limit or less, the adhesivity between the interlayer film and a lamination glass member (e.g., glass plate) or the adhesivity between respective layers in the interlayer film can be further well controlled.

(Ultraviolet Ray Screening Agent)

It is preferred that the interlayer film contain an ultraviolet ray screening agent. It is preferred that the first layer contain an ultraviolet ray screening agent. It is preferred that the second layer contain an ultraviolet ray screening agent. It is preferred that the third layer contain an ultraviolet ray screening agent. It is preferred that the colored layer contain an ultraviolet ray screening agent. By the use of an ultraviolet ray screening agent, even when the interlayer film and the laminated glass are used for a long period of time, the visible light transmittance becomes further difficult to be lowered. One kind of the ultraviolet ray screening agent may be used alone, and two or more kinds thereof may be used in combination.

Examples of the ultraviolet ray screening agent include an ultraviolet absorber. It is preferred that the ultraviolet ray screening agent be an ultraviolet absorber.

Examples of the ultraviolet ray screening agent include an ultraviolet ray screening agent containing a metal atom, an ultraviolet ray screening agent containing a metal oxide, an ultraviolet ray screening agent having a benzotriazole structure (a benzotriazole compound), an ultraviolet ray screening agent having a benzophenone structure (a benzophenone compound), an ultraviolet ray screening agent having a triazine structure (a triazine compound), an ultraviolet ray screening agent having a malonic acid ester structure (a malonic acid ester compound), an ultraviolet ray screening agent having an oxanilide structure (an oxanilide compound), and an ultraviolet ray screening agent having a benzoate structure (a benzoate compound), and the like.

Examples of the ultraviolet ray screening agent containing a metal atom include platinum particles, particles in which the surface of platinum particles is coated with silica, palladium particles, and particles in which the surface of palladium particles is coated with silica, and the like. It is preferred that the ultraviolet ray screening agent not be heat shielding particles.

The ultraviolet ray screening agent is preferably an ultraviolet ray screening agent having a benzotriazole structure, an ultraviolet ray screening agent having a benzophenone structure, an ultraviolet ray screening agent having a triazine structure, or an ultraviolet ray screening agent having a benzoate structure. The ultraviolet ray screening agent is more preferably an ultraviolet ray screening agent having a benzotriazole structure or an ultraviolet ray screening agent having a benzophenone structure, and is further preferably an ultraviolet ray screening agent having a benzotriazole structure.

Examples of the ultraviolet ray screening agent containing a metal oxide include zinc oxide, titanium oxide, cerium oxide, and the like. Furthermore, with regard to the ultraviolet ray screening agent containing a metal oxide, the surface may be coated. Examples of the coating material for the surface of the ultraviolet ray screening agent containing a metal oxide include an insulating metal oxide, a hydrolyzable organosilicon compound, a silicone compound, and the like.

Examples of the insulating metal oxide include silica, alumina, zirconia, and the like. For example, the insulating metal oxide has a band-gap energy of 5.0 eV or more.

Examples of the ultraviolet ray screening agent having a benzotriazole structure include 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.), 2-(2'-hydroxy-3',5'-di-amylphenyl)benzotriazole ("Tinuvin 328" available from BASF Japan Ltd.), and the like. It is preferred that the ultraviolet ray screening agent be an ultraviolet ray screening agent having a benzotriazole structure containing a halogen atom, and it is more preferred that the ultraviolet ray screening agent be an ultraviolet ray screening agent having a benzotriazole structure containing a chlorine atom, because those are excellent in ultraviolet ray screening performance.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazin-2-yl)-5-[(hexyl)oxy]-phenol ("Tinuvin 1577FF" available from BASF Japan Ltd.), and the like.

Examples of the ultraviolet ray screening agent having a malonic acid ester structure include dimethyl 2-(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxyphenyl)oxalic acid diamide and 2-ethyl-2'-ethoxy-oxalanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

In 100% by weight of the interlayer film or in 100% by weight of a layer containing the ultraviolet ray screening agent (a first layer, a second layer, a third layer, or a colored layer), the content of the ultraviolet ray screening agent and the content of the benzotriazole compound are preferably 0.1% by weight or more, more preferably 0.2% by weight or more, further preferably 0.3% by weight or more, especially preferably 0.5% by weight or more. In this case, reduction in visible light transmittance after a lapse of the term is further prevented. In 100% by weight of the interlayer film or in 100% by weight of a layer containing the ultraviolet ray screening agent (a first layer, a second layer, a third layer, or a colored layer), the content of the ultraviolet ray screening agent and the content of the benzotriazole compound are preferably 2.5% by weight or less, more preferably 2% by weight or less, further preferably 1% by weight or less, especially preferably 0.8% by weight or less. In particular, by setting the content of the ultraviolet ray screening agent to be 0.2% by weight or more in 100% by weight of a layer containing the ultraviolet ray screening agent, with regard to the interlayer film and laminated glass, the lowering in visible light transmittance thereof after the lapse of a certain period of time can be significantly suppressed.

(Oxidation Inhibitor)

It is preferred that the interlayer film contain an oxidation inhibitor. It is preferred that the first layer contain an oxidation inhibitor. It is preferred that the second layer contain an oxidation inhibitor. It is preferred that the third layer contain an oxidation inhibitor. It is preferred that the colored layer contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butyl hydroxyanisole (BHA), 2,6-di-t-butyl-4-ethylphenol, stearyl β-(3,5-di-t-butyl-4-hydroxyphenyl) propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, and bis(3-t-butyl-4-hydroxy-5-methylbenzenepropanoic acid) ethylenebis(oxyethylene), and the like. One kind or two or more kinds among these oxidation inhibitors are preferably used.

Examples of the phosphorus-based oxidation inhibitor include tridecyl phosphite, tris(tridecyl) phosphite, triphenyl phosphite, trinonylphenyl phosphite, bis(tridecyl)pertaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, and 2,2'-methylenebis(4,6-di-t-butyl-1-phenyloxy) (2-ethylhexyloxy) phosphorus, and the like. One kind or two or more kinds among these oxidation inhibitors are preferably used.

Examples of a commercial product of the oxidation inhibitor include "IRGANOX 245" available from BASF Japan Ltd., "IRGAFOS 169" available from BASF Japan Ltd., "IRGAFOS 38" available from BASF Japan Ltd., "Sumilizer BHT" available from Sumitomo Chemical Co., Ltd., "H-BHT" available from Sakai Chemical. Industry Co., Ltd., and "IRGANOX 1010" available from BASF Japan Ltd., and the like.

With regard to the interlayer film and laminated glass, in order to maintain high visible light transmittance thereof over a long period of time, the content of the oxidation inhibitor is preferably 0.03% by weight or more, more preferably 0.1% by weight or more in 100% by weight of the interlayer film or in 100% by weight of the layer containing the oxidation inhibitor (a first layer, a second layer, a third layer, or a colored layer). Moreover, since an effect commensurate with the addition of an oxidation inhibitor is not attained, it is preferred that the content of the oxidation inhibitor be 2% by weight or less in 100% by weight of the interlayer film or in 100% by weight of the layer containing the oxidation inhibitor.

(Other Ingredients)

Each of the interlayer film, the first layer, the second layer, the third layer, and the colored layer may contain additives such as a coupling agent, a dispersing agent, a surfactant, a flame retardant, an antistatic agent, an adhesive strength regulator other than metal salt, a moisture-resistance agent, a fluorescent brightening agent, and an infrared ray absorber, as necessary. One kind of these additives may be used alone, and two or more kinds thereof may be used in combination.

(Infrared Reflective Layer)

The interlayer film may have an Infrared reflective layer. The infrared reflective layer reflects infrared rays. The infrared reflective layer is not particularly limited as long as it has the property of reflecting infrared rays.

Examples of the infrared reflective layer include a resin film with metal foil, a multilayer laminate film in which a metal layer and a dielectric layer are formed on a resin layer, a multilayer resin film, and a liquid crystal film. These films have the property of reflecting infrared rays.

It is especially preferred that the infrared reflective layer be a resin film with metal foil, a multilayer resin film, or a liquid crystal film. These films are significantly excellent in the infrared reflecting property. Therefore, by using these films, it is possible to obtain a laminated glass having still higher heat shielding property, and capable of keeping the high visible light transmittance for a still longer term.

The resin film with metal foil includes a resin film, and a metal foil layered on the outer surface of the resin film. Examples of the material of the resin film include a polyethylene terephthalate resin, a polyethylene naphthalate resin, a polyvinyl acetal resin, an ethylene-vinyl acetate copolymer resin, an ethylene-acrylic acid copolymer resin, a polyurethane resin, a polyvinyl alcohol resin, a polyolefin resin, a polyvinyl chloride resin, and a polyimide resin. Examples of the material of the metal foil include aluminum, copper, silver, gold, palladium, and alloys containing these metals.

The multilayer laminate film in which a metal layer and a dielectric layer are formed on a resin laver is a multilayer laminate film in which any number of layers of the metal layer and the dielectric layer are alternately layered. In the multilayer laminate film in which a metal layer and a dielectric layer are formed on a resin layer, it is preferred that all of the metal layers and the dielectric layers be layered alternately, however, there may be a structural part in which a metal layer and a dielectric layer are not layered alternately as exemplified by metal layer/dielectric layer/metal layer/dielectric layer/metal layer/metal layer/dielectric layer/metal layer.

As the material of the resin layer (resin film) in the multilayer laminate film, those exemplified as the material of the resin film in the resin film with metal foil can be exemplified. Examples of the material of the resin layer (resin film) in the multilayer laminate film include polyethylene, polypropylene, polylactic acid, poly(4-methylpentene-1), polyvinylidene fluoride, cyclic polyolefin, polymethyl methacrylate, polyvinyl chloride, polyvinyl alcohol, polyamide such as nylon 6, 11, 12, 66 and the like, polystyrene, polycarbonate, polyethylene terephthalate, polyethylene naphthalate, polyester, polyphenylene sulfide, and polyether imide. As the material of the metal layer in the multilayer laminate film, those exemplified as the material of the metal foil, in the resin film with metal foil can be exemplified. A coating layer of metal or a mixed oxide of metal can be given to the both faces or either face of the metal layer. Examples of the material of the coating layer include ZnO, $Al_2O_3$, $Ga_2O_3$, $InO_3$, MgO, Ti, NiCr and Cu.

Examples of the dielectric layer in the multilayer laminate film include indium oxide.

The multilayer resin film is a laminate film in which a plurality of resin films are layered. As the material of the multilayer resin film, those exemplified as the material of the resin layer (resin film) in the multilayer laminate film can be exemplified. The number of layered resin films in the multilayer resin film is 2 or more, and may be 3 or more, and may be 5 or more. The number of layered resin films in the multilayer resin film may be 1000 or less, and may be 100 or less, and may be 50 or less.

The multilayer resin film may be a multilayer resin film in which any number of layers of two or more kinds of thermoplastic resin films having different optical properties (refractive index) are layered alternately or randomly. Such a multilayer resin film is so configured that a desired infrared reflecting property is obtained.

As the liquid crystal film, a film in which any number of layers of cholesteric liquid crystal layers that reflect the light of any wavelength are layered can be recited. Such a liquid crystal film is so configured that desired infrared reflecting property is obtained.

For excellent performance of reflecting infrared rays, it is preferred that the infrared reflective layer have such a property that the infrared transmittance is 40% or less at at least one wavelength within the range of 800 nm to 2000 nm. At at least one wavelength within the range of 800 nm to 2000 nm, the infrared transmittance is more preferably 30% or less, and further preferably 20% or less.

Transmittance at each wavelength within the wavelength range of 800 nm to 2000 nm of the infrared reflective layer is specifically measured in the following manner. A single infrared reflective layer is prepared. Spectral transmittance at each wavelength within the wavelength of 800 nm to 2000 nm of the infrared reflective layer is obtained by using a spectrophotometer ("U-4100" available from Hitachi High-Tech Corporation) in accordance with JIS R3106:1998.

(Other Details of Interlayer Film for Laminated Glass)

The interlayer film may be wound to be formed into a roll body of the interlayer film. The roll body may include a winding core and an interlayer film wound on the outer periphery of the winding core.

The interlayer film can be produced, for example, by the method described in JP 2006-231521 A (Method 1, conduit method) or the method described in WO2009/001856A1 (method 2, Feed Block method (FB method)). In the method 1 (conduit method), for example, the interlayer film having the shape of the colored layer shown in FIGS. 1, 3, 5, 7, 9, 11, 13, 14 can be satisfactorily produced. In the method 2 (FB method), for example, the interlayer film having the shape of the colored layer shown in FIGS. 2, 4, 6, 8, 10, 12 can be satisfactorily produced.

More specifically, the interlayer film can be produced in the following manner.

(1) In the conduit method, it is possible to satisfactorily obtain the gradation part, the transparent part, and the dark color part having the parallel light transmittance and the variation ratio in the parallel light transmittance satisfying specific ranges by adjusting the shape of the slit of the conduit. In particular, it is possible to satisfactorily obtain a wedge-like interlayer film having a dark color part with a uniform thickness. (2) In the FB method, it is possible to satisfactorily obtain the gradation part, the transparent part, and the dark color part having the parallel light transmittance and the variation ratio in the parallel light transmittance satisfying specific ranges by adjusting the shape of the slit in the FB. In particular, it is possible to satisfactorily obtain a wedge-like interlayer film having a dark color part with a uniform thickness. (3) By adjusting the shape of the die outlet, it is possible to make the thickness at the other end side uniform, and it is possible to satisfactorily obtain the gradation part, the transparent part, and the dark color part having the parallel light transmittance and the variation ratio in the parallel light transmittance satisfying specific ranges by adjusting the shape of the slit of the conduit. In particular, it is possible to satisfactorily obtain a wedge-like interlayer film having a dark color part with a uniform thickness. (4) After extrusion molding the dark color part having a uniform thickness (rectangular intermediate layer) by a conventional method, the wedge-like layer is layered on the rectangular intermediate layer. In this method, a highly functional layer such as an infrared reflective layer can be easily layered between the rectangular intermediate layer and the wedge-like layer.

For the reason of excellent production efficiency of the interlayer film, it is preferred that the second layer and the third layer contain the same polyvinyl acetal resin. For the reason of excellent production efficiency of the interlayer film, it is more preferred that the second layer and the third layer contain the same polyvinyl acetal resin and the same plasticizer. For the reason of excellent production efficiency of the interlayer film, it is further preferred that the second layer and the third layer be formed of the same resin composition.

It is preferred that the interlayer film have protrusions and recesses on at least one surface of the surfaces of both sides. It is more preferred that the interlayer film have protrusions and recesses on surfaces of both sides. Examples of the method for forming the protrusions and recesses include, but are not particularly limited to, a lip emboss method, an emboss roll method, a calendar roll method, and a profile extrusion method, and the like. The emboss roll method is preferred because a large number of embosses of the protrusions and recesses, which is a quantitatively constant protrusion and recess pattern, can be formed.

(Laminated Glass)

The laminated glass according to the present invention includes a first lamination glass member, a second lamination glass member and the aforementioned interlayer film for laminated glass. In the laminated glass according to the present invention, the above-described interlayer film for laminated glass is arranged between the first lamination glass member and the second lamination glass member.

The laminated glass according to the present invention has one end and the other end being at the opposite side of the one end. The one end and the other end are end parts of both sides facing each other in the laminated glass. In the laminated glass according to the present invention, the other end has a thickness that is larger than a thickness of the one end.

The following parallel light transmittance is conducted for the laminated glass.

Measurement of parallel light transmittance includes: (1) selecting a plurality of points A at 1 cm intervals from a starting point toward the other end, the starting point being a position of 2 cm from the one end toward the other end; (2) measuring a parallel light transmittance of laminated glass X at each point A; (3) defining that an x-axial direction is "distance from the one end" and a y-axial direction is "parallel light transmittance", and preparing an approximate line in a region of 2 cm from three points including one point A and two points 1 cm distanced from the point A on both sides in a direction connecting the one end and the other end; defining an absolute value of a variation rate in the parallel light transmittance determined from the approximate line as "absolute value of variation rate in parallel light transmittance" at the one point A; and determining "absolute value of variation rate in parallel light transmittance" for each point A.

In the above (1), points A are set at 1 cm intervals. Points are selected up to the position where selection of points at 1 cm intervals can be made from the one end side toward the other end side of the laminated glass (position where the interval is not less than 1 cm, and the distance between point A and the other end is not less than 2 cm). The point A that is closest to the one end side of the laminated glass is point A1 at a position of 2 cm from the one end toward the other end of the laminated glass, and the next point A is point A2 at a position of 3 cm from the one end toward the other end of the laminated glass. The next point is point A3 at a position of 4 cm from the one end toward the other end of the laminated glass. Point An is at a position of (n+1) cm (n is a natural number) from the one end toward the other end of the laminated glass. Each of point A1, point A2, point A3 is included in points A that are set at 1 cm intervals in the above (1). For convenience, the point at a position of 1 cm from the one end toward the other end of the laminated glass is defined as point A0. Point A0 is not included in points A that are set at 1 cm intervals in the above (1).

In the above (2), parallel light transmittance of the laminated glass is measured at a position of each point A. Therefore, values of parallel light transmittance are obtained in the same number as that of points A. Parallel light transmittance of the laminated glass is measured in accordance with JIS R3106:1998. Specifically, measurement is conducted in the following manner.

By using a spectrophotometer, the laminated glass is placed parallel with the normal line of the light axis on the optical path between the light source and the integrating sphere at a point 13 cm away from the integrating sphere so that only the parallel light having penetrated the laminated glass is received by the integrating sphere. The parallel light transmittance means a visible light transmittance calculated from the spectral transmittance measured in this condition. Examples of the spectrophotometer include "U-4100" available from Hitachi High-Tech Corporation.

In the above (3), "three points including point A1 that is closest to the one end side of the laminated glass, and two points 1 cm distanced from the point A1 on both sides in the direction connecting the one end and the other end" means the following three points. Point at 1 cm, point at 2 cm and point at 3 cm from the one end toward the other end of the laminated glass. In other words, the above point A0, point A1, and point A2. From parallel light transmittances of point A0, point A1 and point A2, an approximate line is prepared by defining an x-axial direction as "distance from the one end" and a y-axial direction as "parallel light transmittance". An absolute value of a variation rate in parallel light transmittance determined from the obtained approximate line is defined as "absolute value of variation rate in parallel light transmittance at point A1".

In the above (3), "three points including point A2 that is second closest to the one end side of the laminated glass, and two points 1 cm distanced from the point A2 on both sides in the direction connecting the one end and the other end" means the following three points. Point at 2 cm, point at 3 cm and point at 4 cm from the one end toward the other end of the laminated glass. In other words, the above point A1, point A2, and point A3. From parallel light transmittances of point A1, point A2, and point A3, an approximate line is prepared by defining an x-axial direction as "distance from the one end" and a y-axial direction as "parallel light transmittance". An absolute value of a variation rate in parallel light transmittance determined from the obtained approximate line is defined as "absolute value of variation rate in parallel light transmittance at point A2".

In the present invention, "variation rate in parallel light transmittance at point A3" and "variation rate in parallel light transmittance at point A (n−1)" are calculated in the same manner. Since the points A are selected as described above, the three points for preparing the approximate line do not exist in a region of less than 1 cm from the one end toward the other end, and do not exist in a region of less than 1 cm from the other end toward the one end.

When the parallel light transmittance is measured for the laminated glass, the laminated glass has the following parts (1) to (3). In the present invention, a gradation part is defined, and then a transparent part and a dark color part are defined.

(1) A gradation part in which a parallel light transmittance continuously reduces from the one end side to the other end side, and an absolute value of a variation rate in the parallel light transmittance is more than 0.3%/mm.

(2) A transparent part located closer to the one end side than the gradation part and having a parallel light transmittance of 60% or more.

(3) A dark color part located closer to the other end side than the gradation part and including one or more points A having an absolute value of a variation rate in the parallel light transmittance of 0.3%/mm or less.

Therefore, the laminated glass according to the present invention has the transparent part, the gradation part, and the dark color part from the one end side toward the other end side. The gradation part and the dark color part constitute a shading region.

In the laminated glass according to the present invention, since the above configuration is provided, there is a dark color part with uniform parallel light transmittance in a shading region, and thus it is possible to suppress color unevenness in the shading region. In the laminated glass according to the present invention, although the thickness of the other end is larger than the thickness of the one end, there is a dark color part with uniform parallel light transmittance in a shading region, and thus it is possible to suppress color unevenness in the shading region.

The dark color part may contain points A having an absolute value of a variation rate in parallel light transmittance of 0.3%/mm or less, and points A having an absolute value of a variation rate in parallel light transmittance of more than 0.3%/mm. Among the plurality of points A, a point A having an absolute value of a variation rate in parallel light transmittance of 0.3%/mm or less is defined as point Aa. Among the plurality of points A, a point A having an absolute value of a variation rate in parallel light transmittance of more than 0.3%/mm is defined as point Ab. In this case, in the dark color part, there are one or more points Aa. In the dark color part, there may be one or more points Ab in addition to point Aa. Also, "(3) A dark color part located closer to the other end side than the gradation part and including one or more points A having an absolute value of a variation rate in parallel light transmittance of 0.3%/mm or less" means "(3) A dark color part located closer to the other end side than the gradation part and including one or more points Aa having an absolute value of a variation rate in parallel light transmittance of 0.3%/mm or less".

FIG. 15 is a sectional view schematically showing an example of laminated glass prepared with the interlayer film for laminated glass shown in FIG. 1.

A laminated glass 21 shown in FIG. 15 includes a first lamination glass member 31, a second lamination glass member 32 and the interlayer film 1. The interlayer film 1 is arranged between the first lamination glass member 31 and the second lamination glass member 32 to be sandwiched therebetween. The first lamination glass member 31 is layered on a first surface (one surface) of the interlayer film 1. The second lamination glass member 32 is layered on a second surface (other surface) opposite to the first surface of the interlayer film 1. The first lamination glass member 31 is layered on the outer surface of the second layer 12 in the interlayer film 1. The second lamination glass member 32 is layered on the outer surface of the third layer 13 in the interlayer film 1.

As described above, the laminated glass according to the present invention includes a first lamination glass member, a second lamination glass member, and an interlayer film, and the interlayer film is the interlayer film for laminated glass according to the present invention. In the laminated glass according to the present invention, the interlayer film is arranged between the first lamination glass member and the second lamination glass member.

The gradation part is a region where parallel light transmittance continuously reduces from the one end side to the other end side and an absolute value of a variation rate in parallel light transmittance is more than 0.3%/m, when the parallel light transmittance is measured for laminated glass. The gradation part may include a portion having a parallel light transmittance of more than 60%. The gradation part includes one or more points A having a variation rate in parallel light transmittance of more than 0.3%/mm. The number of points A where an absolute value of a variation rate in parallel light transmittance is more than 0.3%/mm contained in the gradation part is preferably 1 or more, more preferably 2 or more, further preferably 3 or more, especially preferably 4 or more, most preferably 5 or more. The number of points A where an absolute value of a variation rate in parallel light transmittance is more than 0.3%/mm contained in the gradation part may be 1500 or less, and may be 1450 or less.

The transparent part is a region located closer to the one end side than the gradation part and having a parallel light transmittance of 60% or more when the parallel light transmittance is measured for the laminated glass. The parallel light transmittance of the transparent part is preferably 61% or more, more preferably 62% or more.

The dark color part is a region located closer to the other end side than the gradation part and including point A where an absolute value of a variation rate in parallel light transmittance is 0.3%/mm or less when the parallel light transmittance is measured for the laminated glass. From the viewpoint of further suppressing color unevenness in the shading region, an absolute value of a variation rate in parallel light transmittance at point A where an absolute value of a variation rate in parallel light transmittance is 0.3%/mm or less is preferably 0.29%/mm or less, more preferably 0.28%/mm or less. From the viewpoint of further suppressing color unevenness in the shading region, it is preferred that the dark color part include a point where an absolute value of a variation rate in parallel light transmittance is 0.29%/mm or less, and it is more preferred that the dark color part include a point where an absolute value of a variation rate in parallel light transmittance is 0.28%/mm or less. From the viewpoint of still further suppressing color unevenness in the shading region, it is preferred that the dark color part include a point where an absolute value of a variation rate in parallel light transmittance is 0.27%/mm or less, and it is more preferred that the dark color part include a point where an absolute value of a variation rate in parallel light transmittance is 0.26%/mm or less.

The laminated glass has a dark color part containing one or more points A where an absolute value of a variation rate in parallel light transmittance is 0.3%/mm or less. The number of points A where an absolute value of a variation rate in parallel light transmittance is 0.3%/mm or less, contained in the dark color part is preferably 2 or more, more preferably 3 or more, further preferably 4 or more, especially preferably 5 or more, most preferably 6 or more. When the number of points A where an absolute value of a variation rate in parallel light transmittance is 0.3%/mm or less, contained in the dark color part is large, the color unevenness in the shading region is further suppressed. The number of points A where an absolute value of a variation rate in parallel light transmittance is 0.3%/mm or less contained in the dark color part may be 300 or less, and may be 299 or less.

The distance of the transparent part in the direction connecting the one end and the other end of the laminated glass is defined as a distance L1. The distance of the gradation part in the direction connecting the one end and the other end of the laminated glass is defined as a distance L2. The distance of the dark color part in the direction connecting the one end and the other end of the laminated glass is defined as a distance L3. The distances L1, L2, L3 are distances shown in FIG. 15.

The distance L1 is preferably 10 mm or more, more preferably 20 mm or more, and is preferably 3000 mm or less, more preferably 2990 mm or less.

The distance L2 is preferably 10 mm or more, more preferably 20 mm or more, and is preferably 3000 mm or less, more preferably 2990 mm or less.

The distance L3 is preferably 50 mm or more, more preferably 60 mm or more, and is preferably 3000 mm or less, more preferably 2990 mm or less.

The distance of the interlayer film in the direction connecting the one end and the other end of the laminated glass is defined as a distance L.

A ratio of the distance L1 to the distance L (distance L1/distance L) is preferably 0.02 or more, more preferably 0.03 or more, and is preferably 0.98 or less, more preferably 0.97 or less.

A ratio of the distance 12 to the distance L (distance L2/distance L) is preferably 0.02 or more, more preferably 0.03 or more, and is preferably 0.98 or less, more preferably 0.97 or less.

A ratio of the distance L3 to the distance L (distance L3/distance L) is preferably 0.05 or more, more preferably 0.051 or more, and is preferably 0.98 or less, more preferably 0.97 or less.

It is preferred that the first lamination glass member be the first glass plate. It is preferred that the second lamination glass member be the second glass plate.

Examples of the first and second lamination glass members include a glass plate, and a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate including a glass plate, and it is preferred that at least one glass plate be used. It is preferred that each of the first lamination glass member and the second lamination glass member be a glass plate or a PET film, and the laminated glass include a glass plate as at least one of the first lamination glass member and the second lamination glass member. It is especially preferred that both of the first and second lamination glass members be glass plates.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, green glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth)acrylate plate, and the like.

The thicknesses of each of the first lamination glass member and the second lamination glass member is preferably 1 mm or more, and is preferably 5 mm or less, more preferably 3 mm or less. Moreover, when the lamination glass member is a glass plate, the thickness of the glass plate is preferably 0.5 mm or more, more preferably 0.7 mm or more, and is preferably 5 mm or less, more preferably 3 mm or less. When the lamination glass member is a PET film, the thickness of the PET film is preferably 0.03 mm or more and is preferably 0.5 mm or less.

The method for producing the laminated glass is not particularly limited. First, the interlayer film is sandwiched between the first lamination glass member and the second lamination glass member to obtain a laminate. Then, for example, by passing the obtained laminate through pressure rolls or subjecting the obtained laminate to decompression suction in a rubber bag, the air remaining between the first and the second lamination glass members and the interlayer film is removed. Then, the laminate is preliminarily bonded together at about 70° C. to 110° C. to obtain a preliminarily press-bonded laminate. Next, by putting the preliminarily press-bonded laminate into an autoclave or by pressing the laminate, the laminate is press-bonded at about 120° C. to 150° C. and under a pressure of 1 MPa to 1.5 MPa. In this way, laminated glass can be obtained.

Each of the interlayer film and the laminated glass can be used for automobiles, railway vehicles, aircraft, ships, and buildings and the like. Each of the interlayer film and the laminated glass can also be used for applications other than these applications. It is preferred that the interlayer film and the laminated glass be an interlayer film and laminated glass for vehicles or for buildings respectively, and it is more preferred that the interlayer film and the laminated glass be an interlayer film and laminated glass for vehicles respectively. Each of the interlayer film and the laminated glass can be used for a windshield, side glass, rear glass, roof glass or glass for backlight of an automobile, and the like. The interlayer film and the laminated glass are suitably used for automobiles. The interlayer film is suitably used for obtaining laminated glass of an automobile.

Hereinafter, the present invention will be described in more detail with reference to examples and comparative examples. The present invention is not limited only to these examples.

In polyvinyl acetal resins used, n-butyraldehyde which has 4 carbon atoms is used for the acetalization. With regard to the polyvinyl acetal resin, the acetalization degree (the butyralization degree), the acetylation degree and the content of the hydroxyl group were measured by a method conforming to JIS K6728 "Testing methods for polyvinyl butyral". In this connection, even in the cases of being measured according to ASTM D1396-92, numerical values similar to those obtained by a method conforming to JIS K6728 "Testing methods for polyvinyl butyral" were exhibited.

Example 1

Preparation of Composition for Forming First Layer:

The following ingredients were mixed, and kneaded sufficiently with a mixing roll to obtain a composition for forming a first layer.

Polyvinyl acetal resin (average polymerization degree: 3000, content of hydroxyl group: 22% by mole, acetylation degree: 13% by mole, acetalization degree: 65% by mole): 100 parts by weight Triethylene glycol di-2-ethylhexanoate (3GO): 60 parts by weight An amount that is to be 0.2% by weight in the obtained first layer of Tinuvin 326 (2-(2'-hydroxy-3'-t-butyl-5-methylphenyl)-5-chlorobenzotriazole, "Trinuvin 326" available from BAS: Japan Ltd.)

An amount that is to be 0.2% by weight in the obtained first layer of BHT (2,6-di-t-butyl-p-cresol)

Preparation of Composition for Forming Second Layer and Third Layer:

The following ingredients were mixed, and kneaded sufficiently with a mixing roll to obtain a composition for forming a second layer and a third layer.

Polyvinyl acetal resin (average polymerization degree: 1700, content of hydroxyl group: 30.5% by mole, acetylation degree: 1% by mole, acetalization degree: 68.5*; by mole): 100 parts by weight Triethylene glycol di-2-ethylhexanoate (3GO): 38 parts by weight An amount that is to be 0.2% by weight in the obtained second layer and third layer of Tinuvin 326 (2-(2'-hydroxy-3'-t-butyl-5-methylphenyl)-5-chlorobenzotriazole, "Tinuvin 326" available from BASF Japan Ltd.)

An amount that is to be 0.2% by weight in the obtained second layer and third layer of BHT (2,6-di-t-butyl-p-cresol)

Preparation of Composition for Forming Colored Layer:

The following ingredients were mixed, and kneaded sufficiently with a mixing roll to obtain a composition for forming a colored layer.

Polyvinyl acetal resin (average polymerization degree: 1700, content of hydroxyl group: 30.5% by mole, acetylation degree: 1% by mole, acetalization degree: 68.5% by mole): 100 parts by weight Triethylene glycol di-2-ethylhexanoate (3GO): 40 parts by weight An amount that is to be 5.9% by weight in 100% by weight of the composition for forming the obtained colored layer (and in the obtained colored layer) of calcium carbonate particles (inorganic particles, weight average particle diameter: 5.0 μm)

Preparation of Interlayer Film:

The interlayer film was produced in such a manner that the flow rate of the composition for forming the colored layer in the dark color part was uniform by adjusting the slit shape in the FB by the FB method. The composition for forming a first layer, the composition for forming a second layer and a third layer, and the composition for forming a colored layer were coextruded by using a co-extruder, and the interlayer film was wound to obtain a roll body. In this manner, a wedge-like interlayer film was prepared. The obtained interlayer film has a minimum thickness at one end and has a maximum thickness at the other end. The configuration of the obtained interlayer film is shown in Table 2.

Preparation of Laminated Glass:

The interlayer film was sandwiched between two sheets of clear glass conforming to JIS R3202:1996 having a thickness of 2 mm to obtain a laminate. The obtained laminate was put into a rubber bag and the inside thereof is degassed for 20 minutes with a degree of vacuum of 2.6 kPa, after which the laminate in the degassed condition was transferred into an oven, and vacuum-pressed by retention at 90° C. for 30 minutes, and thus the laminate was preliminarily press-bonded. The preliminarily press-bonded laminate was subjected to press-bonding for 20 minutes under conditions of 135° C. and a pressure of 1.2 MPa in an autoclave to obtain a laminated glass. The obtained laminated glass corresponds to the laminated glass X.

Examples 2 to 12 and Comparative Examples 1 to 6

The interlayer film and the laminated glass were produced by the FB method or the conduit method in the same manner as Example 1 except that the configuration of the interlayer film was changed to those shown in Tables 1 to 5.

Example 13

The following ingredients were mixed, and kneaded sufficiently with a mixing roll to obtain a composition for forming a second layer and a third layer.

Polyvinyl acetal resin (average polymerization degree: 1700, content of hydroxyl group: 30.5% by mole, acetylation degree: 1% by mole, acetalization degree: 68.5% by mole): 100 parts by weight Triethylene glycol di-2-ethylhexanoate (3GO): 38 parts by weight An amount that is to be 0.2% by weight in the obtained second layer and third layer of Tinuvin 326 (2-(2'-hydroxy-3'-t-butyl-5-methylphenyl)-5-chlorobenzotriazole, "Tinuvin 326" available from BASF Japan Ltd.)

An amount that is to be 0.2% by weight in the obtained second layer and third layer of BEIT (2,6-di-t-butyl-p-cresol)

Preparation of Composition for Forming Colored Layer:

The following ingredients were mixed, and kneaded sufficiently with a mixing roll to obtain a composition for forming a colored layer.

Polyvinyl acetal resin (average polymerization degree: 1700, content of hydroxyl group: 30.5% by mole, acetylation degree: 1% by mole, acetalization degree: 68.5% by mole): 100 parts by weight Triethylene glycol di-2-ethylhexanoate (3GO): 40 parts by weight An amount that is to be 5.9% by weight in 100% by weight of the composition for forming the obtained colored layer (and in the obtained colored layer) of calcium carbonate particles (inorganic particles, weight average particle diameter: 5.0 μm)

By the conduit method, a co-extrusion of the second layer and the colored layer, and a third layer were produced in the following manner. The obtained second layer and the colored layer were co-extruded with an extruder to obtain the co-extrusion of the second layer and the colored layer. The composition for forming a third layer was extruded with an extruder to obtain the third layer. The co-extrusion of the second layer and the colored layer had a rectangular shape, and the third layer had a minimum thickness at one end, and a maximum thickness at the other end. The slit shape of the conduit was adjusted to make the flow rate of the composition for forming the colored layer in the dark color part uniform.

Infrared Reflective Layer:

The following infrared reflective layer was prepared.

XIR-75 (resin film with metal foil, "XIR-75" available from Southwall Technologies)

The metal foil in XIR-75 has a five-layer structure of $In_2O_3/Ag/In_2O_3/Ag/In_2O_3$.

Preparation of Laminated Glass:

Between two sheets of clear glass having a thickness of 2 mm conforming to JIS R3202:1996, the co-extrusion of the second layer and the colored layer, the infrared reflective layer, and the third layer stacked in this order were sandwiched to obtain a laminate. The obtained laminate was put into a rubber bag and the inside thereof is degassed for 20 minutes with a degree of vacuum of 2.6 kPa, after which the laminate in the degassed condition was transferred into an oven, and vacuum-pressed by retention at 90° C. for 30 minutes, and thus the laminate was preliminarily press-bonded. The preliminarily press-bonded laminate was subjected to press-bonding for 20 minutes under conditions of 135° C. and a pressure of 1.2 MPa in an autoclave to obtain a laminated glass. The obtained laminated glass corresponds to the laminated glass X.

Examples 14 to 18

The interlayer film and the laminated glass were produced by the FB method or the conduit method in the same manner as Example 13 except that the configuration of the interlayer film and the infrared reflective layer were changed to those shown in Tables 5 to 6.

The infrared reflective layer Nano90S in Tables indicates "Multilayer Nano 90S" available from Sumitomo 3M Limited.

Example 19

The following ingredients were mixed, and kneaded sufficiently with a mixing roll to obtain a composition for forming a first layer.

Polyvinyl acetal resin (average polymerization degree: 1700, content of hydroxyl group: 30.5% by mole, acetylation degree: 1% by mole, acetalization degree: 68.5% by mole): 100 parts by weight Triethylene glycol di-2-ethylhexanoate (3GO): 38 parts by weight An amount that is to be 0.2% by weight in the obtained second layer and third layer of Tinuvin 326 (2-(2'-hydroxy-

57

3'-t-butyl-5-methylphenyl)-5-chlorobenzotriazole, "Tinuvin 326" available from BASF Japan Ltd.)

An amount that is to be 0.2% by weight in the obtained second layer and third layer of BHT (2,6-di-t-butyl-p-cresol) Preparation of Composition for Forming Colored Layer:

The following ingredients were mixed, and kneaded sufficiently with a mixing roll to obtain a composition for forming a colored layer.

Polyvinyl acetal resin (average polymerization degree: 1700, content of hydroxyl group: 30.5% by mole, acetylation degree: 1% by mole, acetalization degree: 68.5% by mole): 100 parts by weight Triethylene glycol di-2-ethylhexanoate (3GO): 40 parts by weight An amount that is to be 5.9% by weight in 100% by weight of the composition for forming the obtained colored layer (and in the obtained colored layer) of calcium carbonate particles (inorganic particles, weight average particle diameter: 5.0 μm)

Preparation of Interlayer Film:

The interlayer film was produced in such a manner that the flow rate of the composition for forming the colored layer in the dark color part was uniform by adjusting the slit shape in the FB by the FB method. The composition for forming a first layer, and the composition for forming a colored layer were coextruded by using a co-extruder, and the interlayer film was wound to obtain a roll body. In this manner, a wedge-like interlayer film was prepared. The obtained interlayer film has a minimum thickness at one end and has a maximum thickness at the other end. The configuration of the obtained interlayer film is shown in Table 7.

Preparation of Laminated Glass:

The interlayer film was sandwiched between two sheets of clear glass conforming to JIS R3202:1996 having a thickness of 2 mm to obtain a laminate. The obtained laminate was put into a rubber bag and the inside thereof is degassed for 20 minutes with a degree of vacuum of 2.6 kPa, after which the laminate in the degassed condition was transferred into an oven, and vacuum-pressed by retention at 90° C. for 30 minutes, and thus the laminate was preliminarily press-bonded. The preliminarily press-bonded laminate was subjected to press-bonding for 20 minutes under conditions of 135° C. and a pressure of 1.2 MPa in an autoclave to obtain a laminated glass. The obtained laminated glass corresponds to the laminated glass X.

Example 20 and Comparative Examples 7, 8

The interlayer film and the laminated glass were produced by the FB method or the conduit method in the same manner as Example 19 except that the configuration of the interlayer film was changed to those shown in Table 7.

(Evaluation)

(1) Measurement of Parallel Light Transmittance

58

Parallel light transmittance of the obtained laminated glass was measured in accordance with JIS R3106:1998. Specifically, measurement was conducted in the following manner.

By using a spectrophotometer ("U-4100" available from Hitachi High-Tech Corporation), the laminated glass was placed parallel with the normal line of the light axis on the optical path between the light source and the integrating sphere at a point 13 cm away from the integrating sphere so that only the parallel light having penetrated the laminated glass is received by the integrating sphere. The parallel light transmittance means a visible light transmittance calculated from the spectral transmittance measured in this condition.

The interlayer film and the laminated glass obtained in Examples 1 to 20 had the transparent part, the gradation part, and the dark color part from the one end side toward the other end side. On the other hand, the interlayer film and the laminated glass obtained in Comparative Examples 1 to 8 did not have a dark color part.

(2) Color Unevenness in Shading Region (Visual Observation)

The obtained laminated glass was placed on a light table, and the coloring pattern in the shading region of the laminated glass was visually observed from the side opposite to the light source under illumination with a fluorescent lamp in the light table. Ten observers observed the obtained laminated glass by the aforementioned observation method, and judged the color unevenness in the shading region by visual observation according to the following criteria. Further, a white film printed with a 1-cm square grid pattern was set between the laminated glass and the light table, and the laminated glass was set parallel with the film at a distance of 1.5 cm from the laminated glass in the thickness direction of the laminated glass, and the coloring pattern was observed under illumination with a fluorescent lamp from above the laminated glass.

[Criteria for Judgement in Color Unevenness (Visual Observation) in Shading Region]

○: Color unevenness is unrecognizable
Δ: Color unevenness is slightly recognizable
x: Color unevenness is clearly recognizable (3) Color Unevenness in Shading Region (Parallel Light Transmittance)

A rate (%) of the dark color part in the shading region was calculated from the distance of the shading region (distance L2+distance L3) in the direction connecting the one end and the other end, and the distance of the dark color part (distance L3) in the direction connecting the one end and the other end, according to the formula: distance L3/(distance L2+distance L3)×100.

[Criteria for Judgement in Color Unevenness (Parallel Light Transmittance) in Shading Region]

○: Rate of dark color part in shading region is 1% or more
x: Rate of dark color part in shading region is less than 1%

Configurations of interlayer films and results are shown in the following Tables 1 to 7.

TABLE 1

| | Comparative Example 1 | Comparative Example 2 | Comparative Example 3 | Comaprative Example 4 |
|---|---|---|---|---|
| Method for producing interlayer film | FB method | Conduit method | FB method | Conduit method |
| Shape of interlayer film | FIG. 16(c) | FIG 16(b) | FIG. 17(b) | FIG. 17(a) |
| Infrared reflective layer | — | — | — | — |
| Distance of uniform-thickness part in direction connecting one end and other end (Distance L4) | 0 mm | 0 mm | 0 mm | 0 mm |
| Wedge angle of interlayer film (θ) | 0.44 mrad | 0.72 mrad | 0.42 mrad | 0.57 mrad |

TABLE 1-continued

| | Comparative Example 1 | Comparative Example 2 | Comparative Example 3 | Comaprative Example 4 |
|---|---|---|---|---|
| Distance of interlayer film in direction connecting one end and other end (width of interlayer film) | 1011 mm | 995 mm | 1000 mm | 990 mm |
| Distance of shading region in direction connecting one end and other end (Distance L2 + Distance L3) | 310 mm | 220 mm | 280 mm | 230 mm |
| Distance of dark color part in direction connecting one end and other end (Distance L3) | 0 mm | 0 mm | 0 mm | 0 mm |
| Average value of parallel light transmittance in transparent part | 90% | 87% | 85% | 87% |
| Average value of parallel light transmittance in dark color part | — | — | — | — |
| Minimum value of variation rate in parallel light transmittance in dark color part | — | — | — | — |
| Shortest distance between surface in thickness direction of interlayer film and surface in thickness direction of colored layer | 9 μm | 9 μm | 9 μm | 7 μm |
| Color unevenness in shading region (visual observation) | x | x | x | x |
| Color unevenness in shading region (parallel light transmittance) | x | x | x | x |

TABLE 2

| | Comparative Example 5 | Comparative Example 6 | Example 1 | Example 2 |
|---|---|---|---|---|
| Method for producing interlayer film | FB method | Conduit method | FB method | Conduit method |
| Shape of interlayer film | FIG. 18(b) | FIG. 18(a) | FIG. 2 | FIG. 1 |
| Infrared reflective layer | — | — | — | — |
| Distance of uniform-thickness part in direction connecting one end and other end (Distance L4) | 200 mm | 300 mm | 0 mm | 0 mm |
| Wedge angle of interlayer film (θ) | 0.35 mrad | 0.49 mrad | 0.20 mrad | 0.33 mrad |
| Distance of interlayer film in direction connecting one end and other end (width of interlayer film) | 1200 mm | 1350 mm | 1750 mm | 1500 mm |
| Distance of shading region in direction connecting one end and other end (Distance L2 + Distance L3) | 250 mm | 330 mm | 770 mm | 610 mm |
| Distance of dark color part in direction connecting one end and other end (Distance L3) | 0 mm | 0 mm | 10 mm | 20 mm |
| Average value of parallel light transmittance in transparent part | 89% | 90% | 75% | 67% |
| Average value of parallel light transmittance in dark color part | — | — | 2% | 23% |
| Minimum value of variation rate in parallel light transmittance in dark color part | — | — | 0.30%/mm | 0.28%/mm |
| Shortest distance between surface in thickness direction of interlayer film and surface in thickness direction of colored layer | 6 μm | 9 μm | 13 μm | 20 μm |
| Color unevenness in shading region (visual observation) | x | x | Δ | Δ |
| Color unevenness in shading region (parallel light transmittance) | x | x | ○ | ○ |

TABLE 3

| | Example 3 | Example 4 | Example 5 | Example 6 |
|---|---|---|---|---|
| Method for producing interlayer film | FB method | FB method | Conduit method | FB method |
| Shape of interlayer film | FIG. 2 | FIG. 2 | FIG. 1 | FIG. 4 |
| Infrared reflective layer | — | — | — | — |
| Distance of uniform-thickness part in direction connecting one end and other end (Distance L4) | 0 mm | 0 mm | 0 mm | 200 mm |
| Wedge angle of interlayer film (θ) | 0.20 mrad | 0.50 mrad | 0.80 mrad | 0.70 mrad |
| Distance of interlayer film in direction connecting one end and other end (width of interlayer film) | 980 mm | 1015 mm | 1000 mm | 1200 mm |
| Distance of shading region in direction connecting one end and other end (Distance L2 + Distance L3) | 310 mm | 280 mm | 190 mm | 350 mm |
| Distance of dark color part in direction connecting one end and other end (Distance L3) | 50 mm | 100 mm | 40 mm | 200 mm |
| Average value of parallel light transmittance in transparent part | 90% | 80% | 73% | 88% |
| Average value of parallel light transmittance in dark color part | 7% | 30% | 15% | 8% |
| Minimum value of variation rate in parallel light transmittance in dark color part | 0.05%/mm | 0.20%/mm | 0.10%/mm | 0.13%/mm |
| Shortest distance between surface in thickness direction of interlayer film and surface in thickness direction of colored layer | 27 μm | 150 μm | 250 μm | 200 μm |
| Color unevenness in shading region (visual observation) | ○ | ○ | ○ | ○ |
| Color unevenness in shading region (parallel light transmittance) | ○ | ○ | ○ | ○ |

TABLE 4

| | Example 7 | Example 8 | Example 9 | Example 10 |
|---|---|---|---|---|
| Method for producing interlayer film | FB method | Conduit method | FB method | Conduit method |
| Shape of interlayer film | FIG. 4 | FIG. 3 | FIG. 6 | FIG. 5 |
| Infrared reflective layer | — | — | — | — |
| Distance of uniform-thickness part in direction connecting one end and other end (Distance L4) | 1000 mm | 700 mm | 0 mm | 0 mm |
| Wedge angle of interlayer film (θ) | 0.15 mrad | 0.46 mrad | 0.35 mrad | 0.4 mrad |
| Distance of interlayer film in direction connecting one end and other end (width of interlayer film) | 1800 mm | 1400 mm | 1060 mm | 1000 mm |
| Distance of shading region in direction connecting one end and other end (Distance L2 + Distance L3) | 820 mm | 630 mm | 260 mm | 300 mm |
| Distance of dark color part in direction connecting one end and other end (Distance L3) | 600 mm | 410 mm | 30 mm | 40 mm |
| Average value of parallel light transmittance in transparent part | 88% | 69% | 81% | 80% |
| Average value of parallel light transmittance in dark color part | 8% | 5% | 20% | 13% |
| Minimum value of variation rate in parallel light transmittance in dark color part | 0.02%/mm | 0.08%/mm | 0.12%/mm | 0.10%/mm |
| Shortest distance between surface in thickness direction of interlayer film and surface in thickness direction of colored layer | 30 μm | 25 μm | 50 μm | 52 μm |
| Color unevenness in shading region (visual observation) | ○ | ○ | Δ | Δ |
| Color unevenness in shading region (parallel light transmittance) | ○ | ○ | ○ | ○ |

TABLE 5

| | Example 11 | Example 12 | Example 13 | Example 14 |
|---|---|---|---|---|
| Method for producing interlayer film | FB method | Conduit method | Conduit method | Conduit method |
| Shape of interlayer film | FIG. 6 | FIG. 5 | FIG. 7 | FIG. 9 |
| Infrared reflective layer | — | — | XIR-75 | XIR-75 |
| Distance of uniform-thickness part in direction connecting one end and other end (Distance L4) | 0 mm | 0 mm | 0 mm | 0 mm |
| Wedge angle of interlayer film (θ) | 0.37 mrad | 0.45 mrad | 0.43 mrad | 0.33 mrad |
| Distance of interlayer film in direction connecting one end and other end (width of interlayer film) | 900 mm | 1110 mm | 1100 mm | 1500 mm |
| Distance of shading region in direction connecting one end and other end (Distance L2 + Distance L3) | 230 mm | 320 mm | 300 mm | 600 mm |
| Distance of dark color part in direction connecting one end and other end (Distance L3) | 80 mm | 130 mm | 130 mm | 400 mm |
| Average value of parallel light transmittance in transparent part | 88% | 85% | 82% | 81% |
| Average value of parallel light transmittance in dark color part | 24% | 18% | 8% | 16% |
| Minimum value of variation rate in parallel light transmittance in dark color part | 0.23%/mm | 0.15%/mm | 0.07%/mm | 0.01%/mm |
| Shortest distance between surface in thickness direction of interlayer film and surface in thickness direction of colored layer | 90 μm | 67 μm | 100 μm | 111 μm |
| Color unevenness in shading region (visual observation) | ○ | ○ | ○ | ○ |
| Color unevenness in shading region (parallel light transmittance) | ○ | ○ | ○ | ○ |

TABLE 6

| | Example 15 | Example 16 | Example 17 | Example 18 |
|---|---|---|---|---|
| Method for producing interlayer film | Conduit method | FB method | FB method | FB method |
| Shape of interlayer film | FIG. 11 | FIG. 8 | FIG. 10 | FIG. 12 |
| Infrared reflective layer | Nano90S | XIR-75 | XIR-75 | Nano90S |
| Distance of uniform-thickness part in direction connecting one end and other end (Distance L4) | 400 mm | 0 mm | 0 mm | 500 mm |
| Wedge angle of interlayer film (θ) | 0.29 mrad | 0.5 mrad | 0.41 mrad | 0.22 mrad |
| Distance of interlayer film in direction connecting one end and other end (width of interlayer film) | 1400 mm | 1008 mm | 1200 mm | 1610 mm |
| Distance of shading region in direction connecting one end and other end (Distance L2 + Distance L3) | 500 mm | 340 mm | 410 mm | 650 mm |
| Distance of dark color part in direction connecting one end and other end (Distance L3) | 400 mm | 100 mm | 90 mm | 500 mm |
| Average value of parallel light transmittance in transparent part | 90% | 91% | 74% | 70% |
| Average value of parallel light transmittance in dark color part | 8% | 3% | 6% | 3% |
| Minimum value of variation rate in parallel light transmittance in dark color part | 0.06%/mm | 0.24%/mm | 0.19%/mm | 0.14%/mm |

TABLE 6-continued

| | Example 15 | Example 16 | Example 17 | Example 18 |
|---|---|---|---|---|
| Shortest distance between surface in thickness direction of interlayer film and surface in thickness direction of colored layer | 85 μm | 46 μm | 56 μm | 100 μm |
| Color unevenness in shading region (visual observation) | ○ | ○ | ○ | ○ |
| Color unevenness in shading region (parallel light transmittance) | ○ | ○ | ○ | ○ |

TABLE 7

| | Comparative Example 7 | Comparative Example 8 | Example 19 | Example 20 |
|---|---|---|---|---|
| Method for producing interlayer film | FB method | Conduit method | FB method | Conduit method |
| Shape of interlayer film | FIG. 16(a) | FIG. 16(a) | FIG. 13 | FIG. 13 |
| Infrared reflective layer | — | — | — | — |
| Distance of uniform-thickness part in direction connecting one end and other end (Distance L4) | 0 mm | 0 mm | 0 mm | 0 mm |
| Wedge angle of interlayer film (θ) | 0.38 mrad | 0.70 mrad | 0.38 mrad | 0.75 mrad |
| Distance of interlayer film in direction connecting one end and other end (width of interlayer film) | 1100 mm | 960 mm | 1020 mm | 100 mm |
| Distance of shading region in direction connecting one end and other end (Distance L2 + Distance L3) | 170 mm | 220 mm | 270 mm | 210 mm |
| Distance of dark color part in direction connecting one end and other end (Distance L3) | 0 mm | 0 mm | 120 mm | 60 mm |
| Average value of parallel light transmittance in transparent part | 90% | 87% | 92% | 70% |
| Average value of parallel light transmittance in dark color part | — | — | 25% | 13% |
| Minimum value of variation rate in parallel light transmittance in dark color part | — | — | 0.24%/mm | 0.26%/mm |
| Shortest distance between surface in thickness direction of interlayer film and surface in thickness direction of colored layer | 8 μm | 4 μm | 450 μm | 720 μm |
| Color unevenness in shading region (visual observation) | x | x | ○ | ○ |
| Color unevenness in shading region (parallel light transmittance) | x | x | ○ | ○ |

EXPLANATION OF SYMBOLS

1, 1A, 1B, 1C, 1D, 1E, 1F, 1G, 1H, 1I, 1J, 1K, 1L, 1M: Interlayer film

1*a*, 1Aa, 1Ba, 1Ca, 1Da, 1Ea, 1Fa, 1Ga, 1Ha, 1Ia, 1Ja, 1Ka, 1La, 1Ma: One end

1*b*, 1Ab, 1Bb, 1Cb, 1Db, 1Eb, 1Fb, 1Gb, 1Hb, 1Ib, 1Jb, 1Kb, 1Lb, 1Mb: Other end

11, 11A, 11B, 11C, 11D, 11E, 11L, 11M: First layer

12, 12A, 12B, 12C, 12D, 12E, 12F, 12G, 12H, 12I, 12J, 12K: Second layer

13, 13A, 13B, 13C, 13D, 13E, 13F, 13G, 13H, 13I, 13J, 13K: Third layer

14, 14A, 14B, 14C, 14D, 14E, 14F, 14G, 14H, 14I, 14J, 14K, 14L, 14M . . . : Colored layer

15F, 15G, 15H, 15I, 15J, 15K: Infrared reflective layer

21: Laminated glass

21*a*: One end

21*b*: Other end

31: First lamination glass member

32: Second lamination glass member

R1: Transparent part

R2: Gradation part

R3: Dark color part

R4: Shading region

The invention claimed is:

1. An interlayer film for laminated glass, the interlayer film having one end, and the other end on an opposite side of the one end, the other end having a thickness larger than a thickness of the one end, the interlayer film comprising a first layer, a second layer, a third layer and a colored layer, the second layer being arranged on a first surface side of the first layer, the third layer being arranged on a second surface side opposite to the first surface of the first layer, the colored layer being embedded between the first layer and the second layer, when the interlayer film is arranged between two sheets of clear glass conforming to JIS R3202: 1996 to obtain a laminated glass X, and measurement of parallel light transmittance below is conducted for the laminated glass X obtained, the interlayer film having:

a gradation part in which a parallel light transmittance continuously reduces from the one end side to the other end side, and an absolute value of a variation rate in the parallel light transmittance is more than 0.3%/mm;

a transparent part located closer to the one end side than the gradation part and having a parallel light transmittance of 60% or more; and a dark color part located closer to the other end side than the gradation part and including four or more points A having an absolute value of a variation rate in the parallel light transmittance of 0.3%/mm or less; wherein each of the gradation part and the dark color part has the colored layer, wherein a thickness of the colored layer in the gradation part continuously increases towards the other end, and wherein a thickness of the colored layer in the dark color part is uniform; and wherein the measurement of the parallel light transmittance includes:

selecting a plurality of points A at 1 cm intervals from a starting point toward the other end, the starting point being a position of 2 cm from the one end toward the other end;

measuring a parallel light transmittance of laminated glass X at each point A;

defining that an x-axial direction is "distance from the one end" and a y-axial direction is "parallel light transmittance", and preparing an approximate line in a region of 2 cm from three points including one point A and two points 1 cm distanced from the point A on both sides in a direction connecting the one end and the other end;

defining an absolute value of a variation rate in the parallel light transmittance determined from the approximate line as "absolute value of variation rate in parallel light transmittance" at the one point A; and determining "absolute value of variation rate in parallel light transmittance" for each point A.

2. The interlayer film for laminated glass according to claim 1, wherein a ratio of a distance of the dark color part in a direction connecting the one end and the other end, to a distance of the interlayer film in the direction connecting the one end and the other end is 0.05 or more.

3. The interlayer film for laminated glass according to claim 1, wherein the interlayer film has a uniform-thickness part in which a variation in thickness does not exceed 10 μm per a distance range of 10 cm in the direction connecting the one end and the other end, and the uniform-thickness part is located closer to the other end side than a middle position between the one end and the other end.

4. The interlayer film for laminated glass according to claim 1, wherein a shortest distance between a surface in a thickness direction of the interlayer film and a surface in a thickness direction of the colored layer is 10 μm or more.

5. A laminated glass comprising:

a first lamination glass member;

a second lamination glass member; and the interlayer film for laminated glass according to claim 1, the interlayer film for laminated glass being arranged between the first lamination glass member and the second lamination glass member.

6. A laminated glass having one end and the other end on an opposite side of the one end, the other end having a thickness larger than a thickness of the one end, the laminated glass comprising: a first lamination glass member, a second lamination glass member, and an interlayer film, the interlayer film being arranged between the first lamination glass member and the second lamination glass member, the interlayer film comprising a first layer, a second layer, a third layer and a colored layer, the second layer being arranged on a first surface side of the first layer, the third layer being arranged on a second surface side opposite to the first surface of the first layer, the colored layer being embedded between the first layer and the second layer, when measurement of parallel light transmittance below is conducted for the laminated glass, the laminated glass having:

a gradation part in which a parallel light transmittance continuously reduces from the one end side to the other end side, and an absolute value of a variation rate in the parallel light transmittance is more than 0.3%/mm;

a transparent part located closer to the one end side than the gradation part and having a parallel light transmittance of 60% or more; and a dark color part located closer to the other end side than the gradation part and including four or more points A having an absolute value of a variation rate in the parallel light transmittance of 0.3%/mm or less; wherein each of the gradation part and the dark color part has the colored layer, wherein a thickness of the colored layer in the gradation part continuously increases towards the other end, and wherein a thickness of the colored layer in the dark color part is uniform; and wherein the measurement of the parallel light transmittance includes:

selecting a plurality of points A at 1 cm intervals from a starting point toward the other end, the starting point being a position of 2 cm from the one end toward the other end;

measuring a parallel light transmittance of the laminated glass at each point A;

defining that an x-axial direction is "distance from the one end" and a y-axial direction is "parallel light transmittance", and preparing an approximate line in a region of 2 cm from three points including one point A and two points 1 cm distanced from the point A on both sides in a direction connecting the one end and the other end;

defining an absolute value of a variation rate in the parallel light transmittance determined from the approximate line as "absolute value of variation rate in parallel light transmittance" at the one point A; and determining "absolute value of variation rate in parallel light transmittance" for each point A.

7. The interlayer film for laminated glass according to claim 1, wherein the transparent part is configured by the first layer, the second layer and the third layer, and the gradation part and the dark color part are configured by the first layer, the second layer, the third layer and the colored layer.

8. The interlayer film for laminated glass according to claim 1, wherein a sectional shape in a thickness direction of a layer combining the second layer and the colored layer is a wedge shape, or includes a wedge portion and a rectangular portion.

9. The interlayer film for laminated glass according to claim 1, wherein a sectional shape in a thickness direction of a layer combining the second layer and the colored layer is a rectangular shape, or includes a wedge portion and a rectangular portion.

10. The interlayer film for laminated glass according to claim 1, wherein a sectional shape in a thickness direction of a layer combining the second layer and the colored layer is a wedge shape.

11. The interlayer film for laminated glass according to claim 1, wherein the one end of the interlayer film has a three or more-layer structure.

12. The interlayer film for laminated glass according to claim 1, wherein the transparent part of the interlayer film has a three or more-layer structure.

* * * * *